United States Patent
Nakamura et al.

(10) Patent No.: US 11,812,029 B2
(45) Date of Patent: *Nov. 7, 2023

(54) PICTURE CODING DEVICE, PICTURE CODING METHOD, AND PICTURE CODING PROGRAM, PICTURE DECODING DEVICE, PICTURE DECODING METHOD AND PICTURE DECODING PROGRAM

(71) Applicant: Godo Kaisha IP Bridge 1, Tokyo (JP)

(72) Inventors: Hiroya Nakamura, Kanagawa (JP); Toru Kumakura, Kanagawa (JP); Shigeru Fukushima, Kanagawa (JP); Hideki Takehara, Kanagawa (JP); Satoru Sakazume, Kanagawa (JP); Hiroyuki Kurashige, Kanagawa (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,632

(22) Filed: Jul. 25, 2022

(65) Prior Publication Data

US 2022/0360792 A1 Nov. 10, 2022

Related U.S. Application Data

(63) Continuation of application No. 17/417,346, filed as application No. PCT/JP2019/049804 on Dec. 19, 2019, now Pat. No. 11,431,986.

(30) Foreign Application Priority Data

Dec. 28, 2018 (JP) ................... 2018-247899
Mar. 8, 2019 (JP) ................... 2019-042585
Sep. 20, 2019 (JP) ................... 2019-171787

(51) Int. Cl.
*H04N 19/00* (2014.01)
*H04N 19/137* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC ...................................................... H04N 19/00
See application file for complete search history.

(56) References Cited

U.S. PATENT DOCUMENTS 11,297,330 B2 * 4/2022 Zhao .................... H04N 19/159
2004/0190624 A1 9/2004 Kondo et al.
(Continued)

FOREIGN PATENT DOCUMENTS

CN 101207762 A 6/2008
JP H09172644 A 6/1997
(Continued)

OTHER PUBLICATIONS

Chen J et al: "Algorithm description for Versatile Video Coding and Test Model 3(VTM 3)", 12. JVET Meeting; Oct. 3, 2018-Oct. 12, 2018; Macao; (The Joint Video Exploration Team of ISO/IEC JTC1/SC29/WG11 and ITU-T SG.16), No. JVET-L1002, Dec. 24, 2018 (Dec. 24, 2018), XP030251962, Retrieved from the Internet: URL:http://phenix.int-evry.fr/jvet/doc_end_user/documents/12_Macao/wg11/JVET-L1002-v2.zip JVET-L1002-v2.docx [retrieved on Dec. 24, 2018].

(Continued)

*Primary Examiner* — Maryam A Nasri
(74) *Attorney, Agent, or Firm* — Procopio, Cory, Hargreaves & Savitch LLP

(57) ABSTRACT

Technology for improving coding efficiency by performing a block split suitable for picture coding and decoding is provided. A device includes a coding information storage unit configured to store inter prediction information used in (Continued)

the inter prediction of a coded block in a history-based motion vector predictor candidate list, a spatial inter prediction information candidate derivation unit configured to derive a spatial inter prediction information candidate from inter prediction information of a block spatially neighboring a coding target block and set the spatial inter prediction information candidate as an inter prediction information candidate of the coding target block; and a history-based inter prediction information candidate derivation unit configured to derive a history-based inter prediction information candidate from the inter prediction information stored in the history-based motion vector predictor candidate list and set the history-based inter prediction information candidate as an inter prediction information candidate of the coding target block. The history-based inter prediction information candidate derivation unit compares a predetermined number of inter prediction information elements from latest inter prediction information within the inter prediction information stored in the history-based motion vector predictor candidate list with the spatial inter prediction information candidate and sets the inter prediction information as a history-based inter prediction information candidate when a value of the inter prediction information is different.

7 Claims, 38 Drawing Sheets

(51) Int. Cl.
  H04N 19/105 (2014.01)
  H04N 19/159 (2014.01)
  H04N 19/176 (2014.01)

(56) References Cited

U.S. PATENT DOCUMENTS

| | | |
|---|---|---|
| 2011/0194608 A1 | 8/2011 | Rusert et al. |
| 2013/0003850 A1 | 1/2013 | Sugio et al. |
| 2020/0137398 A1* | 4/2020 | Zhao ............... H04N 19/52 |
| 2020/0296383 A1* | 9/2020 | Li .................. H04N 19/105 |
| 2020/0359049 A1* | 11/2020 | Zhao ............... H04N 19/176 |
| 2021/0321092 A1* | 10/2021 | Zhang .............. H04N 19/105 |

FOREIGN PATENT DOCUMENTS

| | | |
|---|---|---|
| JP | 2013-090033 A | 5/2013 |
| JP | 2013-118625 A | 6/2013 |
| KR | 10-2018-0041579 A | 4/2018 |
| RU | 2628319 C2 | 8/2018 |
| WO | 2013/065301 A1 | 5/2013 |
| WO | 2013/114860 A1 | 8/2013 |
| WO | 2020003278 A1 | 1/2020 |
| WO | 2020065517 A1 | 4/2020 |
| WO | 2020/114407 A1 | 6/2020 |
| WO | 2020/123218 A1 | 6/2020 |
| WO | 2020122640 A1 | 6/2020 |

OTHER PUBLICATIONS

Extended European Search Report dated Sep. 1, 2022 from counterpart EP Application No. 19903738.3, 10 pages.
Zhang, L., et al., CE4-related: History-based Motion Vector Prediction, Joint Video Experts (JVET) ofITU-T SG 16 WP 3 and ISO/IEC JTC1/SC29/WG11, JVET-K0104-v5, 11th Meeting: Ljubljana, SI, Jul. 2018, 8 pgs.
Zhang, L., et al., CE4: History-based Motion Vector Prediction (Test4.4.7), Joint Video Experts Team (JVET) of ITU-TSG 16 WP 3 and ISO/IEC JTC1/SC29/WG11, JVET-L0266-v2, 12th Meeting: Macao, CN, Oct. 2018, 7 pgs.
Zhang, L., et al., History-Based Motion Vector Prediction in Versatile Video Coding, 2019 Data Compression Conference (DCC), Mar. 2019, pp. 43-52.
Xu, W., et al., CE4-related: Constraint of Pruning in History based Motion Vector Prediction, Joint Video Experts Team (JVET) of ITU-T SG 16 WP 3 and ISO/IEC JTC1/SC29/WG11, JVETL0448-v2, 12th Meeting: Macao, CN, Oct. 2018, 5 pgs.
International Search Report for related PCT App No. PCT/JP2019/049804 dated Feb. 18, 2020, 5 pgs.
International Preliminary Report on Patentability for related PCT App No. PCT/JP2019/049804 dated Dec. 28, 2020, 11 pgs.
Xu W. et al., CE4-related: CTU-level Initialization of History-based Motion Vector Prediction, Joint Video Experts Team (JVET) of ITU-TSG 16 WP 3 and ISO/IEC JTC 1/SC 29/WG 11, JVET-L0575, 12th Meeting, Macao, Oct. 3-12, 2018.
Office Action dated Nov. 2, 2021 from counterpart RU Patent Application No. 2021120487/07(042974), 10 pages.
Solovyev, et al., CE4-related: History-based MVP without using the last lookup table entry, Joint Video Experts Team (JVET) of ITU-T SG 16 WP 3 and ISO/IEC JTC 1/SC 29/WG 11, JVET-L0425-v6, 12th Meeting: Macao, CN, Oct. 2018, pp. 1-4.
Lee, et al., Non-CE4: HMVP unification between the Merge and MVP list , Joint Video Experts Team (JVET) of ITU-T SG 16 WP 3 and ISO/IEC JTC 1/SC 29/WG 11, JVET-N0373_v2, 14th Meeting: Geneva, CH, Mar. 2019, pp. 1-6.
Office Action for related Application No. JP 2021-045721, dated Mar. 8, 2022, 6 pages.
Office Action received in India Patent Application No. 202117027544, dated Oct. 13, 2022, in 6 pages.
Office Action received in Japan Patent Application No. 2021-147604, dated Oct. 25, 2022, in 5 pages, with translation.
Li Zhang et al., "CE4: History-based Motion Vector Prediciton (Test 4.4.7)", Joint Video Experts Team (JVET) of ITU-T SG 16 WP 3 and ISO/IEC JTC 1/SC 29/WG11 12th Meeting: Macao, CN, Oct. 3-12, 2018 JVET-L0266-v1, in 4 pages.
Notice of Allowance received in related CN App. No. 202110324793.2, dated Aug. 14, 2023, in 10 pages, with translation.
Office Action received in related CN App. No. 201980050634.9, dated Aug. 12, 2023 in 8 pages, with translation.

* cited by examiner

| 0 | 1 |

| 0 | 1 | | 2 |

FIG. 9

```
coding_quadtree() {
    qt_split
    if(qt_split) {
        coding_quadtree(0)
        coding_quadtree(1)
        coding_quadtree(2)
        coding_quadtree(3)
    }
    else {
        multi_type_tree()
    }
}
```

```
multi_type_tree() {
    mtt_split
    if(mtt_split) {
        mtt_split_vertical
        mtt_split_binary
        if(mtt_split_binary) {
            multi_type_tree(0, mtt_split_vertical)
            multi_type_tree(1, mtt_split_vertical)
        } else {
            multi_type_tree(0, mtt_split_vertical)
            multi_type_tree(1, mtt_split_vertical)
            multi_type_tree(2, mtt_split_vertical)
        }
    } else {
        // end split
    }
}
```

FIG. 12

```
coding_unit() {
    pred_mode_flag
    if( MODE_INTRA ) {
        intra_pred_mode
    }
    else { // MODE_INTER
        merge_flag
        if( merge_flag ) {
            merge_affine_flag
            if(merge_affine_flag==0) {
                umve_flag
            }
        } else {
            inter_affine_flag
            if( inter_affine_flag ) {
                cu_affine_type_flag
            }
        }
    }
}
```

FIG. 13

| merge_flag | merge_affine_flag | inter_affine_flag | Selected Mode |
|---|---|---|---|
| 1 | 0 | N/A | Merge Mode |
| 1 | 1 | N/A | Affine Merge Mode |
| 0 | N/A | 0 | Inter Pred Mode |
| 0 | N/A | 1 | Inter Affine Mode |

FIG. 31A
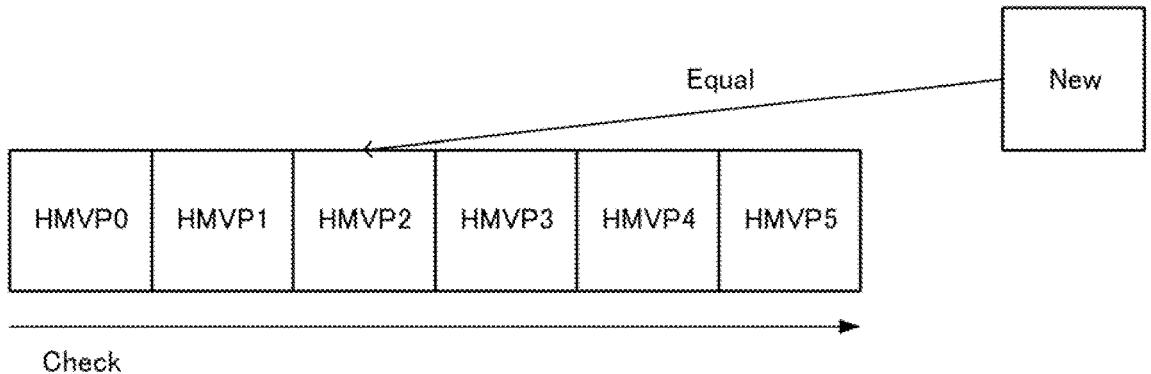
FIG. 31B
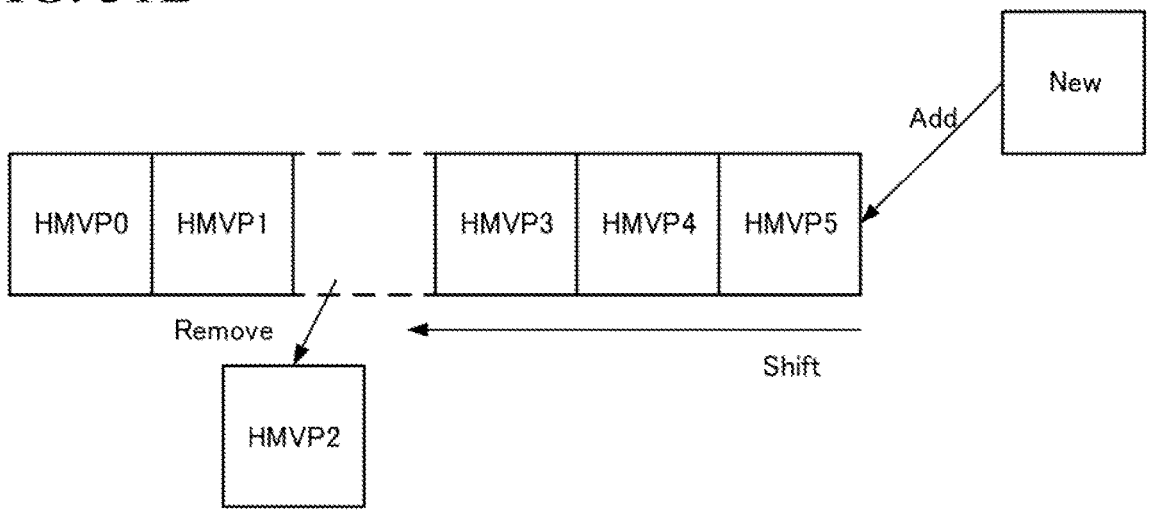
FIG. 31C
| HMVP0 | HMVP1 | HMVP3 ↓ HMVP2 | HMVP4 ↓ HMVP3 | HMVP5 ↓ HMVP4 | NEW ↓ HMVP5 |

FIG. 38A

| HMVP5 | C |
|---|---|
|  |  |

FIG. 38B

| HMVP4 | HMVP5 |
|---|---|
| C |  |

FIG. 38C

| HMVP3 | HMVP4 |
|---|---|
| HMVP5 | C |

FIG. 38D

| HMVP0 | HMVP1 | HMVP2 | HMVP3 | HMVP4 | HMVP5 |
|---|---|---|---|---|---|

← Check

PICTURE CODING DEVICE, PICTURE CODING METHOD, AND PICTURE CODING PROGRAM, PICTURE DECODING DEVICE, PICTURE DECODING METHOD AND PICTURE DECODING PROGRAM

CROSS-REFERENCE TO RELATED APPLICATIONS

This application is a continuation of U.S. application Ser. No. 17/417,346, filed on Jun. 22, 2021, which is a U.S. National Stage entry of PCT Application No: PCT/JP2019/049804 filed Dec. 19, 2019, which claims priority to Japanese Patent Application Nos. 2018-247899 filed Dec. 28, 2018, 2019-042585 filed Mar. 8, 2019, and 2019-171787 filed Sep. 20, 2019, the contents of which are incorporated herein by reference.

BACKGROUND OF THE INVENTION

Field of the Invention

The present invention relates to picture coding and decoding technology for dividing a picture into blocks and performing prediction.

Description of Related Art

In picture coding and decoding, a target picture is divided into blocks, each of which is a set of a prescribed number of samples, and a process is performed in units of blocks. Coding efficiency is improved by dividing a picture into appropriate blocks and appropriately setting intra picture prediction (intra prediction) and inter picture prediction (inter prediction).

In moving-picture coding/decoding, coding efficiency is improved by inter prediction for performing prediction from a coded/decoded picture. Patent Document 1 describes technology for applying an affine transform at the time of inter prediction. It is not uncommon for an object to cause deformation such as enlargement/reduction and rotation in moving pictures and efficient coding is enabled by applying the technology of Patent Document 1.

PRIOR ART DOCUMENTS

Patent Documents

[Patent Document 1] Japanese Unexamined Patent Application, First Publication No. H9-172644

SUMMARY OF THE INVENTION

However, because the technology of Patent Document 1 involves a picture transform, there is a problem that the processing load is great. In view of the above problem, the present invention provides efficient coding technology with a low load.

To solve the above-described problem, a picture coding device according to a first aspect of the present invention includes a coding information storage unit configured to store inter prediction information used in inter prediction of a coded block in a history-based motion vector predictor candidate list; a spatial inter prediction information candidate derivation unit configured to derive a spatial inter prediction information candidate from inter prediction information of a block spatially neighboring a coding target block and set the spatial inter prediction information candidate as an inter prediction information candidate of the coding target block; and a history-based inter prediction information candidate derivation unit configured to derive a history-based inter prediction information candidate from the inter prediction information stored in the history-based motion vector predictor candidate list and set the history-based inter prediction information candidate as an inter prediction information candidate of the coding target block, wherein the history-based inter prediction information candidate derivation unit compares a predetermined number of inter prediction information elements from latest inter prediction information within the inter prediction information stored in the history-based motion vector predictor candidate list with the spatial inter prediction information candidate and sets the inter prediction information as a history-based inter prediction information candidate when a value of the inter prediction information is different.

A picture coding method according to a second aspect of the present invention includes a coding information storage step of storing inter prediction information used in inter prediction of a coded block in a history-based motion vector predictor candidate list; a spatial inter prediction information candidate derivation step of deriving a spatial inter prediction information candidate from inter prediction information of a block spatially neighboring a coding target block and setting the spatial inter prediction information candidate as an inter prediction information candidate of the coding target block; and a history-based inter prediction information candidate derivation step of deriving a history-based inter prediction information candidate from the inter prediction information stored in the history-based motion vector predictor candidate list and setting the history-based inter prediction information candidate as an inter prediction information candidate of the coding target block, wherein the history-based inter prediction information candidate derivation step includes comparing a predetermined number of inter prediction information elements from latest inter prediction information within the inter prediction information stored in the history-based motion vector predictor candidate list with the spatial inter prediction information candidate and setting the inter prediction information as a history-based inter prediction information candidate when a value of the inter prediction information is different.

A picture coding program according to a third aspect of the present invention causes a computer to execute: a coding information storage step of storing inter prediction information used in inter prediction of a coded block in a history-based motion vector predictor candidate list; a spatial inter prediction information candidate derivation step of deriving a spatial inter prediction information candidate from inter prediction information of a block spatially neighboring a coding target block and setting the spatial inter prediction information candidate as an inter prediction information candidate of the coding target block; and a history-based inter prediction information candidate derivation step of deriving a history-based inter prediction information candidate from the inter prediction information stored in the history-based motion vector predictor candidate list and setting the history-based inter prediction information candidate as an inter prediction information candidate of the coding target block, wherein the history-based inter prediction information candidate derivation step includes comparing a predetermined number of inter prediction information elements from latest inter prediction information within the inter prediction information stored in the history-based motion vector predictor candidate list with the spatial inter prediction information candidate and setting the inter prediction information as a history-based inter prediction information candidate when a value of the inter prediction information is different.

A picture decoding device according to a fourth aspect of the present invention includes a coding information storage unit configured to store inter prediction information used in inter prediction of a decoded block in a history-based motion vector predictor candidate list; a spatial inter prediction information candidate derivation unit configured to derive a spatial inter prediction information candidate from inter prediction information of a block spatially neighboring a decoding target block and set the spatial inter prediction information candidate as an inter prediction information candidate of the decoding target block; and a history-based inter prediction information candidate derivation unit configured to derive a history-based inter prediction information candidate from the inter prediction information stored in the history-based motion vector predictor candidate list and set the history-based inter prediction information candidate as an inter prediction information candidate of the decoding target block, wherein the history-based inter prediction information candidate derivation unit compares a predetermined number of inter prediction information elements from latest inter prediction information within the inter prediction information stored in the history-based motion vector predictor candidate list with the spatial inter prediction information candidate and sets the inter prediction information as a history-based inter prediction information candidate when a value of the inter prediction information is different.

A picture decoding method according to a fifth aspect of the present invention includes a coding information storage step of storing inter prediction information used in inter prediction of a decoded block in a history-based motion vector predictor candidate list; a spatial inter prediction information candidate derivation step of deriving a spatial inter prediction information candidate from inter prediction information of a block spatially neighboring a decoding target block and setting the spatial inter prediction information candidate as an inter prediction information candidate of the decoding target block; and a history-based inter prediction information candidate derivation step of deriving a history-based inter prediction information candidate from the inter prediction information stored in the history-based motion vector predictor candidate list and setting the history-based inter prediction information candidate as an inter prediction information candidate of the decoding target block, wherein the history-based inter prediction information candidate derivation step includes comparing a predetermined number of inter prediction information elements from latest inter prediction information within the inter prediction information stored in the history-based motion vector predictor candidate list with the spatial inter prediction information candidate and setting the inter prediction information as a history-based inter prediction information candidate when a value of the inter prediction information is different.

A picture decoding program according to a sixth aspect of the present invention causes a computer to execute: a coding information storage step of storing inter prediction information used in inter prediction of a decoded block in a history-based motion vector predictor candidate list; a spatial inter prediction information candidate derivation step of deriving a spatial inter prediction information candidate from inter prediction information of a block spatially neighboring a decoding target block and setting the spatial inter prediction information candidate as an inter prediction information candidate of the decoding target block; and a history-based inter prediction information candidate derivation step of deriving a history-based inter prediction information candidate from the inter prediction information stored in the history-based motion vector predictor candidate list and setting the history-based inter prediction information candidate as an inter prediction information candidate of the decoding target block, wherein the history-based inter prediction information candidate derivation step includes comparing a predetermined number of inter prediction information elements from latest inter prediction information within the inter prediction information stored in the history-based motion vector predictor candidate list with the spatial inter prediction information candidate and setting the inter prediction information as a history-based inter prediction information candidate when a value of the inter prediction information is different.

According to the present invention, it is possible to implement a highly efficient picture coding/decoding process with a low load.

BRIEF DESCRIPTION OF THE DRAWINGS

FIG. 6D is a diagram showing a divided shape of a block.

FIG. 6E is a diagram showing a divided shape of a block.

FIG. 9 is syntax for expressing a shape of block split.

FIG. 12 is syntax for expressing a coding block prediction mode.

FIG. 13 is a diagram showing correspondence between a syntax element related to inter prediction and a mode.

FIG. 31A is an explanatory diagram showing an example of a history-based motion vector predictor candidate list update process.

FIG. 31B is an explanatory diagram showing an example of a history-based motion vector predictor candidate list update process.

FIG. 31C is an explanatory diagram showing an example of a history-based motion vector predictor candidate list update process.

FIG. 38A is a diagram showing an example of elements of a history-based motion vector predictor candidate list in a case in which a coding block of a coding/decoding target is an upper right block when the block is divided into four parts.

FIG. 38B is a diagram showing an example of elements of a history-based motion vector predictor candidate list in a case in which a coding block of a coding/decoding target is a lower left block when the block is divided into four parts.

FIG. 38C is a diagram showing an example of elements of a history-based motion vector predictor candidate list in a case in which a coding block of a coding/decoding target is a lower right block when the block is divided into four parts.

FIG. 38D is a diagram showing checking/comparison of elements of the history-based motion vector predictor candidate list.

DETAILED DESCRIPTION OF THE INVENTION

Technology and technical terms used in the embodiment will be defined.

<Tree Block>

Figure 4:
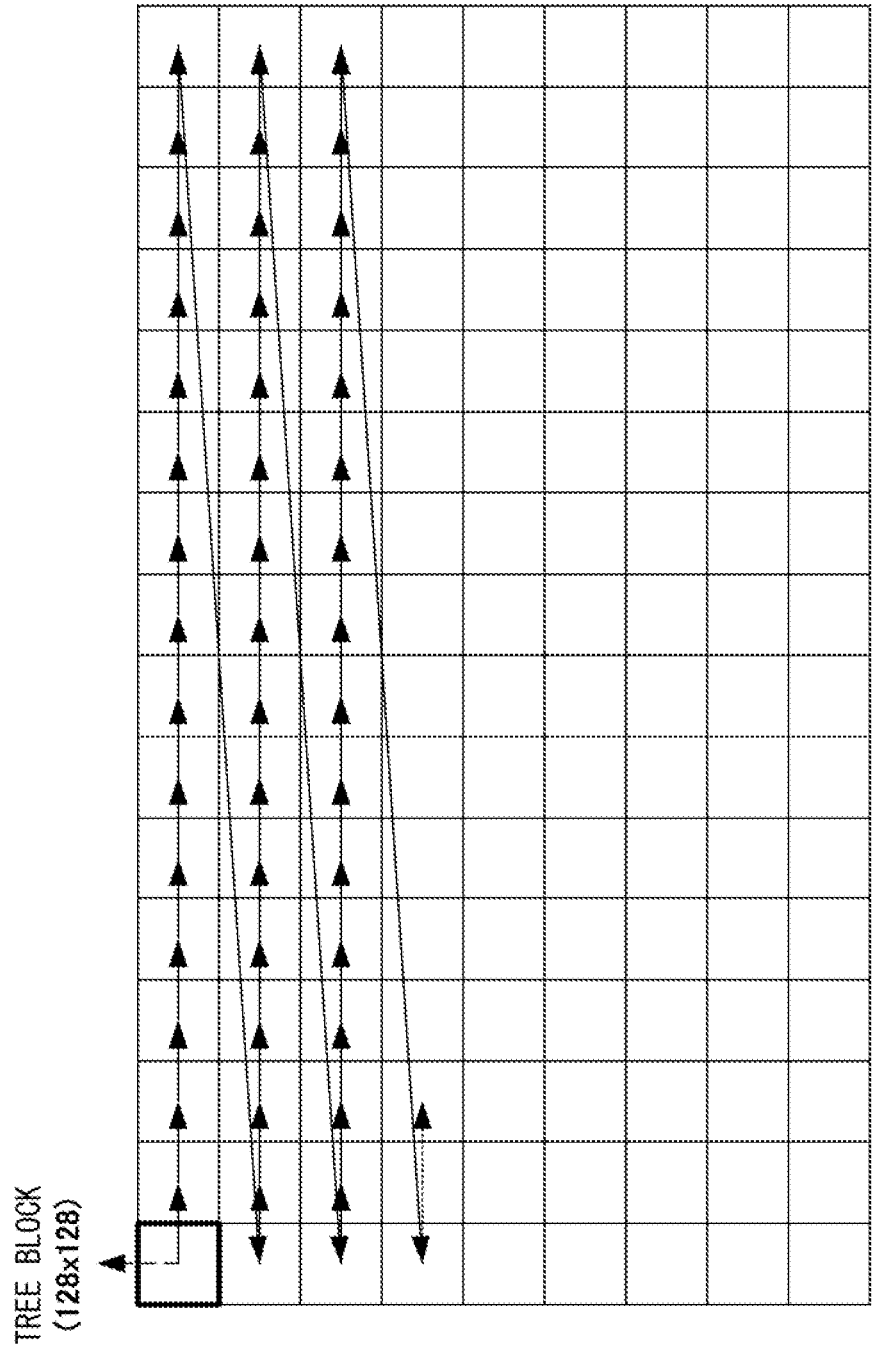
FIG. 4 is a diagram showing a state in which an input picture is divided into tree blocks.

In the embodiment, a coding/decoding target picture is equally divided into units of a predetermined size. This unit is defined as a tree block. Although the size of the tree block is 128×128 samples in FIG. 4, the size of the tree block is not limited thereto and any size may be set. The tree block of a target (corresponding to a coding target in a coding process or a decoding target in the decoding process) is switched in a raster scan order, i.e., from left to right and from top to bottom. The inside of each tree block can be further recursively divided. A block which is a coding/decoding target after the tree block is recursively divided is defined as a coding block. Also, a tree block and a coding block are collectively defined as blocks. Efficient coding is enabled by performing appropriate block split. The tree block size may be a fixed value predetermined by the coding device and the decoding device or the tree block size determined by the coding device may be configured to be transmitted to the decoding device. Here, a maximum size of the tree block is 128×128 samples and a minimum size of the tree block is 16×16 samples. Also, a maximum size of the coding block is 64×64 samples and a minimum size of the coding block is 4×4 samples.

<Prediction Mode>

Switching is performed between intra prediction (MODE_INTRA) in which prediction is performed from a processed picture signal of the target picture and inter prediction (MODE_INTER) in which prediction is performed from a picture signal of a processed picture in units of target coding blocks.

The processed picture is used for a picture, a picture signal, a tree block, a block, a coding block, and the like obtained by decoding a signal completely coded in the coding process and is used for a picture, a picture signal, a tree block, a block, a coding block, and the like obtained by completing decoding in a decoding process.

The mode in which the intra prediction (MODE_INTRA) and the inter prediction (MODE_INTER) are identified is defined as the prediction mode (PredMode). The prediction mode (PredMode) has intra prediction (MODE_INTRA) or inter prediction (MODE_INTER) as a value.

<Inter Prediction>

In inter prediction in which prediction is performed from a picture signal of a processed picture, a plurality of processed pictures can be used as reference pictures. In order to manage a plurality of reference pictures, two types of reference lists of L0 (reference list 0) and L1 (reference list 1) are defined and a reference picture is identified using each reference index. In a P slice, L0-prediction (Pred_L0) can be used. In a B slice, L0-prediction (Pred_L0), L1-prediction (Pred_L1), and bi-prediction (Pred_BI) can be used. The L0-prediction (Pred_L0) is inter prediction that refers to a reference picture managed in L0 and the L1-prediction (Pred_L1) is inter prediction that refers to a reference picture managed in L1. The bi-prediction (Pred_BI) is inter prediction in which both the L0-prediction and the L1-prediction are performed and one reference picture managed in each of L0 and L1 is referred to. Information for identifying the L0-prediction, the L1-prediction, and the bi-prediction is defined as an inter prediction mode. In the subsequent processing, constants and variables with the subscript LX in the output are assumed to be processed for each of L0 and L1.

<Motion Vector Predictor Mode>

The motion vector predictor mode is a mode for transmitting an index for identifying a motion vector predictor, a motion vector difference, an inter prediction mode, and a reference index and determining inter prediction information of a target block. The motion vector predictor is derived from a motion vector predictor candidate derived from a processed block neighboring the target block or a block located at the same position as or in the vicinity of (near) the target block among blocks belonging to the processed picture and an index for identifying a motion vector predictor.

<Merge Mode>

The merge mode is a mode in which inter prediction information of a target block is derived from inter prediction information of a processed block neighboring a target block or a block located at the same position as or in the vicinity of (near) the target block among blocks belonging to the processed picture without transmitting a motion vector difference and a reference index.

The processed block neighboring the target block and the inter prediction information of the processed block are defined as spatial merging candidates. The block located at the same position as or in the vicinity of (near) the target block among the blocks belonging to the processed picture and inter prediction information derived from the inter prediction information of the block are defined as temporal merging candidates. Each merging candidate is registered in a merging candidate list, and a merging candidate used for prediction of a target block is identified by a merge index.

<Neighboring Block>

Figure 11:
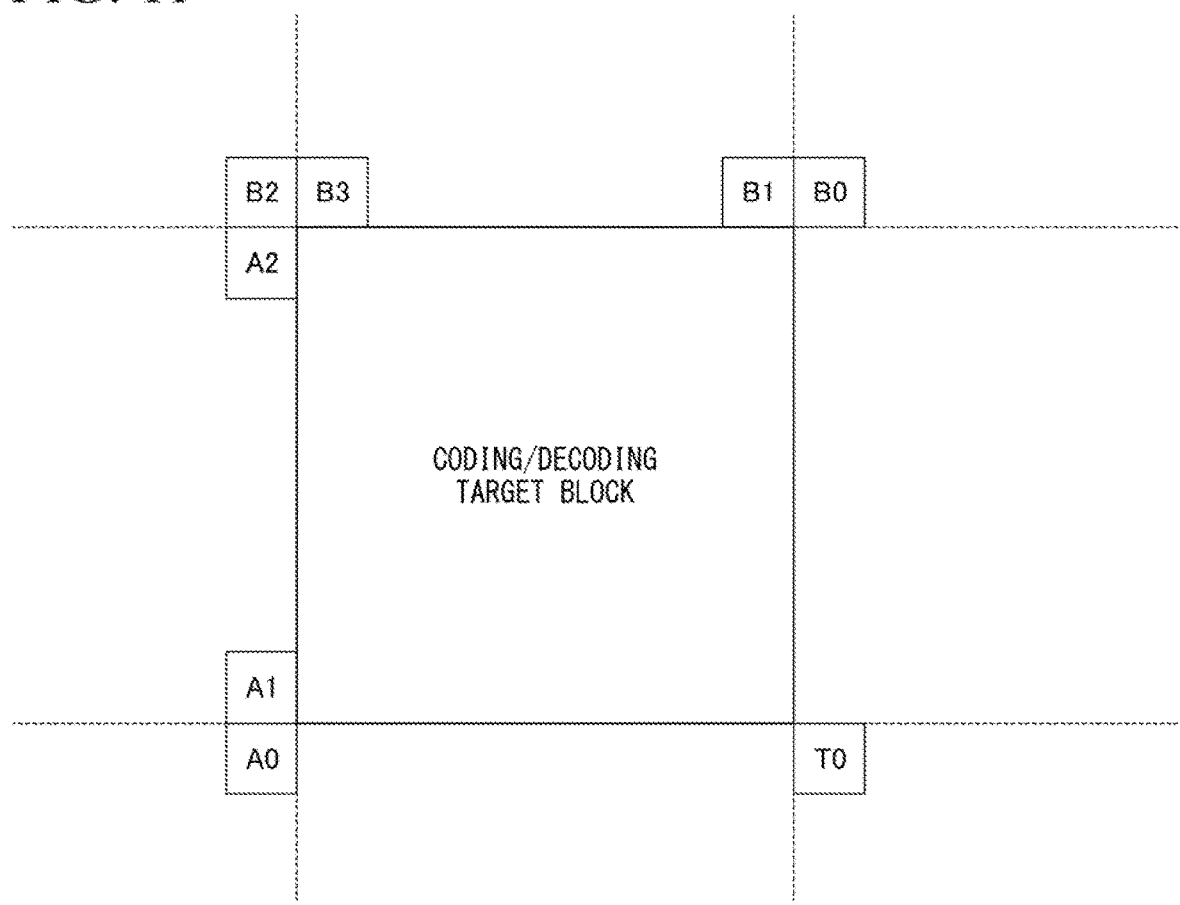
FIG. 11 is an explanatory diagram showing a reference block of inter prediction.

FIG. 11 is an explanatory diagram showing a reference block that is referred to in deriving inter prediction information in the motion vector predictor mode and the merge mode. A0, A1, A2, B0, B1, B2, and B3 are processed blocks neighboring the target block. T0 is a block located at the same position as or in the vicinity of (near) the target block in the target picture among blocks belonging to the processed picture.

A1 and A2 are blocks located on the left side of the target coding block and neighboring the target coding block. B1 and B3 are blocks located on the upper side of the target coding block and neighboring the target coding block. A0, B0, and B2 are blocks located at the lower left, upper right, and upper left of the target coding block, respectively.

Details of how to handle neighboring blocks in the motion vector predictor mode and the merge mode will be described below.

<Affine Motion Compensation>

The affine motion compensation is a process of performing motion compensation by dividing a coding block into subblocks of a predetermined unit and individually determining a motion vector for each of the subblocks into which the coding block is divided. The motion vector of each subblock is derived on the basis of one or more control points derived from inter prediction information of a processed block neighboring the target block or a block located at the same position as or in the vicinity of (near) the target block among blocks belonging to the processed picture. Although the size of the subblock is 4×4 samples in the present embodiment, the size of the subblock is not limited thereto and a motion vector may be derived in units of samples.

Figure 14:
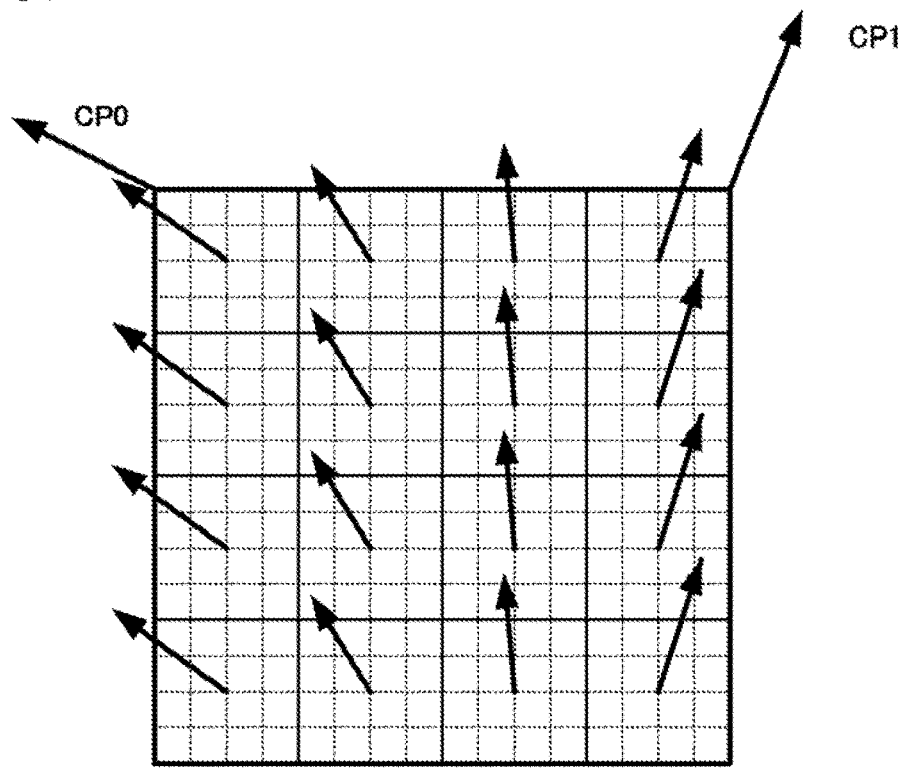
FIG. 14 is an explanatory diagram showing affine motion compensation of two control points.

An example of affine motion compensation in the case of two control points is shown in FIG. 14. In this case, the two control points have two parameters of a horizontal direction component and a vertical direction component. Thus, an affine transform in the case of two control points is referred to as a four-parameter affine transform. CP1 and CP2 of FIG. 14 are control points.

Figure 15:
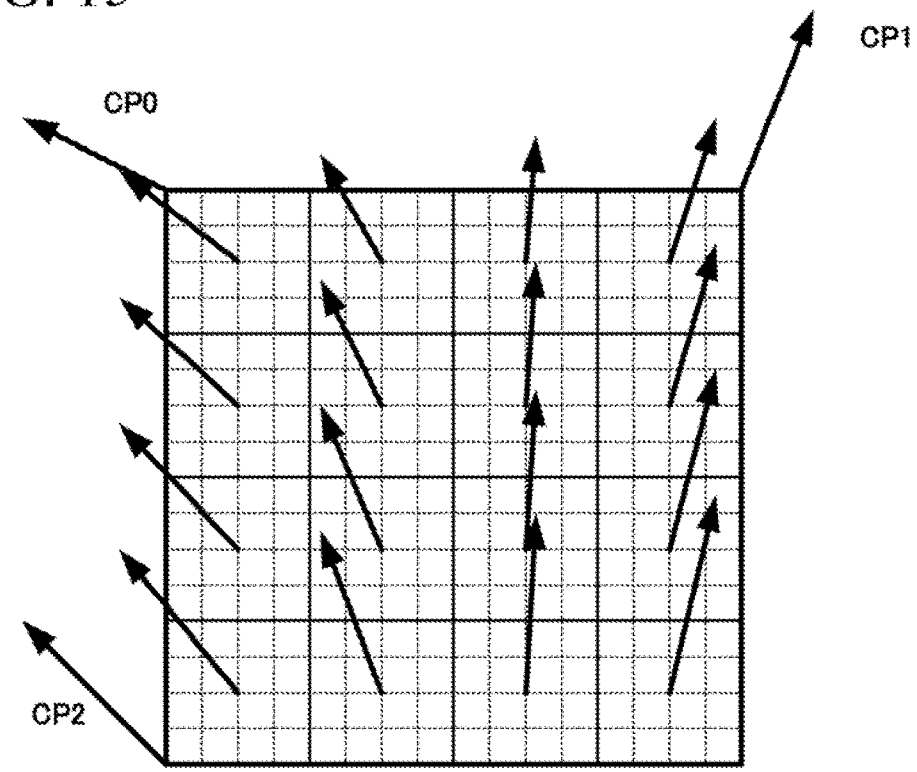
FIG. 15 is an explanatory diagram showing affine motion compensation of three control points.

An example of affine motion compensation in the case of three control points is shown in FIG. 15. In this case, the three control points have two parameters of a horizontal direction component and a vertical direction component. Thus, an affine transform in the case of three control points is referred to as a six-parameter affine transform. CP1, CP2, and CP3 of FIG. 15 are control points.

Affine motion compensation can be used in both the motion vector predictor mode and the merge mode. A mode in which the affine motion compensation is applied in the motion vector predictor mode is defined as a subblock-based motion vector predictor mode, and a mode in which the affine motion compensation is applied in the merge mode is defined as a subblock-based merge mode.

<Inter Prediction Syntax>

The syntax related to inter prediction will be described using FIGS. 12 and 13.

The flag merge_flag in FIG. 12 indicates whether the target coding block is set to the merge mode or the motion vector predictor mode. The flag_merge_affine_flag indicates whether or not the subblock-based merge mode is applied to the target coding block of the merge mode. The flag inter_affine_flag indicates whether or not to apply the subblock-based motion vector predictor mode to the target coding block of the motion vector predictor mode. The flag cu_affine_type_flag is used to determine the number of control points in the subblock-based motion vector predictor mode.

FIG. 13 shows a value of each syntax element and a prediction method corresponding thereto. The normal merge mode corresponds to merge_flag=1 and merge_affine_flag=0 and is not a subblock-based merge mode. The subblock-based merge mode corresponds to merge_flag=1 and merge_affine_flag=1. The normal motion vector predictor mode corresponds to merge_flag=0 and inter_affine_flag=0. The normal motion vector predictor mode is a motion vector predictor merge mode that is not a subblock-based motion vector predictor mode. The subblock-based motion vector predictor mode corresponds to merge_flag=0 and inter_affine_flag=1. When merge_flag=0 and inter_affine_flag=1, cu_affine_type_flag is further transmitted to determine the number of control points.

<POC>

A picture order count (POC) is a variable associated with a picture to be coded and is set to a value that is incremented by 1 according to an output order of pictures. According to the POC value, it is possible to discriminate whether pictures are the same, to discriminate an anteroposterior relationship between pictures in the output order, or to derive the distance between pictures. For example, if the POCs of two pictures have the same value, it can be determined that they are the same picture. When the POCs of two pictures have different values, it can be determined that the picture with the smaller POC value is the picture to be output first. A difference between the POCs of the two pictures indicates an inter-picture distance in a time axis direction.

First Embodiment

The picture coding device 100 and the picture decoding device 200 according to the first embodiment of the present invention will be described.

Figure 1:
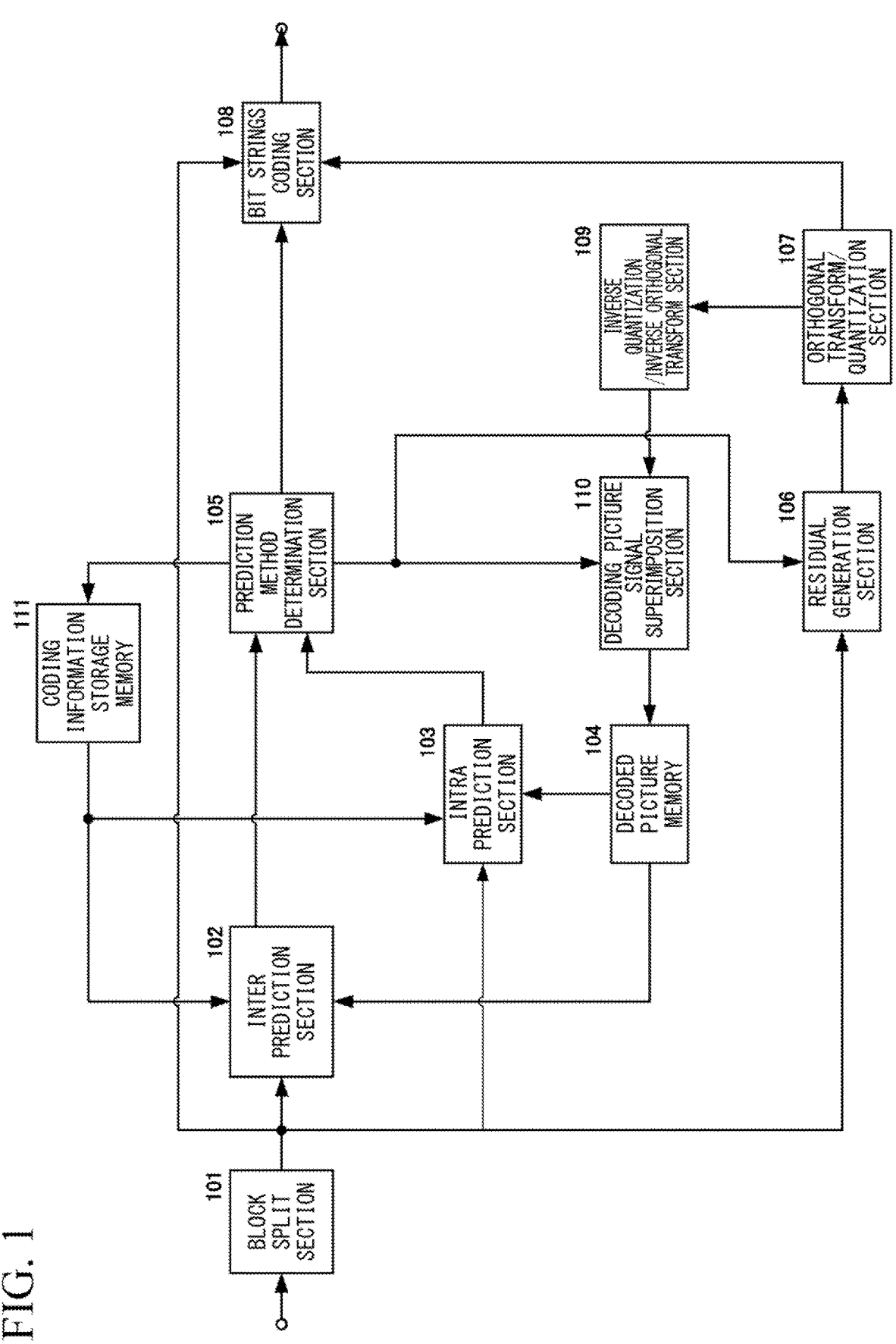
FIG. 1 is a block diagram of a picture coding device according to an embodiment of the present invention.

FIG. 1 is a block diagram of a picture coding device 100 according to the first embodiment. The picture coding device 100 according to the embodiment includes a block split unit 101, an inter prediction unit 102, an intra prediction unit 103, a decoded picture memory 104, a prediction method determination unit 105, a residual generation unit 106, an orthogonal transform/quantization unit 107, a bit strings coding unit 108, an inverse quantization/inverse orthogonal transform unit 109, a decoding picture signal superimposition unit 110, and a coding information storage memory 111.

The block split unit 101 recursively divides the input picture to generate a coding block. The block split unit 101 includes a quad split unit that divides a split target block in the horizontal direction and the vertical direction and a binary-ternary split unit that divides the split target block in either the horizontal direction or the vertical direction. The block split unit 101 sets the generated coding block as a target coding block and supplies a picture signal of the target coding block to the inter prediction unit 102, the intra prediction unit 103, and the residual generation unit 106. Also, the block split unit 101 supplies information indicating a determined recursive split structure to the bit strings coding unit 108. The detailed operation of the block split unit 101 will be described below.

The inter prediction unit 102 performs inter prediction of the target coding block. The inter prediction unit 102 derives a plurality of inter prediction information candidates from the inter prediction information stored in the coding information storage memory 111 and the decoded picture signal stored in the decoded picture memory 104, selects a suitable inter prediction mode from the plurality of derived candidates, and supplies the selected inter prediction mode and a predicted picture signal according to the selected inter prediction mode to the prediction method determination unit 105. A detailed configuration and operation of the inter prediction unit 102 will be described below.

The intra prediction unit 103 performs intra prediction of the target coding block. The intra prediction unit 103 refers to a decoded picture signal stored in the decoded picture memory 104 as a reference sample and generates a predicted picture signal according to intra prediction based on coding information such as an intra prediction mode stored in the coding information storage memory 111. In the intra prediction, the intra prediction unit 103 selects a suitable intra prediction mode from among a plurality of intra prediction modes and supplies a selected intra prediction mode and a predicted picture signal according to the selected intra prediction mode to the prediction method determination unit 105.

Figure 10A:
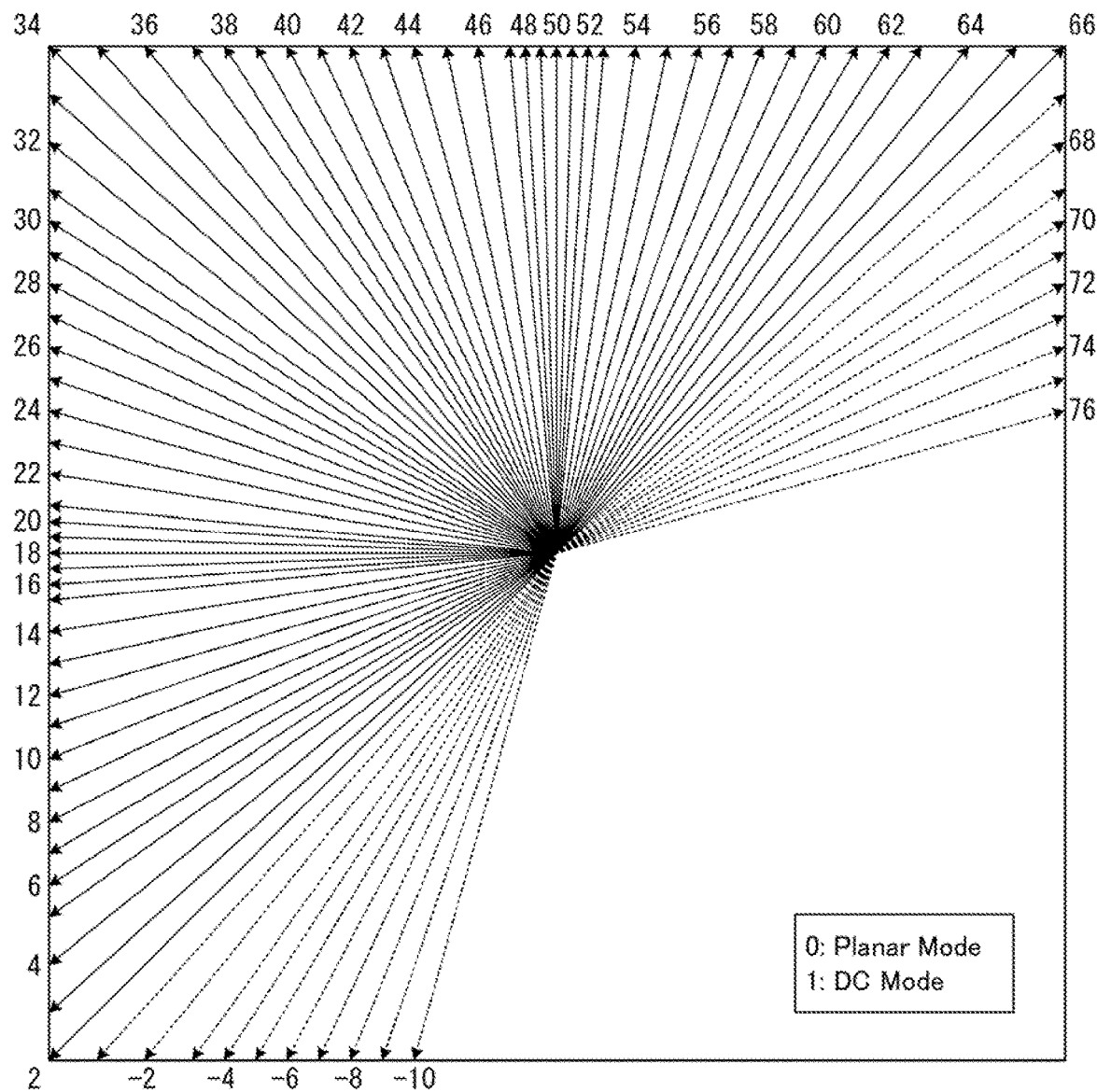
FIG. 10A is an explanatory diagram showing intra prediction.
Figure 10B:
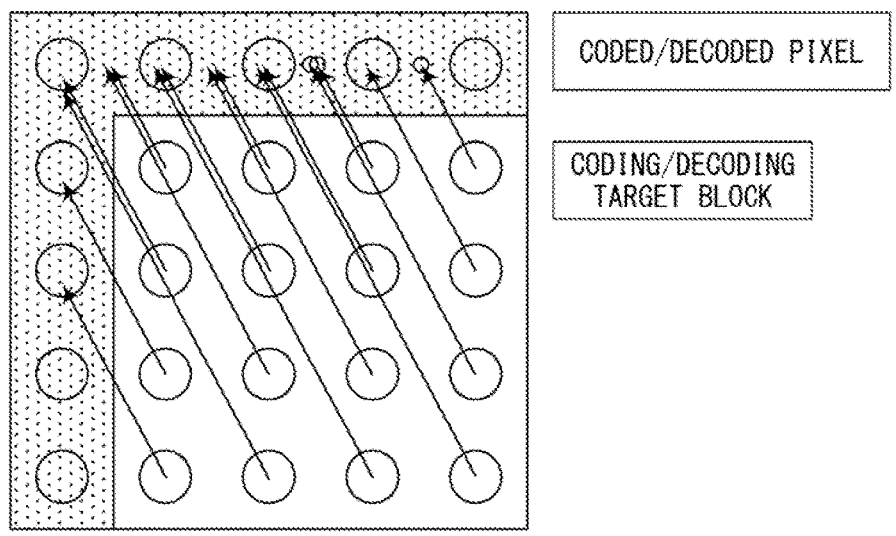
FIG. 10B is an explanatory diagram showing intra prediction.

Examples of intra prediction are shown in FIGS. 10A and 10B. FIG. 10A shows the correspondence between a prediction direction of intra prediction and an intra prediction mode number. For example, in intra prediction mode 50, an intra prediction picture is generated by copying reference samples in the vertical direction. Intra prediction mode 1 is a DC mode and is a mode in which all sample values of the target block are an average value of reference samples. Intra prediction mode 0 is a planar mode and is a mode for creating a two-dimensional intra prediction picture from reference samples in the vertical and horizontal directions. FIG. 10B is an example in which an intra prediction picture is generated in the case of intra prediction mode 40. The intra prediction unit 103 copies the value of the reference sample in the direction indicated by the intra prediction mode with respect to each sample of the target block. When the reference sample of the intra prediction mode is not at an integer position, the intra prediction unit 103 determines a reference sample value according to an interpolation from reference sample values of neighboring integer positions.

The decoded picture memory 104 stores a decoded picture generated by the decoding picture signal superimposition unit 110. The decoded picture memory 104 supplies the stored decoded picture to the inter prediction unit 102 and the intra prediction unit 103.

The prediction method determination unit 105 determines the optimum prediction mode by evaluating each of intra prediction and inter prediction using coding information, a residual code amount, an amount of distortion between a predicted picture signal and a target picture signal, and the like. In the case of intra prediction, the prediction method determination unit 105 supplies intra prediction information such as an intra prediction mode as the coding information to the bit strings coding unit 108. In the case of the inter prediction merge mode, the prediction method determination unit 105 supplies inter prediction information such as a merge index and information indicating whether or not the mode is a subblock-based merge mode (a subblock-based merge flag) as the coding information to the bit strings coding unit 108. In the case of the motion vector predictor mode of inter prediction, the prediction method determination unit 105 supplies inter prediction information such as the inter prediction mode, a motion vector predictor index, reference indices of L0 and L1, a motion vector difference, and information indicating whether or not the mode is a subblock-based motion vector predictor mode (a subblock-based motion vector predictor flag) as the coding information to the bit strings coding unit 108. Further, the prediction method determination unit 105 supplies the determined coding information to the coding information storage memory 111. The prediction method determination unit 105 supplies a predicted picture signal to the residual generation unit 106 and the decoding picture signal superimposition unit 110.

The residual generation unit 106 generates a residual by subtracting the predicted picture signal from the target picture signal and supplies the residual to the orthogonal transform/quantization unit 107.

The orthogonal transform/quantization unit 107 performs an orthogonal transform and quantization on the residual in accordance with the quantization parameter to generate an orthogonally transformed/quantized residual and supplies the generated residual to the bit strings coding unit 108 and the inverse quantization/inverse orthogonal transform unit 109.

The bit strings coding unit 108 codes coding information according to the prediction method determined by the prediction method determination unit 105 for each coding block in addition to information of units of sequences, pictures, slices, and coding blocks. Specifically, the bit strings coding unit 108 codes the prediction mode PredMode for each coding block. When the prediction mode is inter prediction (MODE_INTER), the bit strings coding unit 108 codes coding information (inter prediction information) such as a flag for discriminating whether or not the mode is a merge mode, a subblock-based merge flag, a merge index when the mode is the merge mode, an inter prediction mode when the mode is not the merge mode, a motion vector predictor index, information about a motion vector difference, and a subblock-based motion vector predictor flag in accordance with specified syntax (a bit strings syntax rule) and generates first bit strings. When the prediction mode is intra prediction (MODE_INTRA), coding information (intra prediction information) such as the intra prediction mode is coded in accordance with specified syntax (a bit strings syntax rule) and first bit strings is generated. Also, the bit strings coding unit 108 entropy-codes the orthogonally transformed and quantized residual in accordance with specified syntax to generate second bit strings. The bit strings coding unit 108 multiplexes the first bit strings and the second bit strings in accordance with specified syntax and outputs a bitstream.

The inverse quantization/inverse orthogonal transform unit 109 calculates the residual by performing inverse quantization and an inverse orthogonal transform on the orthogonally transformed/quantized residual supplied from the orthogonal transform/quantization unit 107 and supplies the calculated residual to the decoding picture signal superimposition unit 110.

The decoding picture signal superimposition unit 110 superimposes the predicted picture signal according to the determination of the prediction method determination unit 105 and the residual inversely quantized and inversely orthogonally transformed by the inverse quantization/inverse orthogonal transform unit 109 to generate a decoded picture and stores the decoded picture in the decoded picture memory 104. Also, the decoding picture signal superimposition unit 110 may store the decoded picture in the decoded picture memory 104 after performing a filtering process of reducing distortion such as block distortion due to coding on the decoded picture.

The coding information storage memory 111 stores coding information such as a prediction mode (inter prediction or intra prediction) determined by the prediction method determination unit 105. In the case of the inter prediction, the coding information stored in the coding information storage memory 111 includes inter prediction information such as a determined motion vector, reference indices of reference lists L0 and L1, and a history-based motion vector predictor candidate list. Also, in the case of the inter prediction merge mode, the coding information stored in the coding information storage memory 111 includes inter prediction information such as a merge index and information indicating whether or not the mode is the subblock-based merge mode (a subblock-based merge flag) in addition to the above-described information. Also, in the case of the motion vector predictor mode of the inter prediction, the coding information stored in the coding information storage memory 111 includes inter prediction information such as an inter prediction mode, a motion vector predictor index, a motion vector difference, and information indicating whether or not the mode is the subblock-based motion vector predictor mode (a subblock-based motion vector predictor flag) in addition to the above-described information. In the case of the intra prediction, the coding information stored in the coding information storage memory 111 includes intra prediction information such as the determined intra prediction mode.

Figure 2:
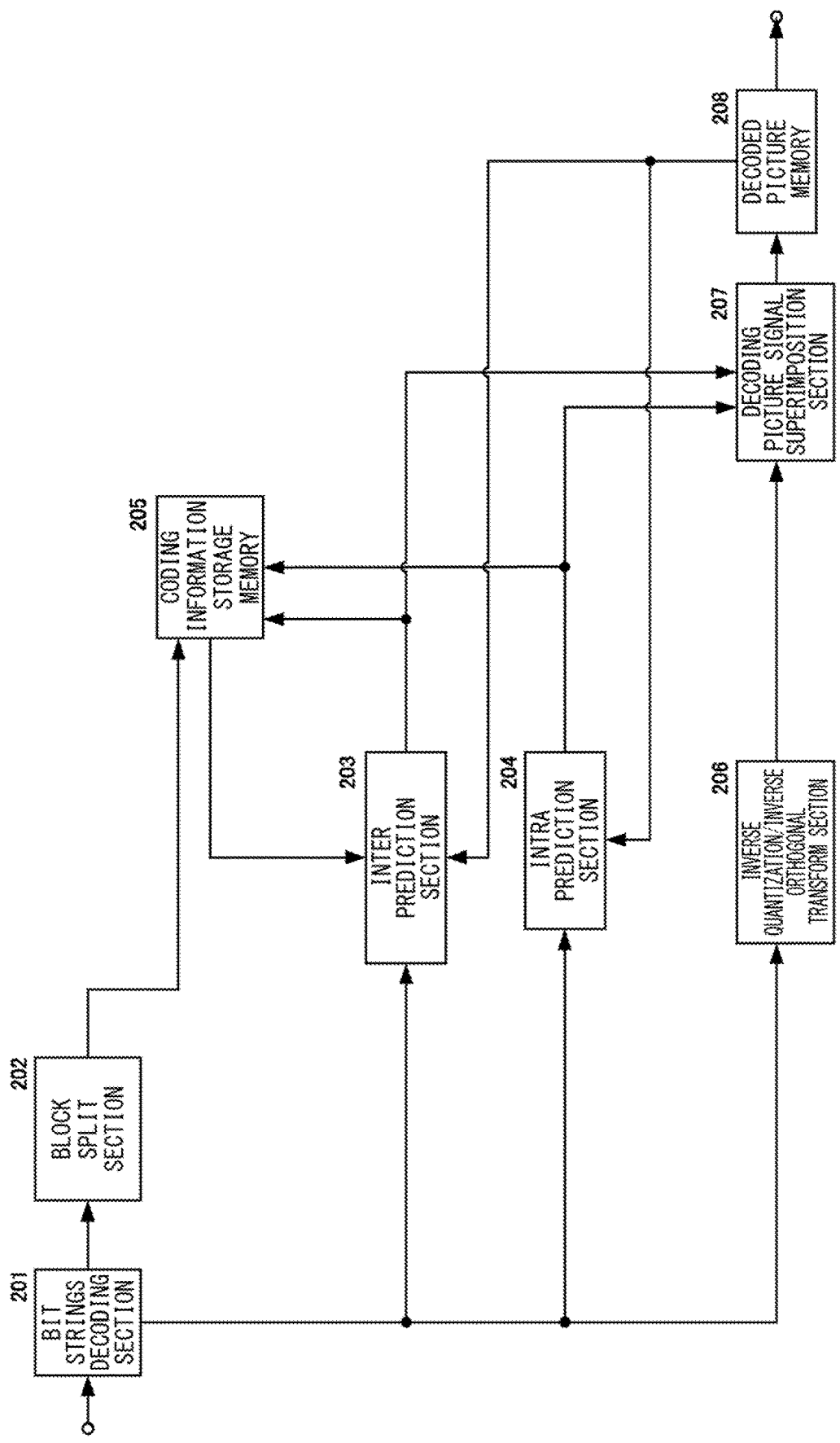
FIG. 2 is a block diagram of a picture decoding device according to an embodiment of the present invention.

FIG. 2 is a block diagram showing a configuration of the picture decoding device according to the embodiment of the present invention corresponding to the picture coding device of FIG. 1. The picture decoding device according to the embodiment includes a bit strings decoding unit 201, a block split unit 202, an inter prediction unit 203, an intra prediction unit 204, a coding information storage memory 205, an inverse quantization/inverse orthogonal transform unit 206, a decoding picture signal superimposition unit 207, and a decoded picture memory 208.

Because a decoding process of the picture decoding device of FIG. 2 corresponds to a decoding process provided in the picture coding device of FIG. 1, the components of the coding information storage memory 205, the inverse quantization/inverse orthogonal transform unit 206, the decoding picture signal superimposition unit 207, and the decoded picture memory 208 of FIG. 2 have functions corresponding to the components of the coding information storage memory 111, the inverse quantization/inverse orthogonal transform unit 109, the decoding picture signal superimposition unit 110, and the decoded picture memory 104 of the picture coding device of FIG. 1.

A bitstream supplied to the bit strings decoding unit 201 is separated in accordance with a specified syntax rule. The bit strings decoding unit 201 decodes a separated first bit string, and obtains information of units of sequences, pictures, slices, coding blocks and coding information of units of coding blocks. Specifically, the bit strings decoding unit 201 decodes a prediction mode PredMode for discriminating inter prediction (MODE_INTER) or intra prediction (MODE_INTRA) in units of coding blocks. When the prediction mode is inter prediction (MODE_INTER), the bit strings decoding unit 201 decodes coding information (inter prediction information) about a flag for discriminating whether or not the mode is a merge mode, a merge index when the mode is the merge mode, a subblock-based merge flag, an inter prediction mode when the mode is a motion vector predictor mode, a motion vector predictor index, a motion vector difference, a subblock-based motion vector predictor flag, and the like in accordance with specified syntax and supplies the coding information (the inter prediction information) to the coding information storage memory 205 via the inter prediction unit 203 and the block split unit 202. When the prediction mode is intra prediction (MODE_INTRA), coding information (intra prediction information) such as the intra prediction mode is decoded in accordance with specified syntax and the coding information (the intra prediction information) is supplied to the coding information storage memory 205 via the inter prediction unit 203 or the intra prediction unit 204 and the block split unit 202. The bit strings decoding unit 201 decodes separated second bit strings to calculate an orthogonally transformed/quantized residual and supplies the orthogonally transformed/quantized residual to the inverse quantization/inverse orthogonal transform unit 206.

When the prediction mode PredMode of the target coding block is the motion vector predictor mode in the inter prediction (MODE_INTER), the inter prediction unit 203 derives a plurality of motion vector predictor candidates using coding information of the previously decoded picture signal stored in the coding information storage memory 205 and registers the plurality of derived motion vector predictor candidates in the motion vector predictor candidate list to be described below. The inter prediction unit 203 selects a motion vector predictor according to the motion vector predictor index decoded and supplied by the bit strings decoding unit 201 from among the plurality of motion vector predictor candidates registered in the motion vector predictor candidate list, calculates a motion vector from the motion vector difference decoded by the bit strings decoding unit 201 and the selected motion vector predictor, and stores the calculated motion vector in the coding information storage memory 205 together with other coding information. The coding information of the coding block supplied/stored here is a prediction mode PredMode, flags predFlagL0[xP][yP] and predFlagL1[xP][yP] indicating whether or not to use L0-prediction and L1-prediction, reference indices refIdxL0[xP][yP] and refIdxL1[xP][yP] of L0 and L1, motion vectors mvL0[xP][yP] and mvL1[xP][yP] of L0 and L1, and the like. Here, xP and yP are indices indicating a position of an upper left sample of the coding block within the picture. When the prediction mode PredMode is inter prediction (MODE_INTER) and the inter prediction mode is L0-prediction (Pred_L0), the flag predFlagL0 indicating whether or not to use L0-prediction is 1, and the flag predFlagL1 indicating whether or not to use L1-prediction is 0. When the inter prediction mode is L1-prediction (Pred_L1), the flag predFlagL0 indicating whether or not to use L0-prediction is 0 and the flag predFlagL1 indicating whether or not to use L1-prediction is 1. When the inter prediction mode is bi-prediction (Pred_BI), both the flag predFlagL0 indicating whether or not to use L0-prediction and the flag predFlagL1 indicating whether or not to use L1-prediction are 1. Further, merging candidates are derived in the merge mode in which the prediction mode PredMode of the coding block of the target is inter prediction (MODE_INTER). A plurality of merging candidates are derived using the coding information of the previously decoded coding blocks stored in the coding information storage memory 205 and are registered in a merging candidate list to be described below, a merging candidate corresponding to a merge index to be decoded and supplied by the bit strings decoding unit 201 is selected from among the plurality of merging candidates registered in the merging candidate list, and inter prediction information such as the flags predFlagL0[xP][yP] and predFlagL1[xP][yP] indicating whether or not to use L0-prediction and L1-prediction of the selected merging candidate, the reference indices refIdxL0[xP][yP] and refIdxL1[xP][yP] of L0 and L1, and the motion vectors mvL0[xP][yP] and mvL1[xP][yP] of L0 and L1 is stored in the coding information storage memory 205. Here, xP and yP are indices indicating the position of the upper left sample of the coding block in the picture. A detailed configuration and operation of the inter prediction unit 203 will be described below.

The intra prediction unit 204 performs intra prediction when the prediction mode PredMode of the coding block of the target is intra prediction (MODE_INTRA). The coding information decoded by the bit strings decoding unit 201 includes an intra prediction mode. The intra prediction unit 204 generates a predicted picture signal according to intra prediction from the decoded picture signal stored in the decoded picture memory 208 in accordance with the intra prediction mode included in the coding information decoded by the bit strings decoding unit 201 and supplies the generated predicted picture signal to the decoding picture signal superimposition unit 207. Because the intra prediction unit 204 corresponds to the intra prediction unit 103 of the picture coding device 100, a process similar to that of the intra prediction unit 103 is performed.

The inverse quantization/inverse orthogonal transform unit 206 performs an inverse orthogonal transform and inverse quantization on the orthogonally transformed/quantized residual decoded by the bit strings decoding unit 201 and obtains the inversely orthogonally transformed/inversely quantized residual.

The decoding picture signal superimposition unit 207 decodes a decoding picture signal by superimposing a predicted picture signal inter-predicted by the inter prediction unit 203 or a predicted picture signal intra-predicted by the intra prediction unit 204 and the residual inversely orthogonally transformed/inversely quantized by the inverse quantization/inverse orthogonal transform unit 206 and stores the decoded decoding picture signal in the decoded picture memory 208. At the time of storage in the decoded picture memory 208, the decoding picture signal superimposition unit 207 may store a decoded picture in the decoded picture memory 208 after a filtering process of reducing block distortion or the like due to coding is performed on the decoded picture.

Figure 3:
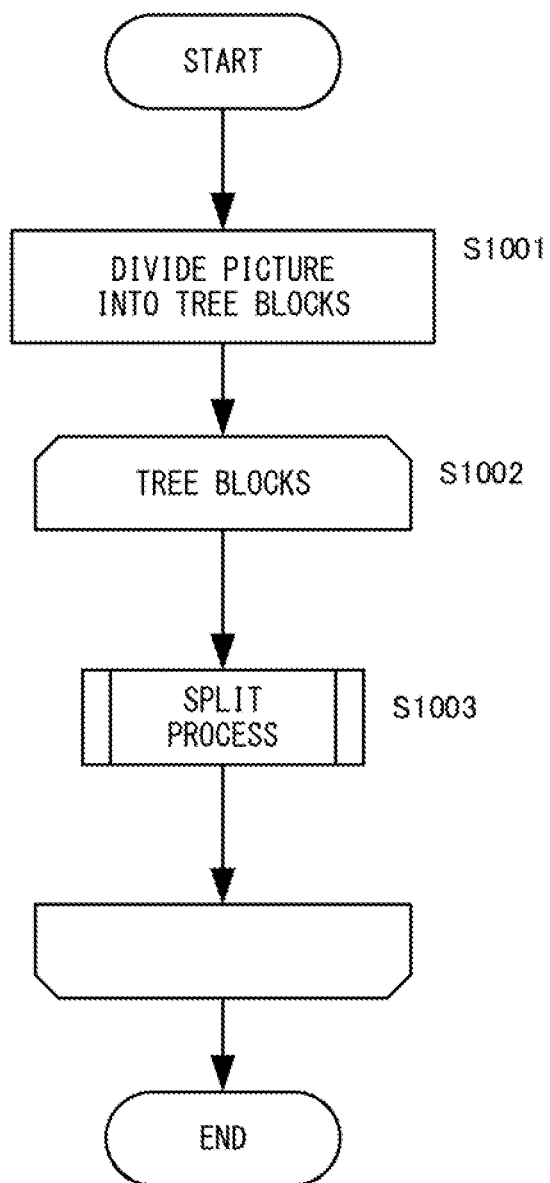
FIG. 3 is an explanatory flowchart showing an operation of dividing a tree block.

Next, an operation of the block split unit 101 in the picture coding device 100 will be described. FIG. 3 is a flowchart showing an operation of dividing a picture into tree blocks and further dividing each tree block. First, an input picture is divided into tree blocks having a predetermined size (step S1001). Each tree block is scanned in a predetermined order, i.e., raster scan order (step S1002), and the inside of the tree block of a target is divided (step S1003).

Figure 7:
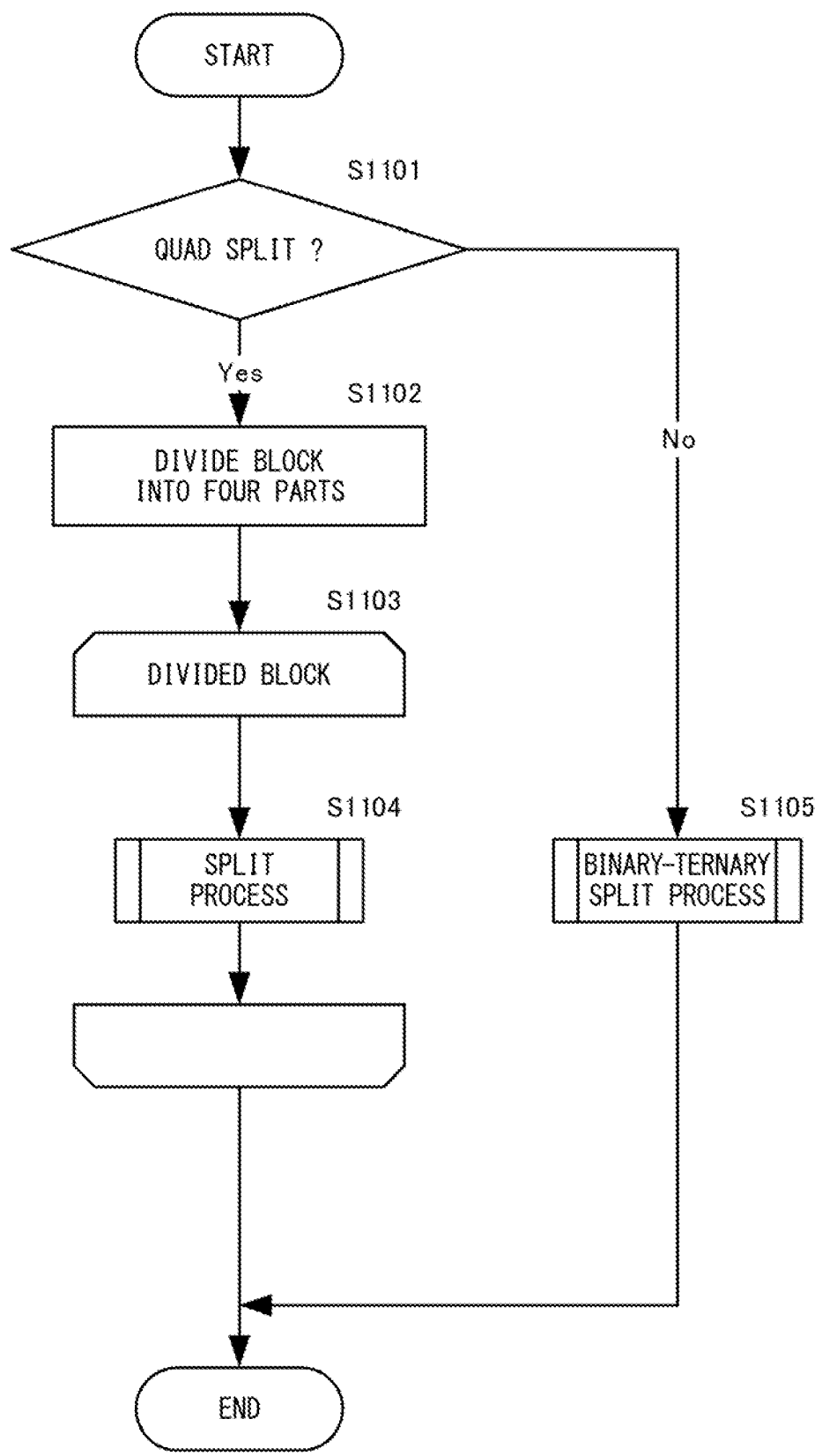
FIG. 7 is an explanatory flowchart showing an operation of dividing a block into four parts.

FIG. 7 is a flowchart showing a detailed operation of a split process of step S1003. First, it is determined whether or not a target block will be divided into four parts (step S1101).

Figure 5:
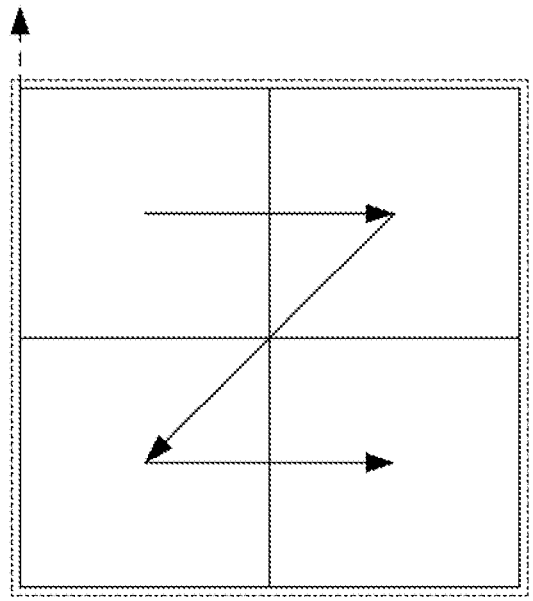
FIG. 5 is an explanatory diagram showing Z-scan.
Figure 6A:
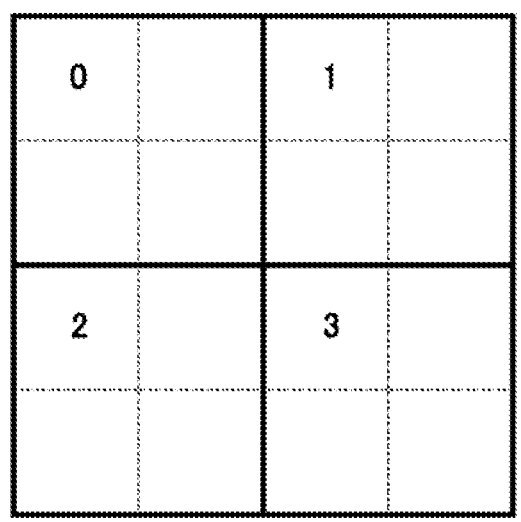
FIG. 6A is a diagram showing a divided shape of a block.

When it is determined that the target block will be divided into four parts, the target block is divided into four parts (step S1102). Each block obtained by dividing the target block is scanned in a Z-scan order, i.e., in the order of upper left, upper right, lower left, and lower right (step S1103). FIG. 5 shows an example of the Z-scan order, and reference numeral 601 of FIG. 6A shows an example in which the target block is divided into four parts. Numbers 0 to 3 of reference numeral 601 of FIG. 6A indicate the order of processing. Then, the split process of FIG. 7 is recursively executed for each block from the division in step S1101 (step S1104).

When it is determined that the target block will not be divided into four parts, a binary-ternary split is performed (step S1105).

Figure 8:
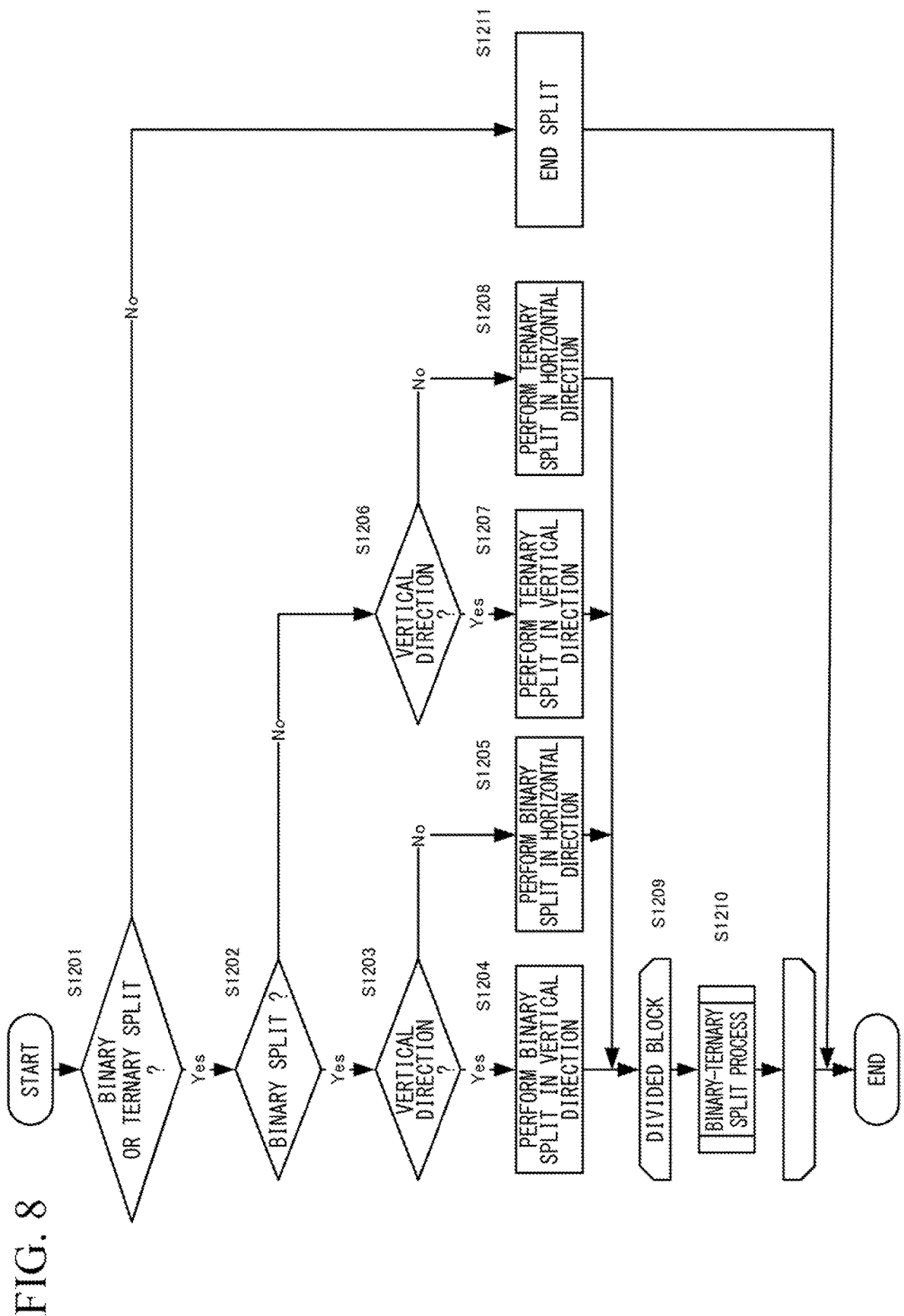
FIG. 8 is an explanatory flowchart showing an operation of dividing a block into two or three parts.

FIG. 8 is a flowchart showing the detailed operation of a binary-ternary split process of step S1105. First, it is determined whether or not a target block will be divided into two or three parts, i.e., whether or not either a binary or ternary split will be performed (step S1201).

When it is not determined that the target block will be divided into two or three parts, i.e., when it is determined that the target block will not be divided, the split ends (step S1211). That is, a recursive split process is not further performed on blocks divided according to the recursive split process.

When it is determined that the target block will be divided into two or three parts, it is further determined whether or not the target block will be divided into two parts (step S1202).

Figure 6B:
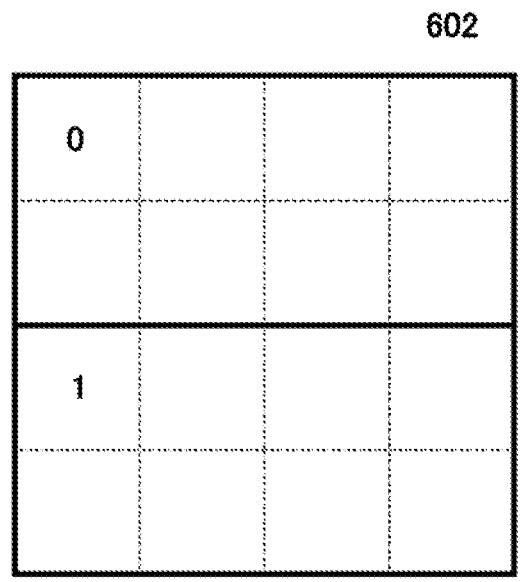
FIG. 6B is a diagram showing a divided shape of a block.

When it is determined that the target block will be divided into two parts, it is determined whether or not the target block will be divided into upper and lower parts (in a vertical direction) (step S1203). On the basis of a determination result, the target block is divided into two parts that are upper and lower parts (in the vertical direction) (step S1204) or the target block is divided into two parts that are left and right parts (in a horizontal direction) (step S1205). As a result of step S1204, the target block is divided into two parts that are upper and lower parts (in the vertical direction) as indicated by reference numeral 602 in FIG. 6B. As a result of step S1205, the target block is divided into two parts that are left and right parts (in the horizontal direction) as indicated by reference numeral 604 of FIG. 6D.

Figure 6C:
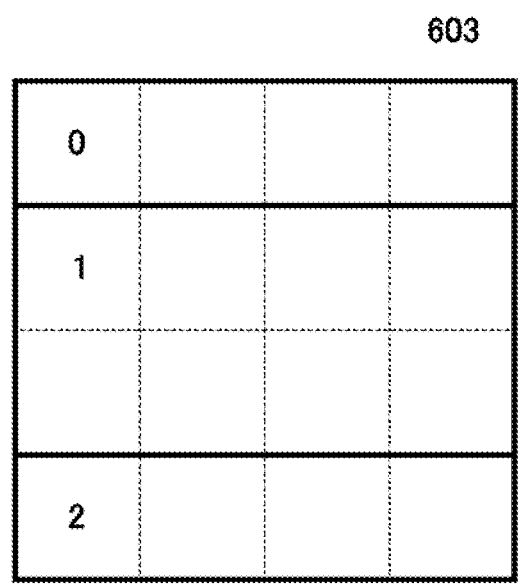
FIG. 6C is a diagram showing a divided shape of a block.
Figures 6D, 6E:
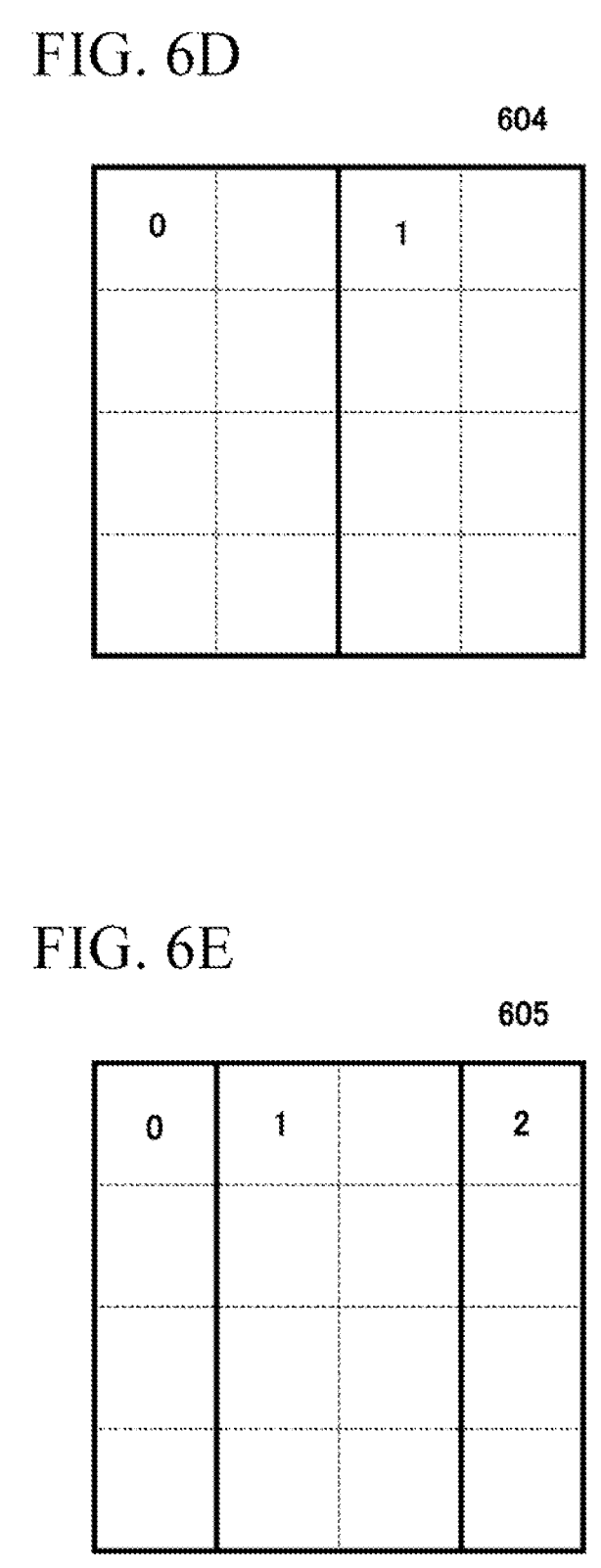

When it is not determined that the target block will be divided into two parts, i.e., when it is determined that the target block will be divided into three parts, in step S1202, it is determined whether or not the target block will be divided into upper, middle, and lower parts (in the vertical direction) (step S1206). On the basis of a determination result, the target block is divided into three parts that are upper, middle and lower parts (in the vertical direction) (step S1207) or the target block is divided into three parts that are left, middle, and right parts (in the horizontal direction) (step S1208). As a result of step S1207, the target block is divided into three parts that are upper, middle, and lower parts (in the vertical direction) as indicated by reference numeral 603 of FIG. 6C. As a result of step S1208, the target block is divided into three parts that are left, middle, and right parts (in the horizontal direction) as indicated by reference numeral 605 of FIG. 6E.

After any one of steps S1204, S1205, S1207, and S1208 is executed, each of blocks into which the target block is divided is scanned in order from left to right and from top to bottom (step S1209). Numbers 0 to 2 of reference numerals 602 to 605 of FIGS. 6B to 6E indicate the order of processing. For each of the blocks into which the target block is divided, a binary-ternary split process of FIG. 8 is recursively executed (step S1210).

The recursive block split described here may limit the necessity of a split according to the number of splits or a size of the target block or the like. Information that limits the necessity of a split may be implemented by a configuration in which information is not delivered by making an agreement between the coding device and the decoding device in advance or implemented by a configuration in which the coding device determines information that limits the necessity of a split, records the information in a bit string, and delivers the information to the decoding device.

When a certain block is divided, a block before the split is referred to as a parent block and each block after the split is referred to as a child block.

Next, an operation of the block split unit 202 in the picture decoding device 200 will be described. The block split unit 202 divides the tree block according to a processing procedure similar to that of the block split unit 101 of the picture coding device 100. However, there is a difference in that the block split unit 101 of the picture coding device 100 applies an optimization technique such as estimation of an optimum shape based on picture recognition or distortion rate optimization to determine an optimum block split shape, whereas the block split unit 202 of the picture decoding device 200 determines a block split shape by decoding the block split information recorded in the bit string.

Syntax (a bit strings syntax rule) related to a block split according to the first embodiment is shown in FIG. 9. coding_quadtree( ) represents syntax related to a quad split process on the block. multi_type_tree( ) represents syntax related to a binary or ternary split process on a block. qt_split is a flag indicating whether or not a block is divided into four parts. qt_split=1 when the block is divided into four parts and qt_split=0 when the block is not divided into four parts. When the block is divided into four parts (qt_split=1), a quad split process is recursively performed on blocks, each of which has been divided into four parts (coding_quadtree (0), coding_quadtree(1), coding_quadtree(2), coding_quadtree(3), and arguments 0 to 3 correspond to numbers indicated by reference numeral 601 of FIG. 6A). When the block is not divided into four parts (qt_split=0), the subsequent split is determined according to multi_type_tree( ). mtt_split is a flag indicating whether or not a split is further performed. When a split is further performed (mtt_split=1), mtt_split_vertical which is a flag indicating whether the block is divided vertically or horizontally and mtt_split_binary which is a flag for determining whether a binary or ternary split is performed are transmitted. mtt_split_vertical=1 indicates a split in the vertical direction and mtt_split_vertical=0 indicates a split in the horizontal direction. mtt_split_binary=1 indicates a binary split and mtt_split_binary=0 indicates a ternary split. In the binary split (mtt_split_binary=1), a split process is recursively performed on blocks, each of which is divided into two parts (multi_type_tree(0), multi_type_tree(1), and arguments 0 to 1 correspond to numbers indicated by reference numeral 602 or 604 in FIGS. 6B to 6D). In the case of the ternary split (mtt_split_binary=0), a split process is recursively performed on blocks, each of which is divided into three parts (multi_type_tree(0), multi_type_tree(1), multi_type_tree(2), and arguments 0 to 2 correspond to numbers indicated by reference numeral 603 of FIG. 6B or numbers indicated by reference numeral 605 of FIG. 6E). Until mtt_split=0 is reached, a hierarchical block split is performed by recursively calling multi_type_tree.

<Inter Prediction>

An inter prediction method according to the embodiment is performed in the inter prediction unit 102 of the picture coding device of FIG. 1 and the inter prediction unit 203 of the picture decoding device of FIG. 2.

The inter prediction method according to the embodiment will be described with reference to the drawings. The inter prediction method is performed in both coding and decoding processes in units of coding blocks.

<Description of Inter Prediction Unit 102 of Coding Side>

Figure 16:
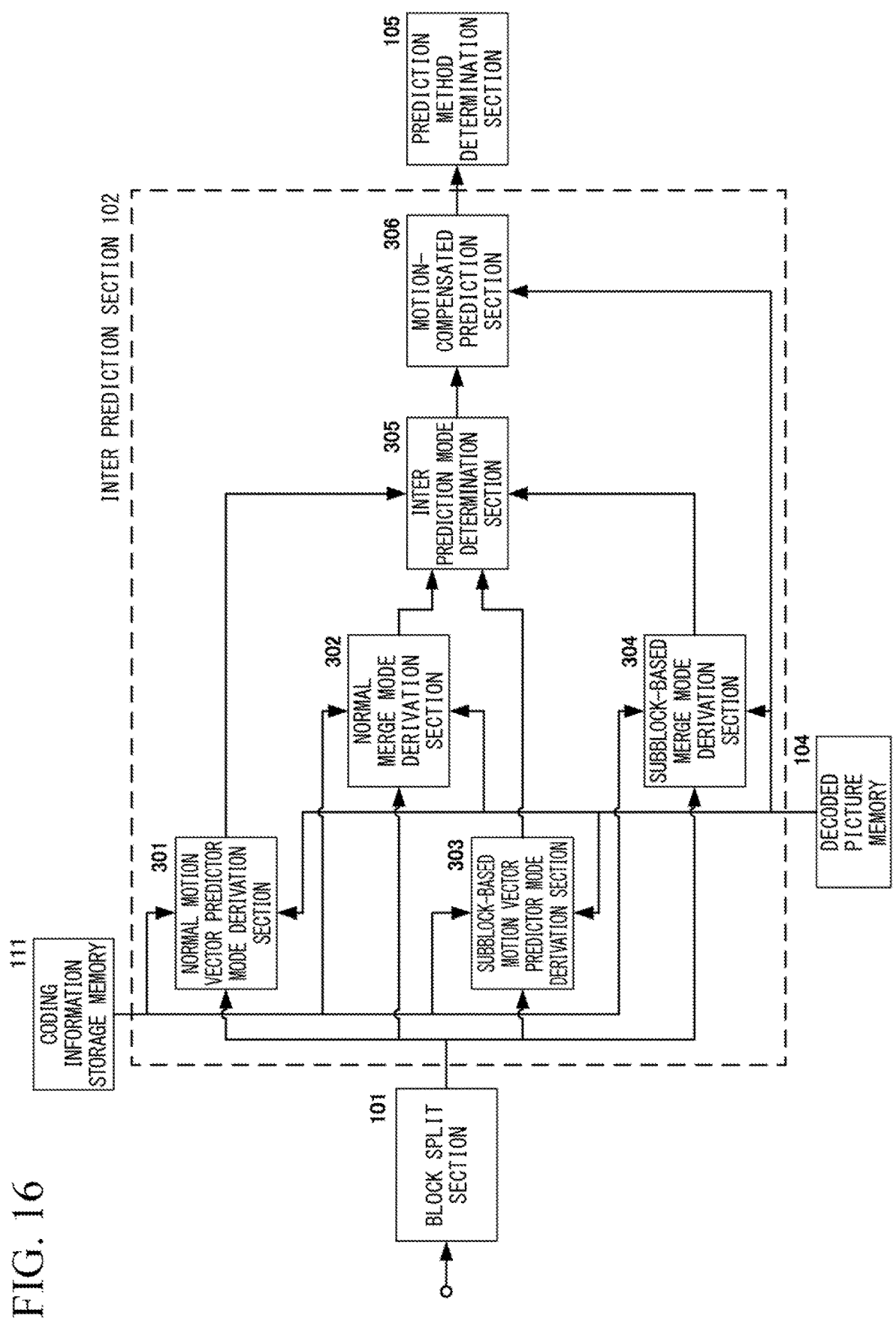
FIG. 16 is a block diagram of a detailed configuration of an inter prediction unit 102 of FIG. 1.

FIG. 16 is a diagram showing a detailed configuration of the inter prediction unit 102 of the picture coding device in FIG. 1. The normal motion vector predictor mode derivation unit 301 derives a plurality of normal motion vector predictor candidates to select a motion vector predictor, and calculates a motion vector difference between the selected motion vector predictor and a detected motion vector. A detected inter prediction mode, reference index, and motion vector and the calculated motion vector difference become inter prediction information of the normal motion vector predictor mode. This inter prediction information is supplied to the inter prediction mode determination unit 305. A detailed configuration and a process of the normal motion vector predictor mode derivation unit 301 will be described below.

The normal merge mode derivation unit 302 derives a plurality of normal merging candidates to select a normal merging candidate and obtains inter prediction information of the normal merge mode. This inter prediction information is supplied to the inter prediction mode determination unit 305. A detailed configuration and a process of the normal merge mode derivation unit 302 will be described below.

A subblock-based motion vector predictor mode derivation unit 303 derives a plurality of subblock-based motion vector predictor candidates to select a subblock-based motion vector predictor and calculates a motion vector difference between the selected subblock-based motion vector predictor and the detected motion vector. A detected inter prediction mode, reference index, and motion vector and the calculated motion vector difference become the inter prediction information of the subblock-based motion vector predictor mode. This inter prediction information is supplied to the inter prediction mode determination unit 305.

The subblock-based merge mode derivation unit 304 derives a plurality of subblock-based merging candidates to select a subblock-based merging candidate, and obtains inter prediction information of the subblock-based merge mode. This inter prediction information is supplied to the inter prediction mode determination unit 305.

The inter prediction mode determination unit 305 determines inter prediction information on the basis of the inter prediction information supplied from the normal motion vector predictor mode derivation unit 301, the normal merge mode derivation unit 302, the subblock-based motion vector predictor mode derivation unit 303, and the subblock-based merge mode derivation unit 304. Inter prediction information according to the determination result is supplied from the inter prediction mode determination unit 305 to the motion-compensated prediction unit 306.

The motion-compensated prediction unit 306 performs inter prediction on the reference picture signal stored in the decoded picture memory 104 on the basis of the determined inter prediction information. A detailed configuration and a process of the motion-compensated prediction unit 306 will be described below.

<Description of Inter Prediction Unit 203 of Decoding Side>

Figure 22:
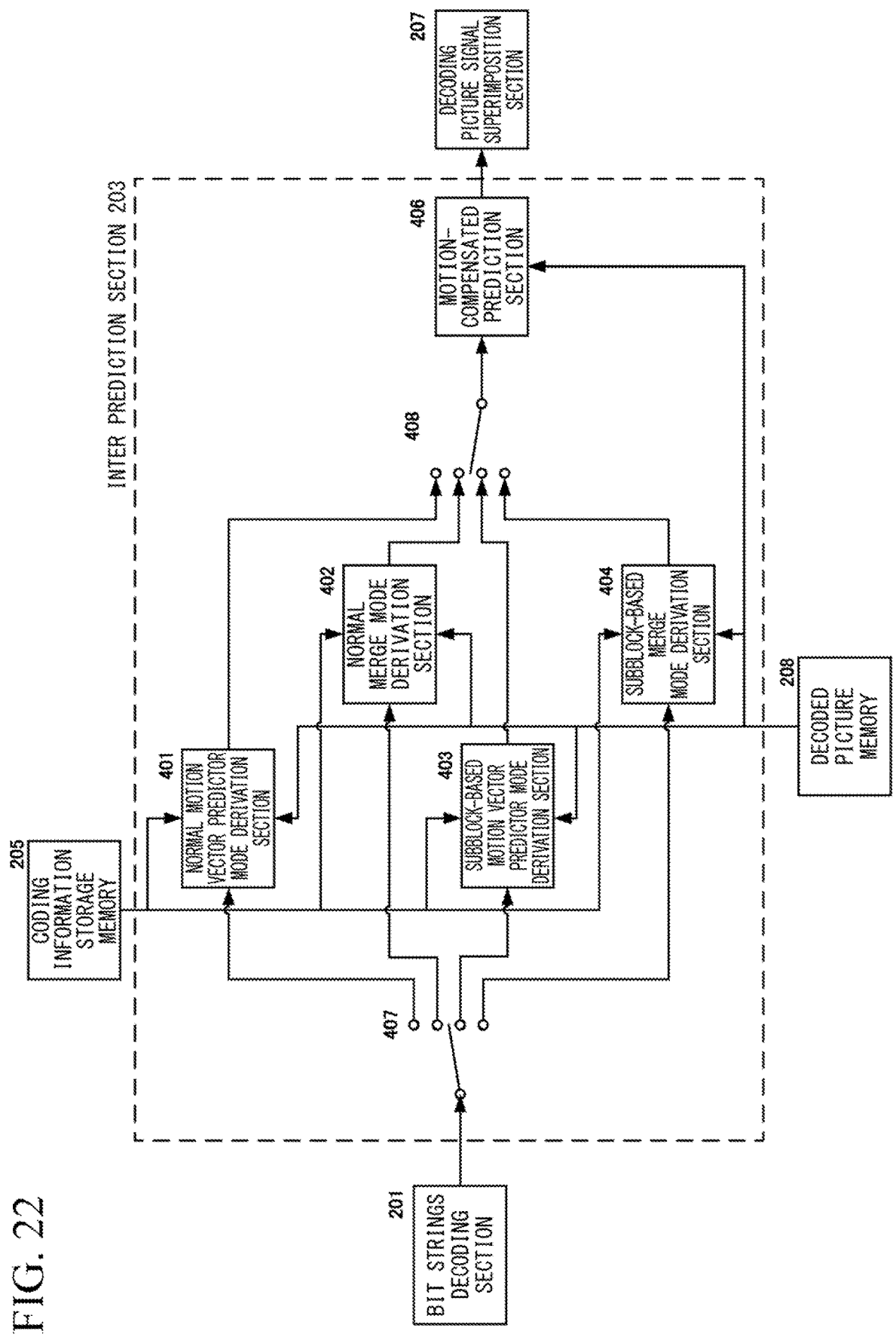
FIG. 22 is a block diagram of a detailed configuration of an inter prediction unit 203 of FIG. 2.

FIG. 22 is a diagram showing a detailed configuration of the inter prediction unit 203 of the picture decoding device of FIG. 2.

The normal motion vector predictor mode derivation unit 401 derives a plurality of normal motion vector predictor candidates to select a motion vector predictor, calculates a sum of the selected motion vector predictor and the decoded motion vector difference, and sets the calculated sum as a motion vector. A decoded inter prediction mode, reference index, and motion vector become inter prediction information of the normal motion vector predictor mode. This inter prediction information is supplied to the motion-compensated prediction unit 406 via the switch 408. A detailed configuration and a process of the normal motion vector predictor mode derivation unit 401 will be described below.

The normal merge mode derivation unit 402 derives a plurality of normal merging candidates to select a normal merging candidate and obtains inter prediction information of the normal merge mode. This inter prediction information is supplied to the motion-compensated prediction unit 406 via the switch 408. A detailed configuration and a process of the normal merge mode derivation unit 402 will be described below.

A subblock-based motion vector predictor mode derivation unit 403 derives a plurality of subblock-based motion vector predictor candidates to select a subblock-based motion vector predictor, calculates a sum of the selected subblock-based motion vector predictor and the decoded motion vector difference, and sets the calculated sum as a motion vector. A decoded inter prediction mode, reference index, and motion vector become the inter prediction information of the subblock-based motion vector predictor mode. This inter prediction information is supplied to the motion-compensated prediction unit 406 via the switch 408.

The subblock-based merge mode derivation unit 404 derives a plurality of subblock-based merging candidates to select a subblock-based merging candidate and obtains inter prediction information of the subblock-based merge mode. This inter prediction information is supplied to the motion-compensated prediction unit 406 via the switch 408.

The motion-compensated prediction unit 406 performs inter prediction on the reference picture signal stored in the decoded picture memory 208 on the basis of the determined inter prediction information. A detailed configuration and a process of the motion-compensated prediction unit 406 are similar to those of the motion-compensated prediction unit 306 of the coding side.

<Normal Motion Vector Predictor Mode Derivation Unit (Normal AMVP)>

Figure 17:
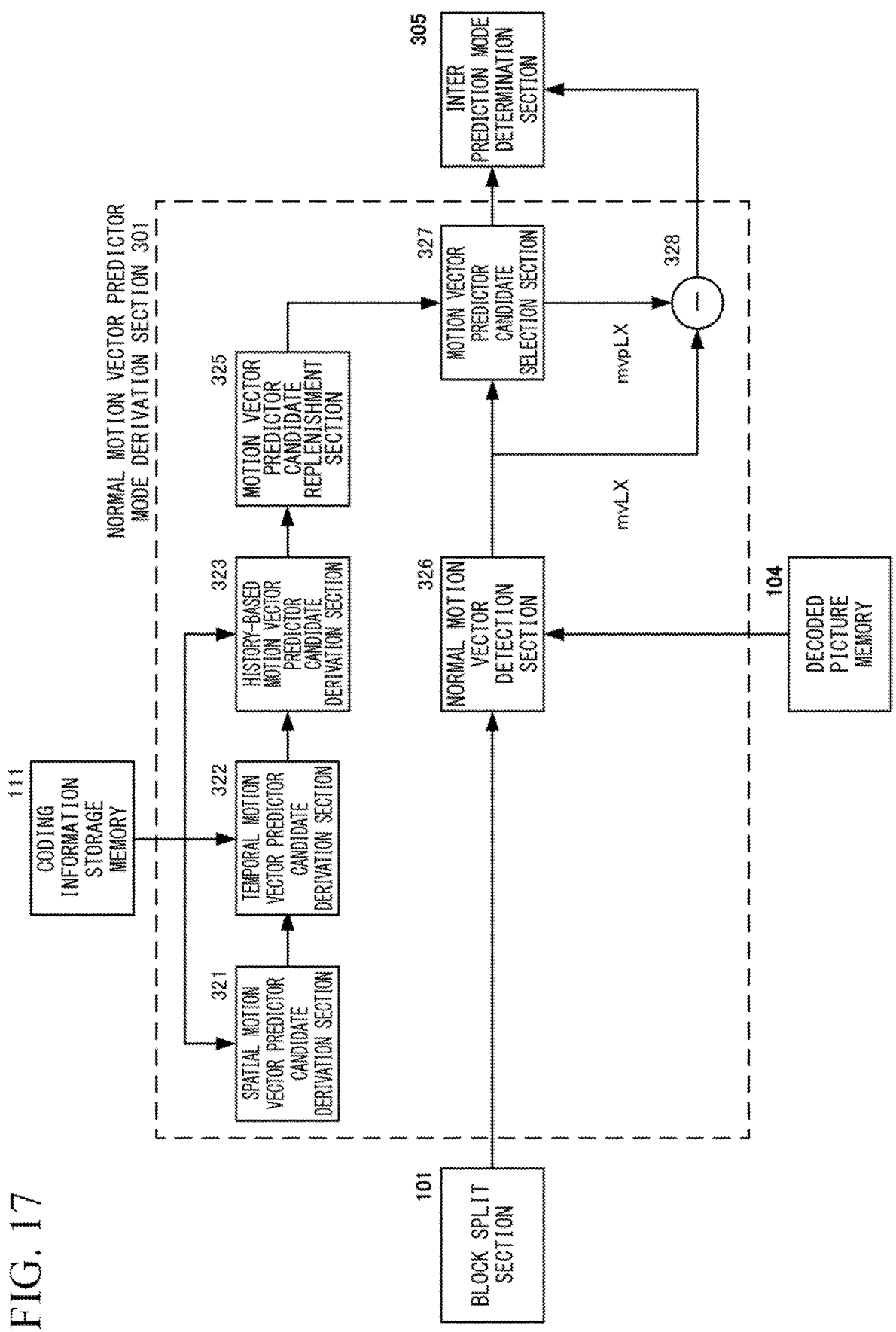
FIG. 17 is a block diagram of a detailed configuration of a normal motion vector predictor mode derivation unit 301 of FIG. 16.

The normal motion vector predictor mode derivation unit 301 of FIG. 17 includes a spatial motion vector predictor candidate derivation unit 321, a temporal motion vector predictor candidate derivation unit 322, a history-based motion vector predictor candidate derivation unit 323, a motion vector predictor candidate replenishment unit 325, a normal motion vector detection unit 326, a motion vector predictor candidate selection unit 327, and a motion vector subtraction unit 328.

Figure 23:
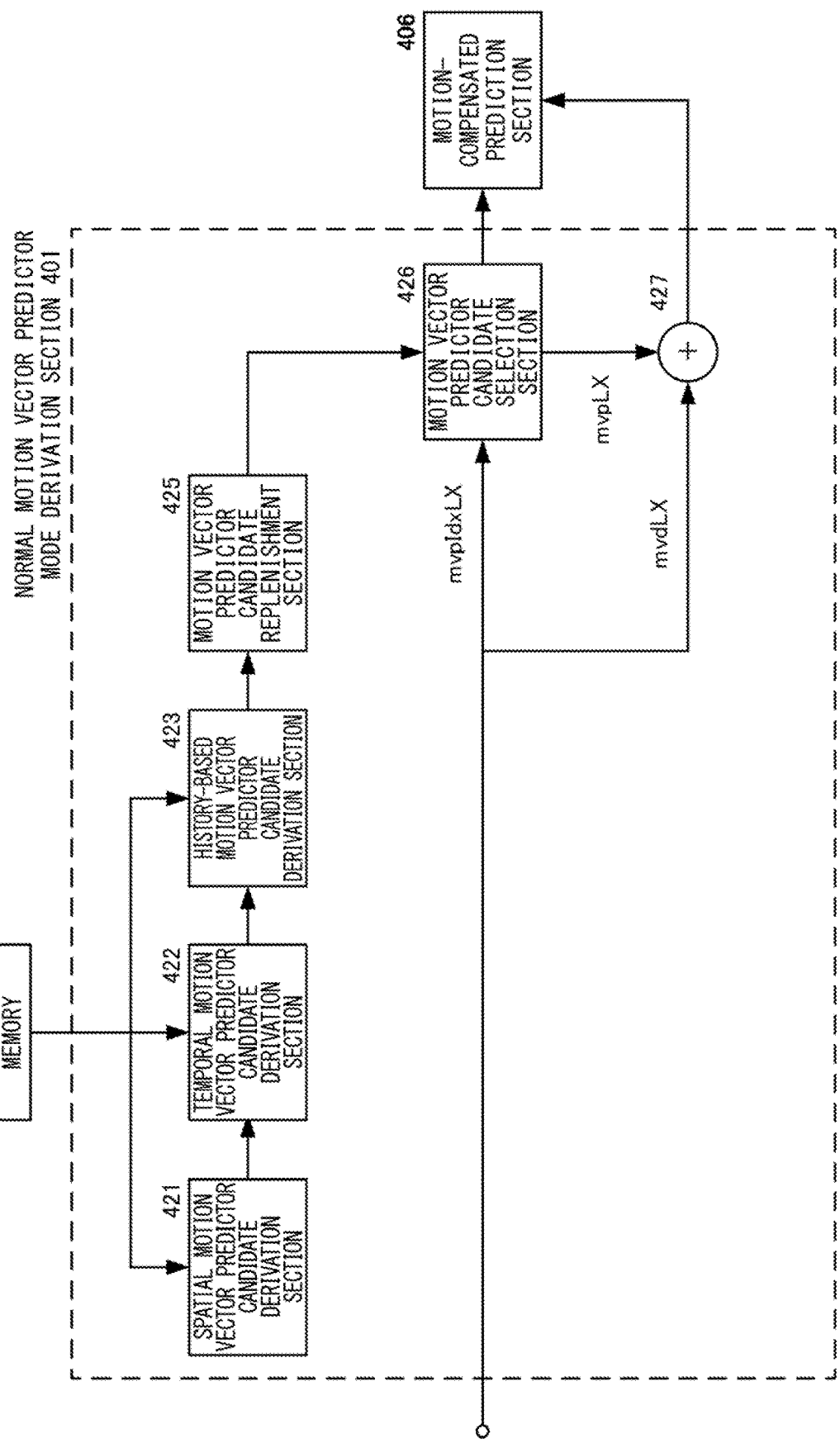
FIG. 23 is a block diagram of a detailed configuration of a normal motion vector predictor mode derivation unit 401 of FIG. 22.

The normal motion vector predictor mode derivation unit 401 of FIG. 23 includes a spatial motion vector predictor candidate derivation unit 421, a temporal motion vector predictor candidate derivation unit 422, a history-based motion vector predictor candidate derivation unit 423, a motion vector predictor candidate replenishment unit 425, a motion vector predictor candidate selection unit 426, and a motion vector addition unit 427.

Figure 19:
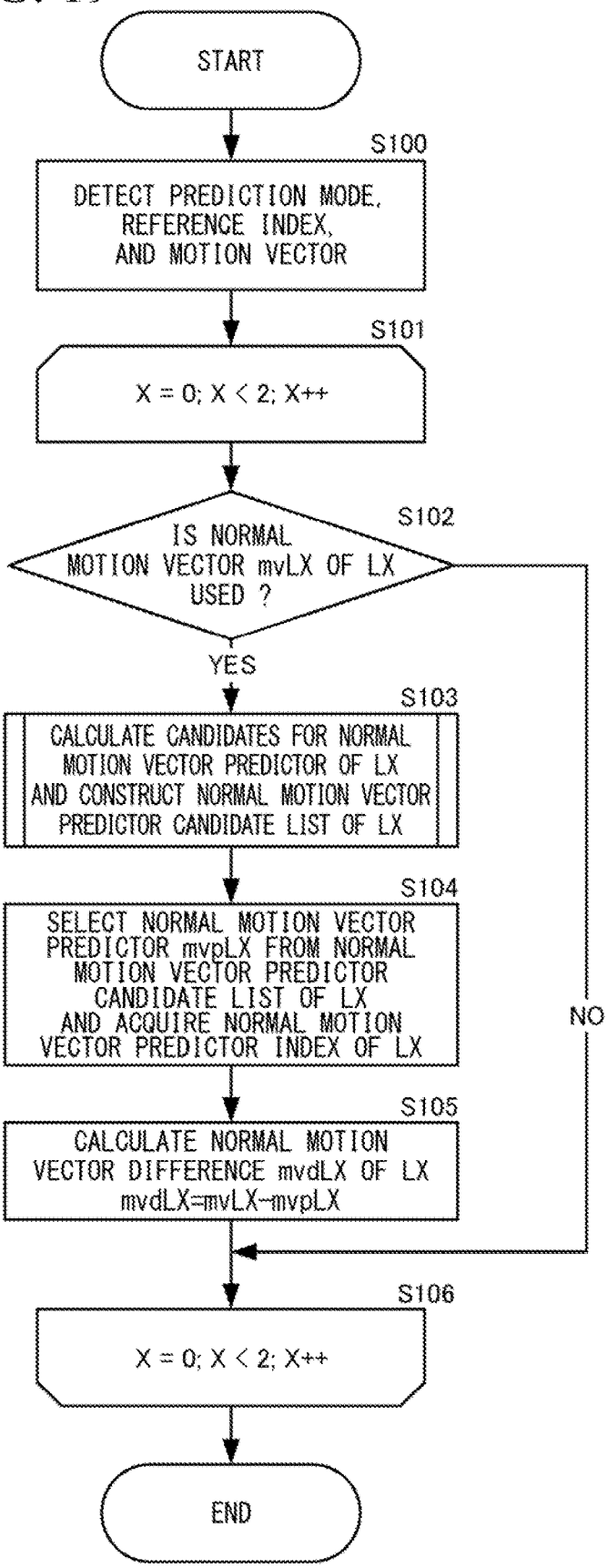
FIG. 19 is an explanatory flowchart showing a normal motion vector predictor mode derivation process of the normal motion vector predictor mode derivation unit 301 of FIG. 16.
Figure 25:
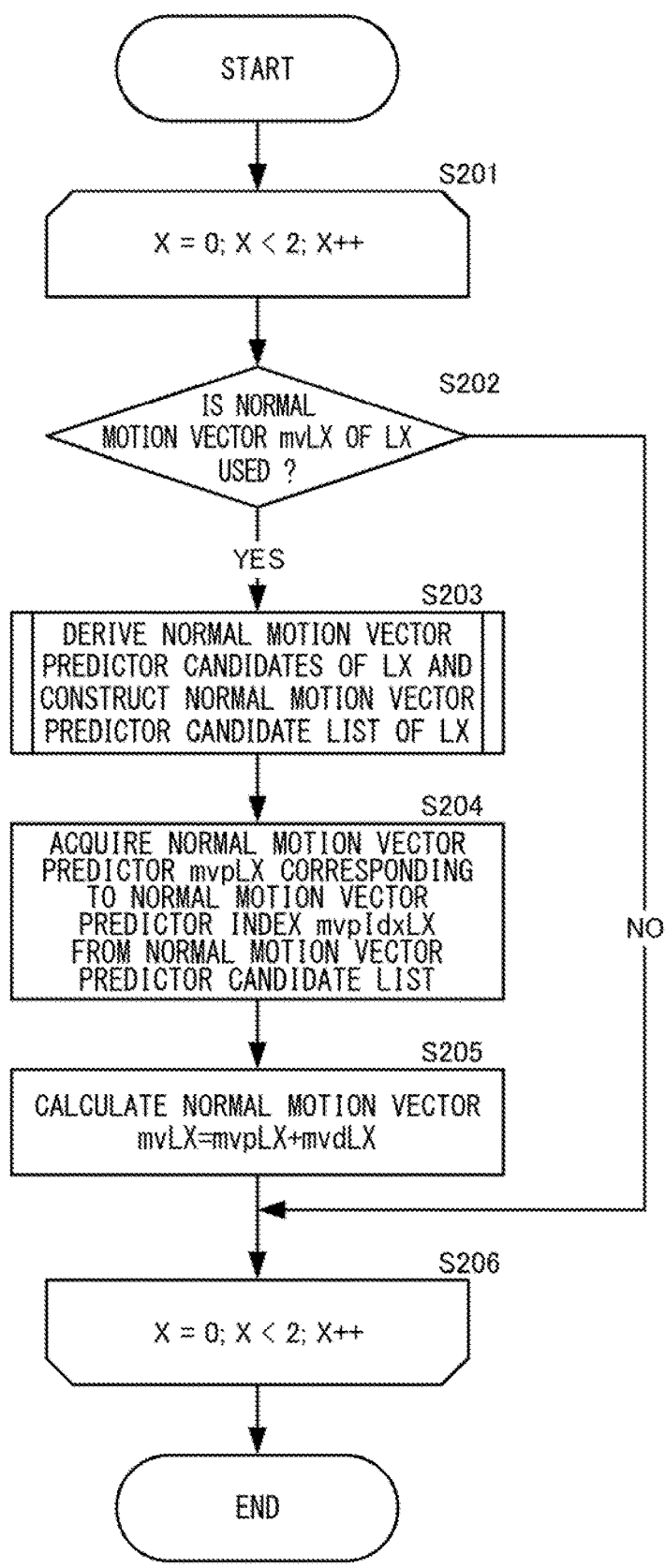
FIG. 25 is an explanatory flowchart showing a normal motion vector predictor mode derivation process of the normal motion vector predictor mode derivation unit 401 of FIG. 22.

Processing procedures of the normal motion vector predictor mode derivation unit 301 of the coding side and the normal motion vector predictor mode derivation unit 401 of the decoding side will be described using the flowcharts of FIGS. 19 and 25, respectively. FIG. 19 is a flowchart showing a normal motion vector predictor mode derivation processing procedure of the normal motion vector predictor mode derivation unit 301 of the coding side and FIG. 25 is a flowchart showing a normal motion vector predictor mode derivation processing procedure of the normal motion vector predictor mode derivation unit 401 of the decoding side.

<Normal Motion Vector Predictor Mode Derivation Unit (Normal AMVP): Description of Coding Side>

The normal motion vector predictor mode derivation processing procedure of the coding side will be described with reference to FIG. 19. In the description of the processing procedure of FIG. 19, the term "normal" shown in FIG. 19 may be omitted.

First, the normal motion vector detection unit 326 detects a normal motion vector for each inter prediction mode and each reference index (step S100 of FIG. 19).

Subsequently, in the spatial motion vector predictor candidate derivation unit 321, the temporal motion vector predictor candidate derivation unit 322, the history-based motion vector predictor candidate derivation unit 323, the motion vector predictor candidate replenishment unit 325, the motion vector predictor candidate selection unit 327, and the motion vector subtraction unit 328, a motion vector difference of a motion vector used for inter prediction of the normal motion vector predictor mode is calculated for each of L0 and L1 (steps S101 to S106 of FIG. 19). Specifically, when the prediction mode PredMode of the target block is inter prediction (MODE_INTER) and the inter prediction mode is L0-prediction (Pred_L0), the motion vector predictor candidate list mvpListL0 of L0 is calculated to select the motion vector predictor mvpL0 and the motion vector difference mvdL0 of the motion vector mvL0 of L0 is calculated. When the inter prediction mode of the target block is L1-prediction (Pred_L1), the motion vector predictor candidate list mvpListL1 of L1 is calculated to select the motion vector predictor mvpL1 and the motion vector difference mvdL1 of the motion vector mvL1 of L1 is calculated. When the inter prediction mode of the target block is bi-prediction (Pred_BI), both L0-prediction and L1-prediction are performed, the motion vector predictor candidate list mvpListL0 of L0 is calculated to select a motion vector predictor mvpL0 of L0, the motion vector difference mvdL0 of a motion vector mvL0 of L0 is calculated, the motion vector predictor candidate list mvpListL1 of L1 is calculated to select a motion vector predictor mvpL1 of L1, and a motion vector difference mvdL1 of a motion vector mvL1 of L1 is calculated.

Although a motion vector difference calculation process is performed for each of L0 and L1, the motion vector difference calculation process becomes a process common to both L0 and L1. Therefore, in the following description, L0 and L1 are represented as common LX. X of LX is 0 in the process of calculating the motion vector difference of L0 and X of LX is 1 in the process of calculating the motion vector difference of L1. Also, when information of another list instead of LX is referred to during the process of calculating the motion vector difference of LX, the other list is represented as LY.

When the motion vector mvLX of LX is used (step S102 of FIG. 19: YES), the motion vector predictor candidates of LX are calculated to construct the motion vector predictor candidate list mvpListLX of LX (step S103 of FIG. 19). In the spatial motion vector predictor candidate derivation unit 321, the temporal motion vector predictor candidate derivation unit 322, the history-based motion vector predictor candidate derivation unit 323, and the motion vector predictor candidate replenishment unit 325 of the normal motion vector predictor mode derivation unit 301, a plurality of motion vector predictor candidates are derived to construct the motion vector predictor candidate list mvpListLX. The detailed processing procedure of step S103 of FIG. 19 will be described below using the flowchart of FIG. 20.

Subsequently, the motion vector predictor candidate selection unit 327 selects a motion vector predictor mvpLX of LX from the motion vector predictor candidate list mvpListLX of LX (step S104 of FIG. 19). Here, one element (an $i^{th}$ element when counted from a $0^{th}$ element) in the motion vector predictor candidate list mvpListLX is represented as mvpListLX[i]. Each motion vector difference that is a difference between the motion vector mvLX and each motion vector predictor candidate mvpListLX[i] stored in the motion vector predictor candidate list mvpListLX is calculated. A code amount when the motion vector differences are coded is calculated for each element (motion vector predictor candidate) of the motion vector predictor candidate list mvpListLX. Then, a motion vector predictor candidate mvpListLX[i] that minimizes the code amount for each motion vector predictor candidate among the elements registered in the motion vector predictor candidate list mvpListLX is selected as the motion vector predictor mvpLX and its index i is acquired. When there are a plurality of motion vector predictor candidates having the smallest generated code amount in the motion vector predictor candidate list mvpListLX, a motion vector predictor candidate mvpListLX[i] represented by a smaller number in the index i in the motion vector predictor candidate list mvpListLX is selected as an optimum motion vector predictor mvpLX and its index i is acquired.

Subsequently, the motion vector subtraction unit 328 subtracts the selected motion vector predictor mvpLX of LX from the motion vector mvLX of LX and calculates a motion vector difference mvdLX of LX as mvdLX=mvLX−mvpLX (step S105 of FIG. 19).

<Normal Motion Vector Predictor Mode Derivation Unit (Normal AMVP): Description of Decoding Side>

Next, the normal motion vector predictor mode processing procedure of the decoding side will be described with reference to FIG. 25. On the decoding side, in the spatial motion vector predictor candidate derivation unit 421, the temporal motion vector predictor candidate derivation unit 422, the history-based motion vector predictor candidate derivation unit 423, and the motion vector predictor candidate replenishment unit 425, a motion vector for use in inter prediction of the normal motion vector predictor mode is calculated for each of L0 and L1 (steps S201 to S206 of FIG. 25). Specifically, when the prediction mode PredMode of the target block is inter prediction (MODE_INTER) and the inter prediction mode of the target block is L0-prediction (Pred_L0), the motion vector predictor candidate list mvpListL0 of L0 is calculated to select the motion vector predictor mvpL0 and a motion vector mvL0 of L0 is calculated. When the inter prediction mode of the target block is L1-prediction (Pred_L1), the motion vector predictor candidate list mvpListL1 of L1 is calculated to select the motion vector predictor mvpL1 and the motion vector mvL1 of L1 is calculated. When the inter prediction mode of the target block is bi-prediction (Pred_BI), both L0-prediction and L1-prediction are performed, the motion vector predictor candidate list mvpListL0 of L0 is calculated to select a motion vector predictor mvpL0 of L0, a motion vector mvL0 of L0 is calculated, the motion vector predictor candidate list mvpListL1 of L1 is calculated to select a motion vector predictor mvpL1 of L1, and each motion vector mvL1 of L1 is calculated.

Although a motion vector calculation process is performed for each of L0 and L1 on the decoding side as on the coding side, the motion vector calculation process becomes a process common to both L0 and L1. Therefore, in the following description, L0 and L1 are represented as common LX. LX represents an inter prediction mode for use in the inter prediction of a target coding block. X is 0 in the process of calculating the motion vector of L0 and X is 1 in the process of calculating the motion vector of L1. Also, when information of another reference list instead of a reference list identical to that of LX of a calculation target is referred to during the process of calculating the motion vector of LX, the other reference list is represented as LY.

When the motion vector mvLX of LX is used (step S202 of FIG. 25: YES), the motion vector predictor candidates of LX are calculated to construct the motion vector predictor candidate list mvpListLX of LX (step S203 of FIG. 25). In the spatial motion vector predictor candidate derivation unit 421, the temporal motion vector predictor candidate derivation unit 422, the history-based motion vector predictor candidate derivation unit 423, and the motion vector predictor candidate replenishment unit 425 of the normal motion vector predictor mode derivation unit 401, a plurality of motion vector predictor candidates are calculated to construct a motion vector predictor candidate list mvpListLX. A detailed processing procedure of step S203 of FIG. 25 will be described below using the flowchart of FIG. 20.

Subsequently, the motion vector predictor candidate mvpListLX[mvpIdxLX] corresponding to the index mvpIdxLX of the motion vector predictor decoded and supplied by the bit strings decoding unit 201 from the motion vector predictor candidate list mvpListLX is extracted as a selected motion vector predictor mvpLX in the motion vector predictor candidate selection unit 426 (step S204 of FIG. 25).

Subsequently, the motion vector addition unit 427 sums the motion vector difference mvdLX of LX that is decoded and supplied by the bit strings decoding unit 201 and the motion vector predictor mvpLX of LX and calculates the motion vector mvLX of LX as mvLX=mvpLX+mvdLX (step S205 of FIG. 25).

<Normal Motion Vector Predictor Mode Derivation Unit (Normal AMVP): Motion Vector Prediction Method>

Figure 20:
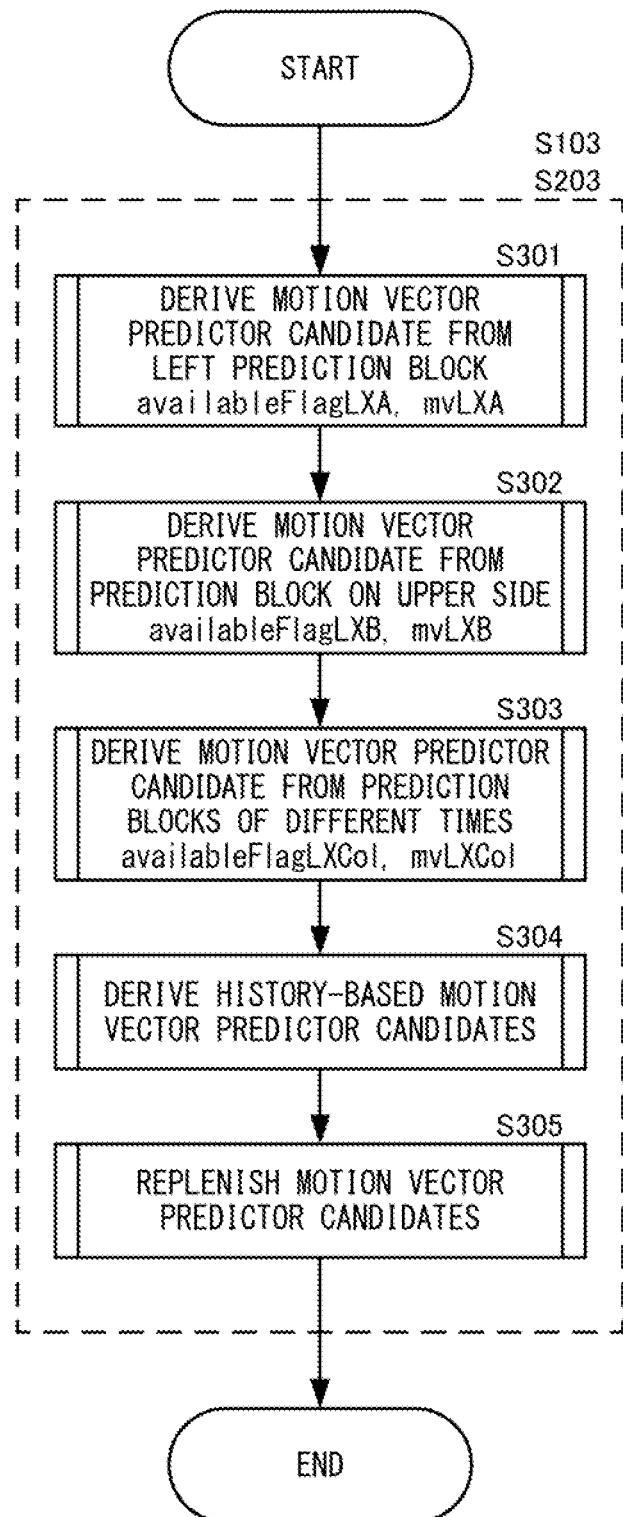
FIG. 20 is a flowchart showing a processing procedure of the normal motion vector predictor mode derivation process.

FIG. 20 is a flowchart showing a processing procedure of a normal motion vector predictor mode derivation process having a function common to the normal motion vector predictor mode derivation unit 301 of the picture coding device and the normal motion vector predictor mode derivation unit 401 of the picture decoding device according to the embodiment of the present invention.

The normal motion vector predictor mode derivation unit 301 and the normal motion vector predictor mode derivation unit 401 include a motion vector predictor candidate list mvpListLX. The motion vector predictor candidate list mvpListLX has a list structure and is provided with a storage area where a motion vector predictor index indicating the location inside the motion vector predictor candidate list and a motion vector predictor candidate corresponding to the index are stored as elements. The number of the motion vector predictor index starts from 0 and motion vector predictor candidates are stored in the storage area of the motion vector predictor candidate list mvpListLX. In the present embodiment, it is assumed that at least two motion vector predictor candidates (inter prediction information) can be registered in the motion vector predictor candidate list mvpListLX. Furthermore, a variable numCurrMvpCand indicating the number of motion vector predictor candidates registered in the motion vector predictor candidate list mvpListLX is set to 0.

The spatial motion vector predictor candidate derivation units 321 and 421 derive motion vector predictor candidates from neighboring blocks on the left side. In this process, a motion vector predictor mvLXA is derived with reference to the inter prediction information of the neighboring block on the left side (A0 or A1 of FIG. 11), i.e., a flag indicating whether or not a motion vector predictor candidate can be used, a motion vector, a reference index, and the like, and the derived mvLXA is added to the motion vector predictor candidate list mvpListLX (step S301 of FIG. 20). Also, X is 0 at the time of L0-prediction and X is 1 at the time of L1-prediction (the same is true hereinafter). Subsequently, the spatial motion vector predictor candidate derivation units 321 and 421 derive a motion vector predictor candidate from a neighboring block on the upper side. In this process, the motion vector predictor mvLXB is derived with reference to inter prediction information of a neighboring block on the upper side (B0, B1, or B2 of FIG. 11), i.e., a flag indicating whether or not a motion vector predictor candidate can be used, a motion vector, a reference index, and the like, and mvLXB is added to the motion vector predictor candidate list mvpListLX if the derived mvLXA is not equal to the derived mvLXB (step S302 of FIG. 20). The processing of steps S301 and S302 of FIG. 20 is common except that positions of neighboring blocks to be referred to and the number of neighboring blocks to be referred to are different, and a flag availableFlagLXN indicating whether or not a motion vector predictor candidate of the coding block can be used, a motion vector mvLXN, and a reference index refIdxN (N represents A or B and the same is true hereinafter) are derived.

Subsequently, the temporal motion vector predictor candidate derivation units 322 and 422 derive motion vector predictor candidates from blocks in a picture whose time is different from that of the current target picture. In this process, a flag availableFlagLXCol indicating whether or not a motion vector predictor candidate of a coding block of a picture of different time can be used, a motion vector mvLXCol, a reference index refIdxCol, and a reference list listCol are derived, and mvLXCol is added to the motion vector predictor candidate list mvpListLX (step S303 of FIG. 20).

Also, it is assumed that the processes of the temporal motion vector predictor candidate derivation units 322 and 422 can be omitted in units of sequences (SPS), pictures (PPS), or slices.

Subsequently, the history-based motion vector predictor candidate derivation units 323 and 423 add the history-based motion vector predictor candidates registered in the history-based motion vector predictor candidate list HmvpCandList to the motion vector predictor candidate list mvpListLX (step S304 of FIG. 20). Details of the registration processing procedure of step S304 will be described below using the flowchart of FIG. 29.

Subsequently, the motion vector predictor candidate replenishment units 325 and 425 add motion vector predictor candidates having a predetermined value such as (0, 0) until the motion vector predictor candidate list mvpListLX is satisfied (S305 of FIG. 20).

<Normal Merge Mode Derivation Unit (Normal Merge)>

Figure 18:
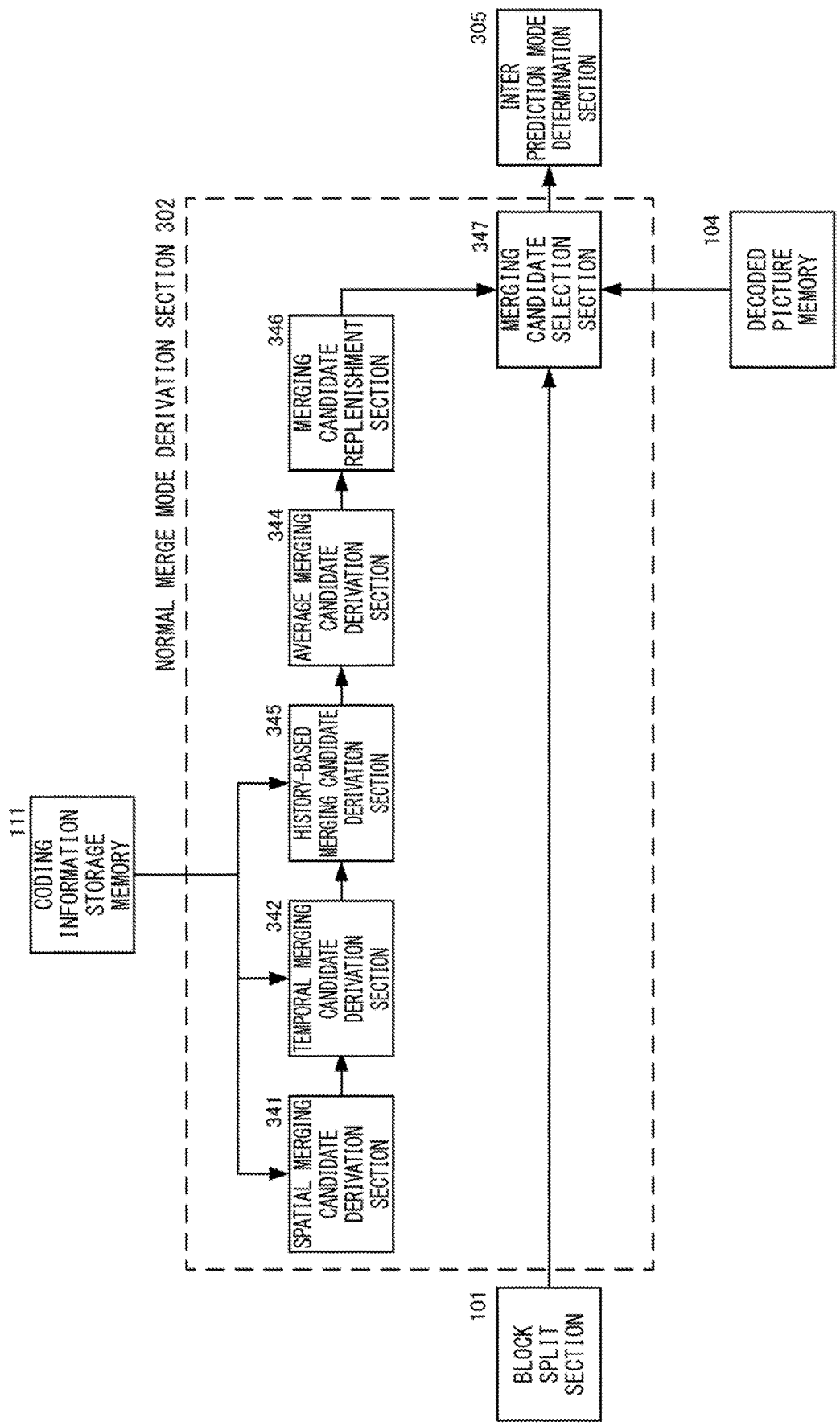
FIG. 18 is a block diagram of a detailed configuration of a normal merge mode derivation unit 302 of FIG. 16.

The normal merge mode derivation unit 302 of FIG. 18 includes a spatial merging candidate derivation unit 341, a temporal merging candidate derivation unit 342, an average merging candidate derivation unit 344, a history-based merging candidate derivation unit 345, a merging candidate replenishment unit 346, and a merging candidate selection unit 347.

Figure 24:
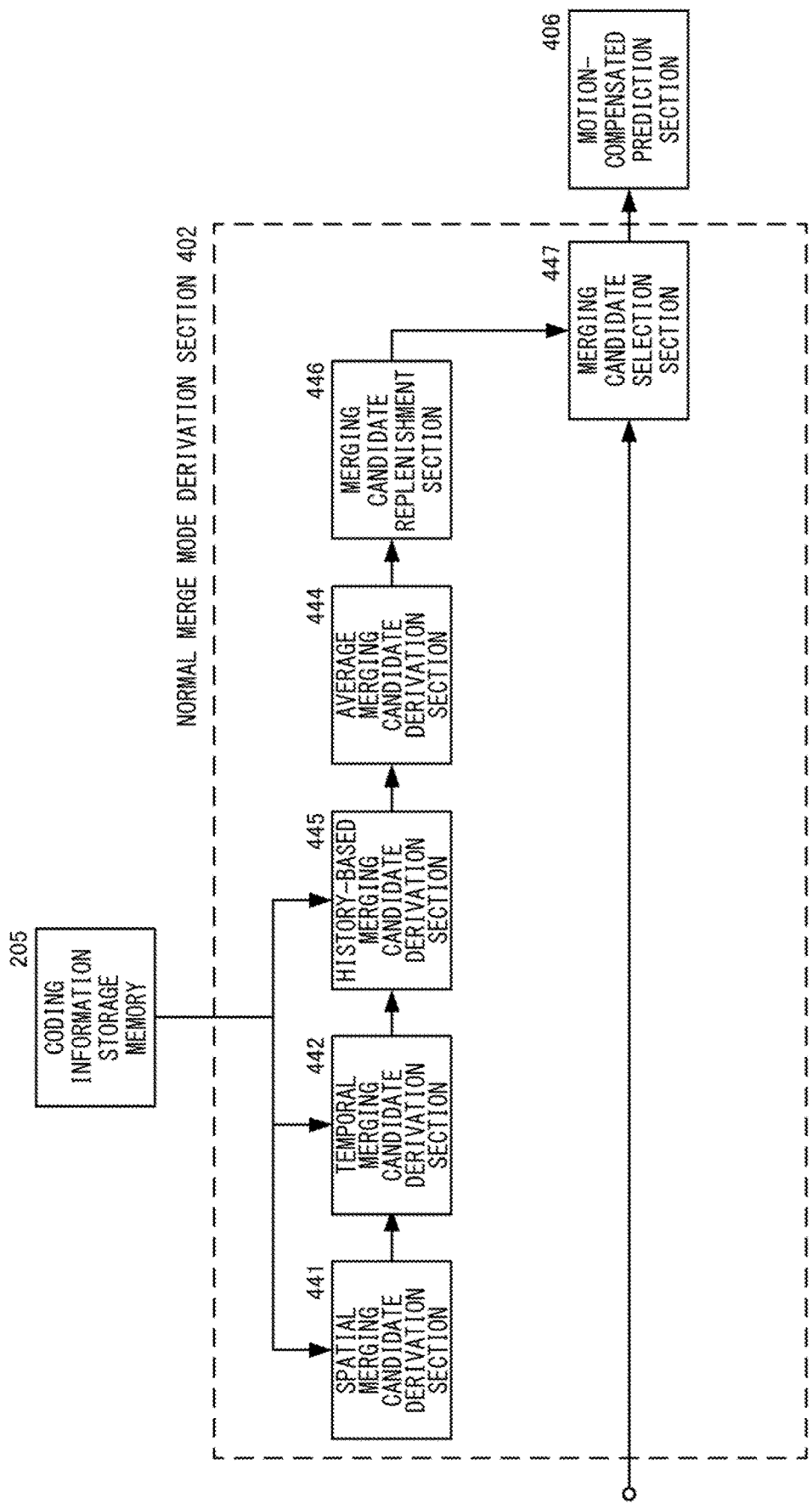
FIG. 24 is a block diagram of a detailed configuration of a normal merge mode derivation unit 402 of FIG. 22.

The normal merge mode derivation unit 402 of FIG. 24 includes a spatial merging candidate derivation unit 441, a temporal merging candidate derivation unit 442, an average merging candidate derivation unit 444, a history-based merging candidate derivation unit 445, a merging candidate replenishment unit 446, and a merging candidate selection unit 447.

Figure 21:
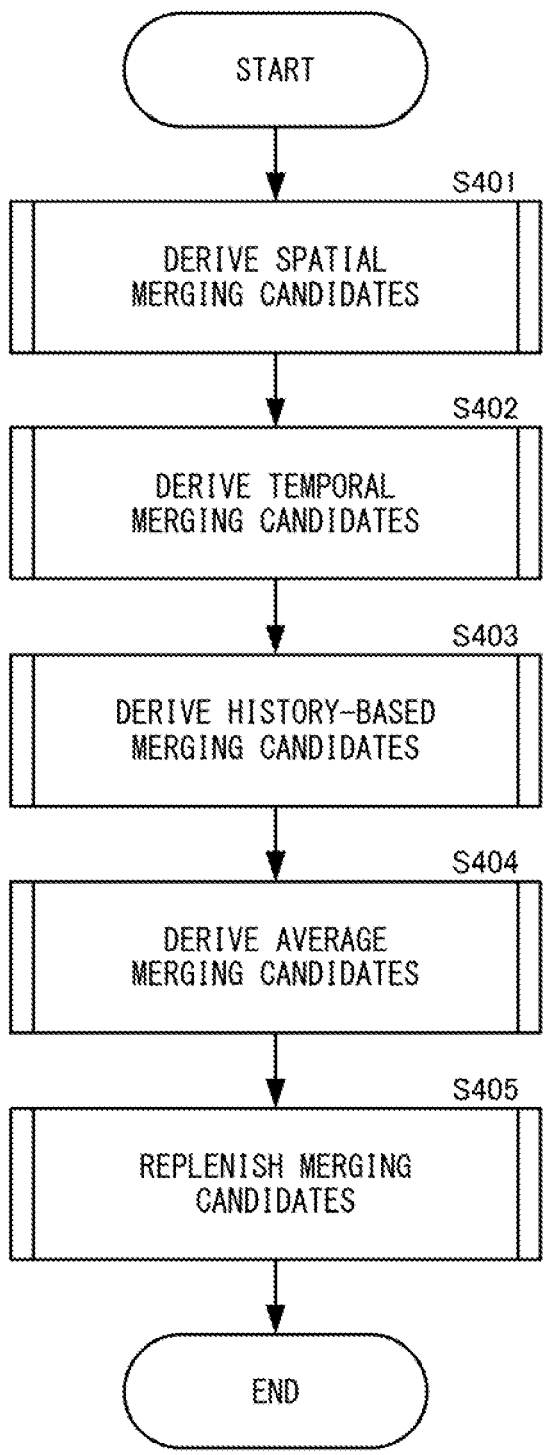
FIG. 21 is an explanatory flowchart showing a processing procedure of a normal merge mode derivation process.

FIG. 21 is an explanatory flowchart showing a procedure of a normal merge mode derivation process having a function common to the normal merge mode derivation unit 302 of the picture coding device and the normal merge mode derivation unit 402 of the picture decoding device according to the embodiment of the present invention.

Hereafter, various processes will be described step by step. Although a case in which a type of slice slice_type is a B slice will be described unless otherwise specified in the following description, the present invention can also be applied to the case of a P slice. However, when the type of slice slice_type is a P slice, because only the L0-prediction (Pred_L0) is provided as the inter prediction mode and L1-prediction (Pred_L1) and bi-prediction (Pred_BI) are absent, a process related to L1 can be omitted.

The normal merge mode derivation unit 302 and the normal merge mode derivation unit 402 have a merging candidate list mergeCandList. The merging candidate list mergeCandList has a list structure and is provided with a merge index indicating the location within the merging candidate list and a storage area where merging candidates corresponding to the index are stored as elements. The number of the merge index starts from 0 and merging candidates are stored in the storage area of the merging candidate list mergeCandList. In the subsequent process, the merging candidate of the merge index i registered in the merging candidate list mergeCandList is represented by mergeCandList[i]. In the present embodiment, it is assumed that at least six merging candidates (inter prediction information) can be registered in the merging candidate list mergeCandList. Further, a variable numCurrMergeCand indicating the number of merging candidates registered in the merging candidate list mergeCandList is set to 0.

In the spatial merging candidate derivation unit 341 and the spatial merging candidate derivation unit 441, spatial merging candidates from the respective blocks (B1, A1, B0, A0, and B2 of FIG. 11) neighboring the target block are derived in the order of B1, A1, B0, A0, and B2 from the coding information stored in the coding information storage memory 111 of the picture coding device or the coding information storage memory 205 of the picture decoding device and the derived spatial merging candidates are registered in the merging candidate list mergeCandList (step S401 of FIG. 21). Here, N indicating one of B1, A1, B0, A0, and B2 and the temporal merging candidate Col is defined. A flag availableFlagN indicating whether or not the inter prediction information of block N can be used as a spatial merging candidate, a reference index refIdxL0N of L0 and a reference index refIdxL1N of L1 of spatial merging candidate N, an L0-prediction flag predFlagL0N indicating whether or not L0-prediction is performed, an L1-prediction flag predFlagL1N indicating whether or not L1-prediction is performed, a motion vector mvL0N of L0, and a motion vector mvL1N of L1 are derived. However, because the merging candidate is derived without referring to the inter prediction information of the block included in the coding block which is a target in the present embodiment, no spatial merging candidate using the inter prediction information of the block included in the target coding block is derived.

Subsequently, the temporal merging candidate derivation unit 342 and the temporal merging candidate derivation unit 442 derive temporal merging candidates from pictures of different times and register the derived temporal merging candidates in the merging candidate list mergeCandList (step S402 of FIG. 21). A flag availableFlagCol indicating whether or not the temporal merging candidate can be used, an L0-prediction flag predFlagL0Col indicating whether or not L0-prediction of the temporal merging candidate is performed, an L1-prediction flag predFlagL1Col indicating whether or not L1-prediction is performed, a motion vector mvL0Col of L0, and a motion vector mvL1Col of L1 are derived.

Also, it is assumed that the processes of the temporal merging candidate derivation unit 342 and the temporal merging candidate derivation unit 442 can be omitted in units of sequences (SPS), pictures (PPS), or slices.

Subsequently, the history-based merging candidate derivation unit 345 and the history-based merging candidate derivation unit 445 register history-based motion vector predictor candidates registered in the history-based motion vector predictor candidate list HmvpCandList in the merging candidate list mergeCandList (step S403 of FIG. 21).

Also, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList and history-based merging candidates are derived and registered in the merging candidate list mergeCandList.

Subsequently, the average merging candidate derivation unit 344 and the average merging candidate derivation unit 444 derive an average merging candidate from the merging candidate list mergeCandList and adds the derived average merging candidate to the merging candidate list mergeCandList (step S404 of FIG. 21).

Also, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList and average merging candidates are derived and registered in the merging candidate list mergeCandList.

Here, the average merging candidate is a new merging candidate having a motion vector obtained by averaging motion vectors of a first merging candidate and a second merging candidate registered in the merging candidate list mergeCandList for each of the L0-prediction and the L1-prediction.

Subsequently, in the merging candidate replenishment unit 346 and the merging candidate replenishment unit 446, when the number of merging candidates numCurrMergeCand registered within the merging candidate list mergeCandList is smaller than the maximum number of merging candidates MaxNumMergeCand, the maximum number of merging candidates MaxNumMergeCand is set as an upper limit of the number of merging candidates numCurrMergeCand registered within the merging candidate list mergeCandList and an additional merging candidate is derived and registered in the merging candidate list mergeCandList (step S405 of FIG. 21). In the P slice, a merging candidate for which a motion vector has a value of (0, 0) and the prediction mode is L0-prediction (Pred_L0) is added using the maximum number of merging candidates MaxNumMergeCand as the upper limit. In the B slice, a merging candidate for which a motion vector has a value of (0, 0) and the prediction mode is bi-prediction (Pred_BI) is added. A reference index when the merging candidate is added is different from the previously added reference index.

Subsequently, the merging candidate selection unit 347 and the merging candidate selection unit 447 select merging candidates from the merging candidates registered within the merging candidate list mergeCandList. The merging candidate selection unit 347 of the coding side selects a merging candidate by calculating a code amount and a distortion amount, and supplies a merge index indicating the selected merging candidate and inter prediction information of the merging candidate to the motion-compensated prediction unit 306 via the inter prediction mode determination unit 305. On the other hand, the merging candidate selection unit 447 of the decoding side selects a merging candidate on the basis of a decoded merge index and supplies the selected merging candidate to the motion-compensated prediction unit 406.

When a size of a certain coding block (a product of width and height thereof) is less than 32, the normal merge mode derivation unit 302 and the normal merge mode derivation unit 402 derive merging candidates in a parent block of the coding block. In all child blocks, merging candidates derived in the parent block are used. However, this is limited to a case in which the size of the parent block is 32 or more and is within a screen.

<Update of History-Based Motion Vector Predictor Candidate List>

Figure 26:
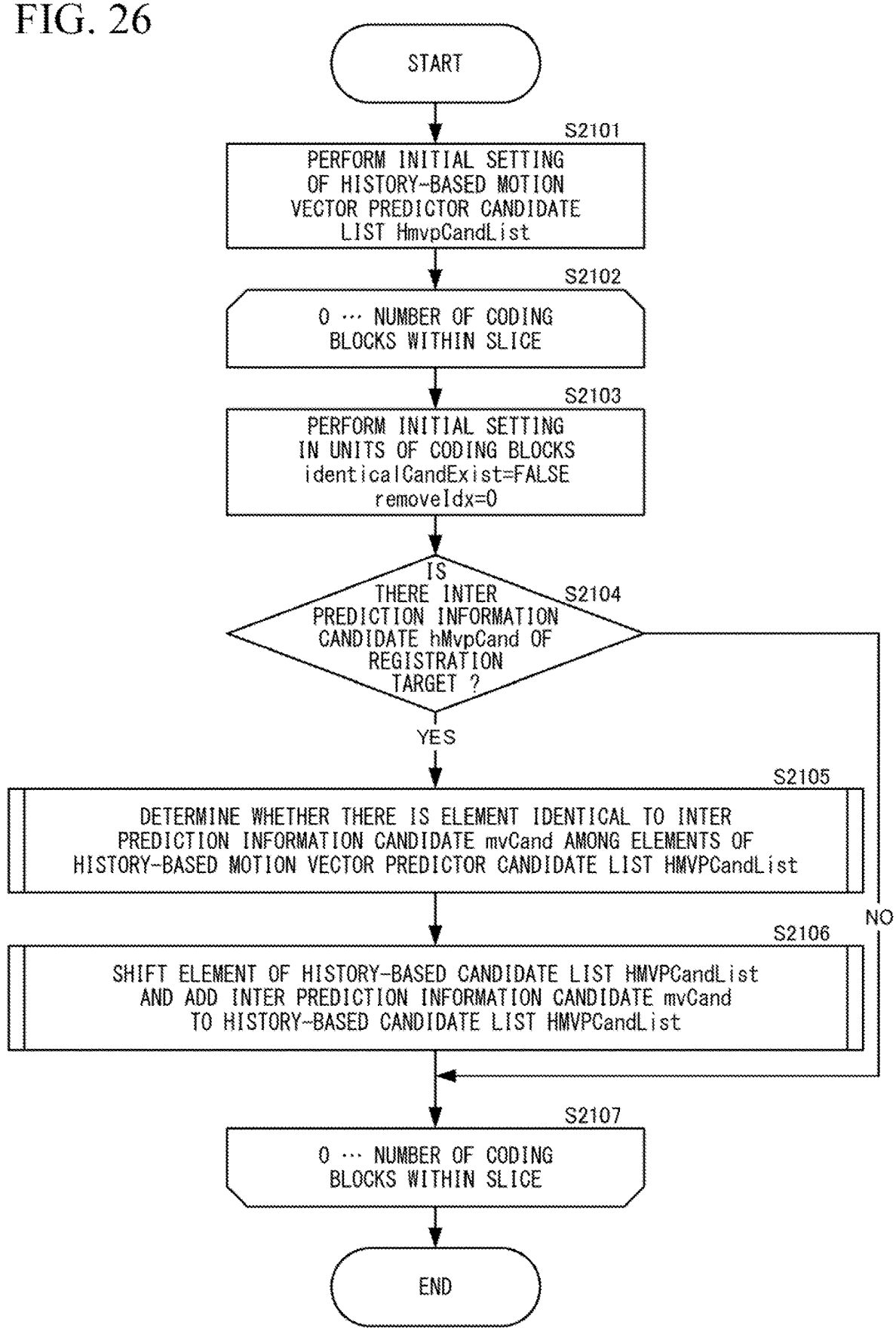
FIG. 26 is an explanatory diagram showing a processing procedure of initializing/updating a history-based motion vector predictor candidate list.

Next, an initialization method and an update method of the history-based motion vector predictor candidate list HmvpCandList provided in the coding information storage memory 111 of the coding side and the coding information storage memory 205 of the decoding side will be described in detail. FIG. 26 is an explanatory flowchart showing a processing procedure of initializing/updating a history-based motion vector predictor candidate list.

In the present embodiment, it is assumed that the history-based motion vector predictor candidate list HmvpCandList is updated in the coding information storage memory 111 and the coding information storage memory 205. A history-based motion vector predictor candidate list update unit may be installed in the inter prediction unit 102 and the inter prediction unit 203 to update the history-based motion vector predictor candidate list HmvpCandList.

The history-based motion vector predictor candidate list HmvpCandList is initially set at the beginning of the slice, the history-based motion vector predictor candidate list HmvpCandList is updated when the normal motion vector predictor mode or the normal merge mode has been selected by the prediction method determination unit 105 on the coding side, and the history-based motion vector predictor candidate list HmvpCandList is updated when the prediction information decoded by the bit strings decoding unit 201 is about the normal motion vector predictor mode or the normal merge mode on the decoding side.

The inter prediction information used when inter prediction is performed in the normal motion vector predictor mode or the normal merge mode is registered as an inter prediction information candidate hMvpCand in the history-based motion vector predictor candidate list HmvpCandList. The inter prediction information candidate hMvpCand includes a reference index refIdxL0 of L0, a reference index refIdxL1 of L1, an L0-prediction flag predFlagL0 indicating whether or not L0-prediction is performed, an L1-prediction flag predFlagL1 indicating whether or not L1-prediction is performed, a motion vector mvL0 of L0, and a motion vector mvL1 of L1.

It is checked whether or not there is inter prediction information having the same value as an inter prediction information candidate hMvpCand among elements (i.e., inter prediction information) registered in the history-based motion vector predictor candidate list HmvpCandList provided in the coding information storage memory 111 of the coding side and the coding information storage memory 205 of the decoding side in order from the beginning toward the end of the history-based motion vector predictor candidate list HmvpCandList. When there is inter prediction information having the same value as an inter prediction information candidate hMvpCand, the element is removed from the history-based motion vector predictor candidate list HmvpCandList. On the other hand, when there is no inter prediction information having the same value as an inter prediction information candidate hMvpCand, the element at the beginning of the history-based motion vector predictor candidate list HmvpCandList is removed and the inter prediction information candidate hMvpCand is added to the end of the history-based motion vector predictor candidate list HmvpCandList.

The maximum size of the history-based motion vector predictor candidate list, i.e., the maximum number of elements (the maximum number of candidates) MaxNumHmvpCand of the history-based motion vector predictor candidate list HmvpCandList, which is the maximum number provided in the coding information storage memory 111 of the coding side and the coding information storage memory 205 of the decoding side according to the present invention is assumed to be six. Also, MaxNumHmvpCand may be set to a value, which is the same as maximum number of merging candidates MaxNumMergeCand−1, may be set to a value, which is the same as the maximum number of merging candidates MaxNumMergeCand, or may be a predetermined fixed value such as 5 or 6.

First, the history-based motion vector predictor candidate list HmvpCandList is initialized in units of slices (step S2101 of FIG. 26). All the elements of the history-based motion vector predictor candidate list HmvpCandList are empty at the beginning of the slice and a value of the number of history-based motion vector predictor candidates (the current number of candidates) NumHmvpCand registered in the history-based motion vector predictor candidate list HmvpCandList is set to 0.

Further, an offset value hMvpIdxOffset is set to a predetermined value. The offset value hMvpIdxOffset is set to any predetermined value from 0 to (History-based motion vector predictor candidate list size MaxNumHmvpCand−1). By setting the offset value hMvpIdxOffset to a value smaller than the maximum number of elements of the history-based motion vector predictor candidate list HmvpCandList, the number of comparisons between the elements to be described below can be reduced. Although the offset value hMvpIdxOffset is set to the predetermined value, the value of the offset value hMvpIdxOffset may be set by performing coding/decoding in units of sequences or by performing coding/decoding in units of slices. The offset value hMvpIdxOffset will be described in detail below.

Also, the initialization of the history-based motion vector predictor candidate list HmvpCandList is performed in units of slices (a first coding block of a slice), but may be performed in units of pictures, tiles, or tree block rows.

Subsequently, the following process of updating the history-based motion vector predictor candidate list HmvpCandList is iteratively performed for each coding block within the slice (steps S2102 to S2107 of FIG. 26).

First, initial setting is performed for each coding block. A flag identicalCandExist indicating whether or not there is an identical candidate is set to a value of FALSE and a removal target index removeIdx indicating a removal target candidate is set to 0 (step S2103 of FIG. 26).

It is determined whether or not there is inter prediction information having the same value as an inter prediction information candidate hMvpCand of the registration target in the history-based motion vector predictor candidate list HmvpCandList (step S2104 of FIG. 26). When the prediction method determination unit 105 of the coding side determines that the mode is the normal motion vector predictor mode or the normal merge mode or when the bit strings decoding unit 201 of the decoding side decodes the mode as the normal motion vector predictor mode or the normal merge mode, its inter prediction information is set as an inter prediction information candidate hMvpCand of the registration target. When the prediction method determination unit 105 of the coding side determines that the mode is the intra-prediction mode, the subblock-based motion vector predictor mode, or the subblock-based merge mode or when the bit strings decoding unit 201 of the decoding side decodes the mode as the intra-prediction mode, the subblock-based motion vector predictor mode, or the subblock-based merge mode, a process of updating the history-based motion vector predictor candidate list HmvpCandList is not performed and the inter prediction information candidate hMvpCand of the registration target does not exist. When there is no inter prediction information candidate hMvpCand of the registration target, steps S2105 to S2106 are skipped (step S2104 of FIG. 26: NO). When there is an inter prediction information candidate hMvpCand of the registration target, the processing from step S2105 is performed (step S2104 of FIG. 26: YES).

Figure 27:
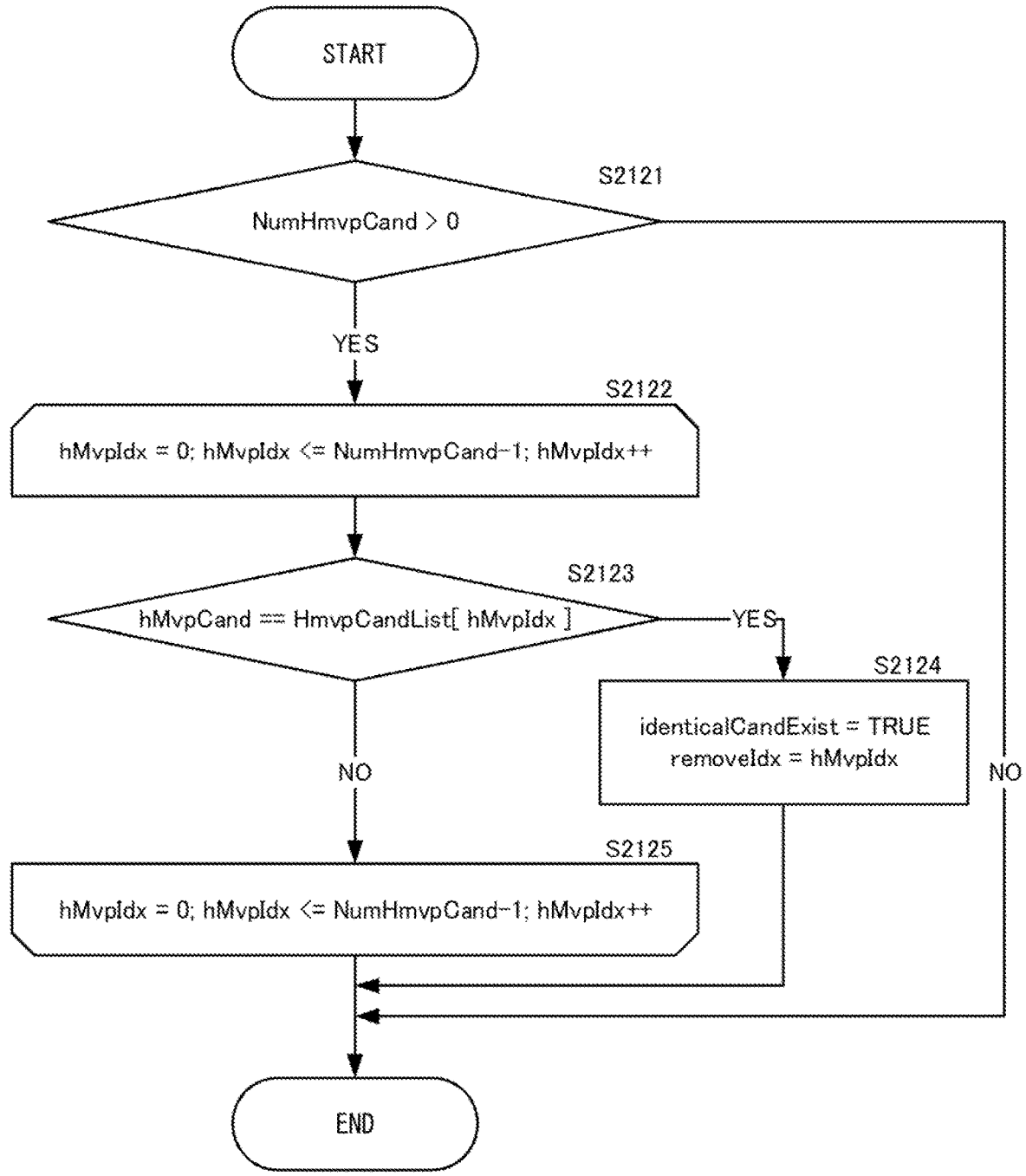
FIG. 27 is a flowchart of an identical element checking processing procedure in the processing procedure of initializing/updating a history-based motion vector predictor candidate list.

Subsequently, it is determined whether or not there is an element (inter prediction information) having the same value as the inter prediction information candidate hMvpCand of the registration target, i.e., an identical element, among elements of the history-based motion vector predictor candidate list HmvpCandList (step S2105 of FIG. 26). FIG. 27 is a flowchart of an identical element checking processing procedure. When a value of the number of history-based motion vector predictor candidates NumHmvpCand is 0 (step S2121 of FIG. 27: NO), the history-based motion vector predictor candidate list HmvpCandList is empty and there is no identical candidate, so that steps S2122 to S2125 of FIG. 27 are skipped and the present identical element checking processing procedure is completed. When the value of the number of history-based motion vector predictor candidates NumHmvpCand is larger than 0 (step S2121 of FIG. 27: YES), it is checked whether or not there is inter prediction information having the same value as an inter prediction information candidate hMvpCand of the registration target in order from the beginning toward the end of the history-based motion vector predictor candidate list HmvpCandList. The processing of step S2123 is iterated until the history-based motion vector predictor index hMvpIdx changes from 0 to NumHmvpCand−1 (steps S2122 to S2125 of FIG. 27). First, a comparison is made regarding whether or not an hMvpIdx$^{th}$ element HmvpCandList[hMvpIdx] when counted from a 0$^{th}$ element of the history-based motion vector predictor candidate list is identical to the inter prediction information candidate hMvpCand (step S2123 of FIG. 27). When the hMvpIdx$^{th}$ element HmvpCandList[hMvpIdx] is identical to the inter prediction information candidate hMvpCand (step S2123 of FIG. 27: YES), a value of TRUE is set in a flag identicalCandExist indicating whether or not there is an identical candidate and a current value of the history-based motion vector predictor index hMvpIdx is set in a removal target index removeIdx indicating a position of an element of a removal target, and the present identical element checking process ends. When the hMvpIdx$^{th}$ element HmvpCandList[hMvpIdx] is not identical to the inter prediction information candidate hMvpCand (step S2123 of FIG. 27: NO), the flag identicalCandExist indicating whether or not there is an identical candidate remains FALSE and hMvpIdx is incremented by 1. If the history-based motion vector predictor index hMvpIdx is smaller than or equal to NumHmvpCand−1, the processing from step S2123 is performed (steps S2122 to S2125 of FIG. 27).

Figure 28:
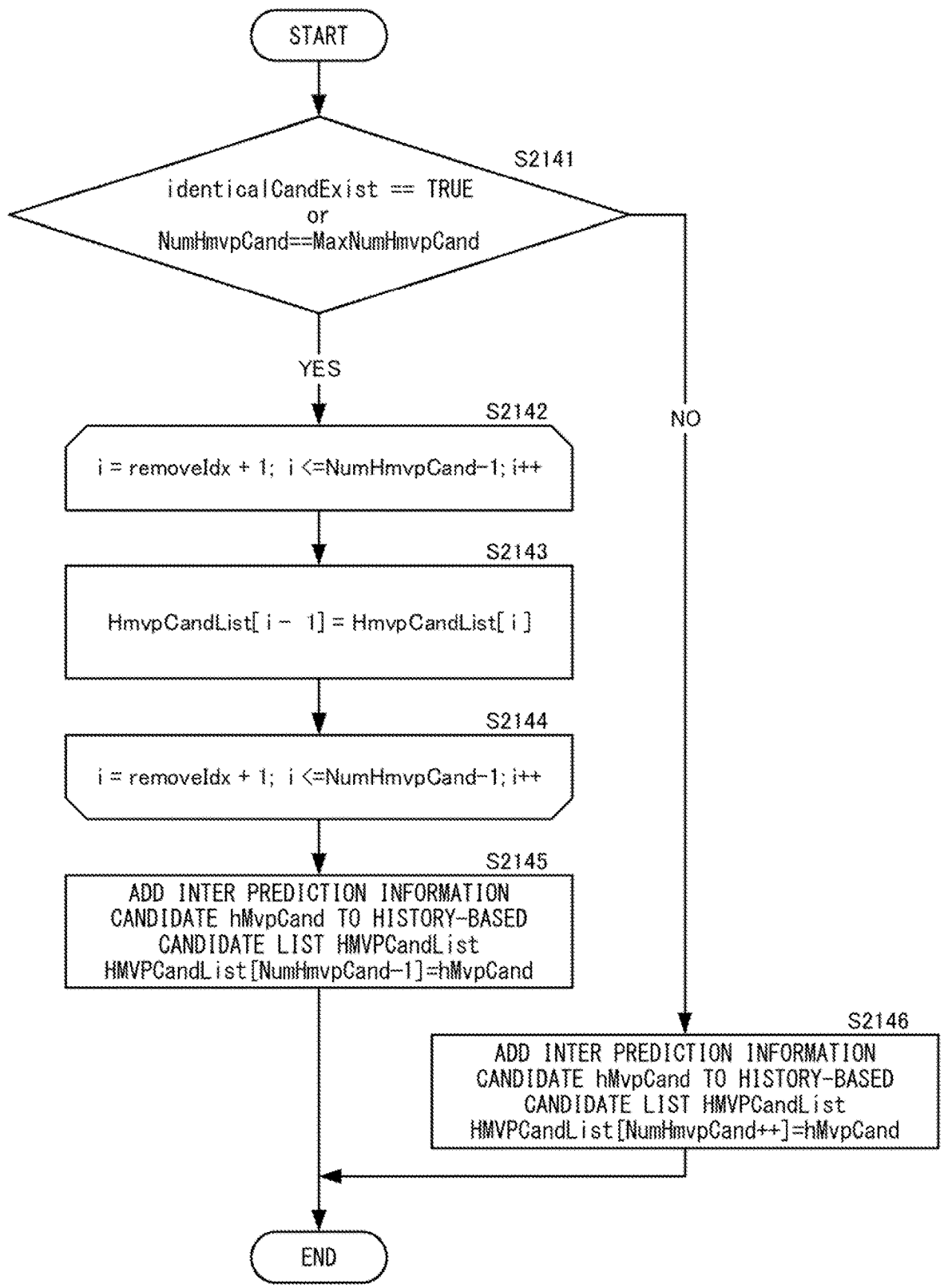
FIG. 28 is a flowchart of an element shift processing procedure in the processing procedure of initializing/updating a history-based motion vector predictor candidate list.

Referring to the flowchart of FIG. 26 again, a process of shifting and adding an element of the history-based motion vector predictor candidate list HmvpCandList is performed (step S2106 of FIG. 26). FIG. 28 is a flowchart of a processing procedure of shifting/adding an element of the history-based motion vector predictor candidate list HmvpCandList of step S2106 of FIG. 26. First, it is determined whether or not to add a new element after removing an element stored in the history-based motion vector predictor candidate list HmvpCandList or to add a new element without removing the element. Specifically, a comparison is made regarding whether or not the flag identicalCandExist indicating whether or not there is an identical candidate is TRUE or whether or not the current number of candidates NumHmvpCand has reached the maximum number of candidates MaxNumHmvpCand (step S2141 of FIG. 28). When the current number of candidates NumHmvpCand is the same value as the maximum number of candidates MaxNumHmvpCand, it indicates that the maximum number of elements have been added to the history-based motion vector predictor candidate list HmvpCandList. When one of a condition in which the flag identicalCandExist indicating whether or not there is an identical candidate is TRUE and a condition in which NumHmvpCand has the same value as MaxNumHmvpCand is satisfied (step S2141 of FIG. 28: YES), a new element is added after an element stored in the history-based motion vector predictor candidate list HmvpCandList is removed. Specifically, when the flag identicalCandExist indicating whether or not there is an identical candidate is TRUE, an identical candidate is removed from the history-based motion vector predictor candidate list HmvpCandList. When NumHmvpCand has the same value as MaxNumHmvpCand, a candidate (an element) at the beginning is removed from the history-based motion vector predictor candidate list HmvpCandList. The initial value of the index i is set to a value of removeIdx+1. removeIdx is a removal target index indicating a candidate for a removal target. An element shift process of step S2143 is iterated until the index i is set from the initial value of removeIdx+1 to NumHmvpCand−1 (steps S2142 to S2144 of FIG. 28). By copying the element of HmvpCandList[i] to HmvpCandList[i−1], the element is shifted forward (step S2143 of FIG. 28) and i is incremented by 1 (steps S2142 to S2144 of FIG. 28). When the index i becomes NumHmvpCand and the element shift process of step S2143 is completed, the inter prediction information candidate hMvpCand is added to the end of the history-based motion vector predictor candidate list (step S2145 of FIG. 28). Here, the end of the history-based motion vector predictor candidate list is a (NumHmvpCand−1)$^{th}$ element HmvpCandList[NumHmvpCand−1] when counted from a 0$^{th}$ element. Accordingly, the present process of shifting and adding an element of the history-based motion vector predictor candidate list HmvpCandList ends. On the other hand, when both a condition in which the flag identicalCandExist indicating whether or not there is an identical candidate is TRUE and a condition in which NumHmvpCand has the same value as MaxNumHmvpCand are not satisfied (step S2141 of FIG. 28: NO), i.e., when the flag identicalCandExist indicating whether or not there is an identical candidate is FALSE and NumHmvpCand is smaller than MaxNumHmvpCand, an inter prediction information candidate hMvpCand is added at a position next to the last element of the history-based motion vector predictor candidate list without removing the elements stored in the history-based motion vector predictor candidate list HmvpCandList (step S2146 of FIG. 28). Here, the position next to the last element of the history-based motion vector predictor candidate list corresponds to a NumHmvpCand$^{th}$ element HmvpCandList[NumHmvpCand] when counted from a 0th element. When no element is added to the history-based motion vector predictor candidate list, the position will be the position of the 0$^{th}$ element. Also, NumHmvpCand is incremented by 1 and the present process of shifting and adding an element of the history-based motion vector predictor candidate list HmvpCandList ends.

FIGS. 31A to 31C are explanatory diagrams showing an example of a process of updating the history-based motion vector predictor candidate list. If a new element is added when six elements (inter prediction information) corresponding to a size MaxNumMergeCand of the history-based motion vector predictor candidate list have been registered in the history-based motion vector predictor candidate list HmvpCandList, the elements are compared with the new inter prediction information in order from a front element of the history-based motion vector predictor candidate list HmvpCandList (FIG. 31A). If the new element has the same value as a third element HMVP2 from the beginning of the history-based motion vector predictor candidate list HmvpCandList, the element HMVP2 is removed from the history-based motion vector predictor candidate list HmvpCandList and subsequent elements HMVP3 to HMVP5 are shifted forward (copied) one by one, and the new element is added to the end of the history-based motion vector predictor candidate list HmvpCandList (FIG. 31B) to complete the update of the history-based motion vector predictor candidate list HmvpCandList (FIG. 31C).

<History-Based Motion Vector Predictor Candidate Derivation Process>

Figure 29:
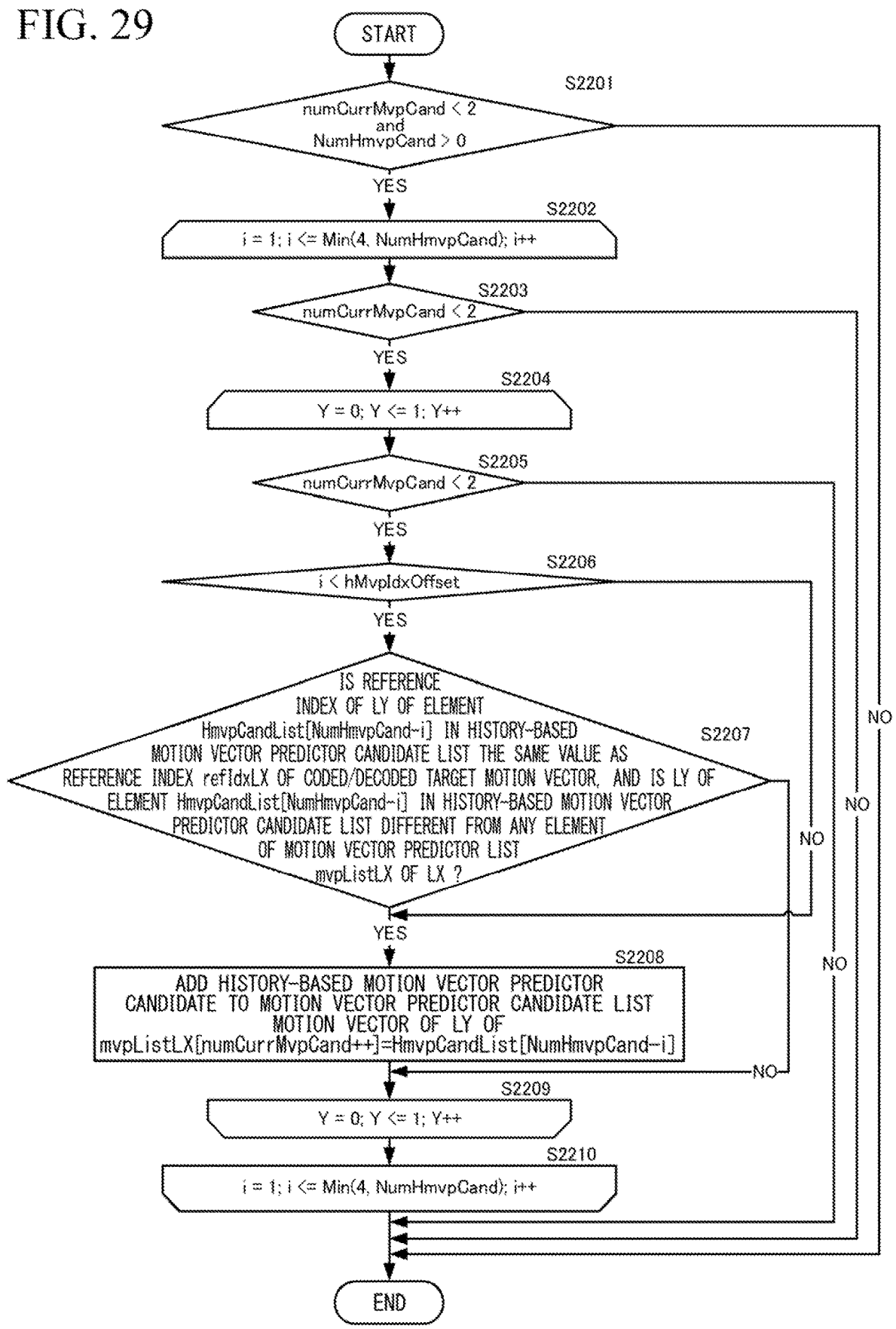
FIG. 29 is an explanatory flowchart showing a history-based motion vector predictor candidate derivation processing procedure.

Next, a method of deriving a history-based motion vector predictor candidate from the history-based motion vector predictor candidate list HmvpCandList which is a processing procedure of step S304 of FIG. 20 that is a process common to the history-based motion vector predictor candidate derivation unit 323 of the normal motion vector predictor mode derivation unit 301 of the coding side and the history-based motion vector predictor candidate derivation unit 423 of the normal motion vector predictor mode derivation unit 401 of the decoding side will be described in detail. FIG. 29 is an explanatory flowchart showing a history-based motion vector predictor candidate derivation processing procedure.

When the current number of motion vector predictor candidates numCurrMvpCand is larger than or equal to the maximum number of elements in the motion vector predictor candidate list mvpListLX (here, 2) or a value of the number of history-based motion vector predictor candidates NumHmvpCand (the number of elements registered in the history-based motion vector predictor candidate list) is 0 (step S2201 of FIG. 29: NO), the processing of steps S2202 to S2210 of FIG. 29 is omitted and the history-based motion vector predictor candidate derivation processing procedure ends. When the current number of motion vector predictor candidates numCurrMvpCand is smaller than 2 which is the maximum number of elements of the motion vector predictor candidate list mvpListLX and the value of the number of history-based motion vector predictor candidates NumHmvpCand is larger than 0 (step S2201 of FIG. 29: YES), the processing of steps S2202 to S2210 of FIG. 29 is performed.

Subsequently, the processing of steps S2203 to S2209 of FIG. 29 is iterated until the index i changes from 1 to a smaller value between 4, which is a predetermined upper limit value, and the number of history-based motion vector predictor candidates NumHmvpCand (steps S2202 to S2210 of FIG. 29). When the current number of motion vector predictor candidates numCurrMvpCand is larger than or equal to 2, which is the maximum number of elements of the motion vector predictor candidate list mvpListLX (step S2203 of FIG. 29: NO), the processing of steps S2204 to S2210 in FIG. 29 is omitted and the present history-based motion vector predictor candidate derivation processing procedure ends. When the current number of motion vector predictor candidates numCurrMvpCand is smaller than 2, which is the maximum number of elements of the motion vector predictor candidate list mvpListLX (step S2203 of FIG. 29: YES), the processing from step S2204 of FIG. 29 is performed.

Subsequently, the process from steps S2205 to S2208 is performed for each case in which a reference list LY of each element of the history-based motion vector predictor candidate list HmvpCandList is L0 and L1 (steps S2204 to S2209 of FIG. 29). It is shown that the processing of steps S2205 to S2208 of FIG. 29 is performed for L0 and L1 of the history-based motion vector predictor candidate list HmvpCandList, respectively. When the current number of motion vector predictor candidates numCurrMvpCand is larger than or equal to 2, which is the maximum number of elements of the motion vector predictor candidate list mvpListLX (step S2205 of FIG. 29: NO), the process of step S2206 to S2210 of FIG. 29 is omitted and the present history-based motion vector predictor candidate derivation processing procedure ends. When the current number of motion vector predictor candidates numCurrMvpCand is smaller than 2, which is the maximum number of elements of the motion vector predictor candidate list mvpListLX (step S2205 of FIG. 29: YES), the processing from step S2206 of FIG. 29 is performed.

Subsequently, the motion vector of the element of the history-based motion vector predictor candidate list is added to the motion vector predictor candidate list as the motion vector predictor candidate. At this time, it is checked whether or not a number of elements specified by the offset value hMvpIdxOffset from the back end of the history-based motion vector predictor candidate list are elements which are not included in the motion vector predictor candidate list in descending order, an element which is not included in the motion vector predictor candidate list is added to the motion vector predictor candidate list. Subsequently, an element of the history-based motion vector predictor candidate list is added to the motion vector predictor candidate list without checking whether or not the elements are elements which are not included in the motion vector predictor candidate list in descending order. It is possible to reduce the number of comparisons between the elements to be described below by setting the offset value hMvpIdxOffset to a value smaller than the maximum number of elements in the history-based motion vector predictor candidate list HmvpCandList. The reason why comparisons are made by the number of elements specified by the offset value hMvpIdxOffset from the back end of the history-based motion vector predictor candidate list when the history-based motion vector predictor candidate list is checked will be described with reference to FIGS. 38A to 38D.

FIGS. 38A to 38D show relationships between three examples when the block is divided into four parts and the history-based motion vector predictor candidate list. A case in which each coding block has been coded in the normal motion vector predictor mode or the normal merge mode will be described. FIG. 38A is a diagram when the coding block of the coding/decoding target is an upper right block. In this case, the inter prediction information of the block on the left side of the coding block of the coding/decoding target is likely to be the last element HMVP5 of the history-based motion vector predictor candidate list. FIG. 38B is a diagram when the coding block of the coding/decoding target is a lower left block. In this case, the inter prediction information of the block on the upper right side of the coding block of the coding/decoding target is likely to be the last element HMVP5 of the history-based motion vector predictor candidate list and the inter prediction information of the block on the upper side of the coding block of the coding/decoding target is likely to be the penultimate element HMVP4 of the history-based motion vector predictor candidate list.

FIG. 38C is a diagram when the coding block of the coding/decoding target is the lower right block. In this case, the inter prediction information of the block on the left side of the coding block of the coding/decoding target is likely to be the last element HMVP5 of the history-based motion vector predictor candidate list, the inter prediction information of the block on the upper side of the coding block of the coding/decoding target is likely to be the penultimate element HMVP4 of the history-based motion vector predictor candidate list, and the inter prediction information of the block on the upper left side of the coding block of the coding/decoding target is likely to be the antepenultimate element HMVP3 of the history-based motion vector predictor candidate list. That is, the last element of the history-based motion vector predictor candidate list is most likely to be derived as a spatial motion vector predictor candidate.

As shown in FIG. 38D, the offset value hMvpIdxOffset is set to 1 to make the comparison with only the last element HMVP5 of the history-based motion vector predictor candidate list, which is most likely to be derived as a spatial motion vector predictor candidate. Further, the offset value hMvpIdxOffset can be set to 2 to make the comparison with the penultimate element of the history-based motion vector predictor candidate list, which is second most likely to be derived as a spatial motion vector predictor candidate. Further, the offset value hMvpIdxOffset can be set to 3 to make the comparison with the antepenultimate element of the history-based motion vector predictor candidate list, which is third most likely to be derived as a spatial motion vector predictor candidate. By setting the offset value hMvpIdxOffset to a value of 1 or more as described above, the maximum number of times the elements of the history-based motion vector predictor candidate list are compared is reduced, so that the maximum amount of processing is reduced. Also, by setting the offset value hMvpIdxOffset to 0, the number of comparisons of the elements of the history-based motion vector predictor candidate list becomes 0 and the comparison process is omitted.

When the index i is smaller than the offset value hMvpIdxOffset, i.e., when it is checked whether or not the element is an element not included in the motion vector predictor candidate list, (step S2206 of FIG. 29: YES) and when a reference index of LY of an element HmvpCandList [NumHmvpCand−i] in the history-based motion vector predictor candidate list is the same value as a reference index refIdxLX of a coding/decoding target motion vector and LY of the element HmvpCandList[NumHmvpCand−i] in the history-based motion vector predictor candidate list is different from any element of the motion vector predictor candidate list mvpListLX (step S2207 of FIG. 29: YES), a motion vector of LY of the history-based motion vector predictor candidate HmvpCandList [NumHmvpCand−i] is added to a numCurrMvpCand$^{th}$ element mvpListLX[numCurrMvpCand] when counted from a $0^{th}$ element of the motion vector predictor candidate list in the motion vector predictor candidate list mvpListLX as the last element of the motion vector predictor candidate list (step S2208 in FIG. 29) and the current number of motion vector predictor candidates numCurrMvpCand is incremented by 1. When there is no element in the history-based motion vector predictor candidate list HmvpCandList, which has the same reference index as the reference index refIdxLX of the coding/decoding target motion vector and is different from any element of the motion vector predictor list mvpListLX (step S2207 of FIG. 29: NO), the addition process of step S2208 is skipped.

On the other hand, when the index i is not smaller than the offset value hMvpIdxOffset, i.e., when it is not checked whether or not the element is an element not included in the motion vector predictor candidate list (step S2206 of FIG. 29: NO), a motion vector of LY of the history-based motion vector predictor candidate HmvpCandList [NumHmvpCand−i] is added to a numCurrMvpCand$^{th}$ element mvpListLX[numCurrMvpCand] when counted from a $0^{th}$ element of the motion vector predictor candidate list as the last element of the motion vector predictor candidate list (step S2208 in FIG. 29) and the current number of motion vector predictor candidates numCurrMvpCand is incremented by 1.

The above processing of steps S2205 to S2208 of FIG. 29 is performed in both L0 and L1 (steps S2204 to S2209 of FIG. 29).

When the index i is incremented by 1 (steps S2202 and S2210 of FIG. 29) and the index i is smaller than or equal to a smaller value between 4, which is the predetermined upper limit value, and the number of history-based motion vector predictor candidates NumHmvpCand, the processing from step S2203 is performed again (steps S2202 to S2210 of FIG. 29).

<History-Based Merging Candidate Derivation Process>

Figure 30:
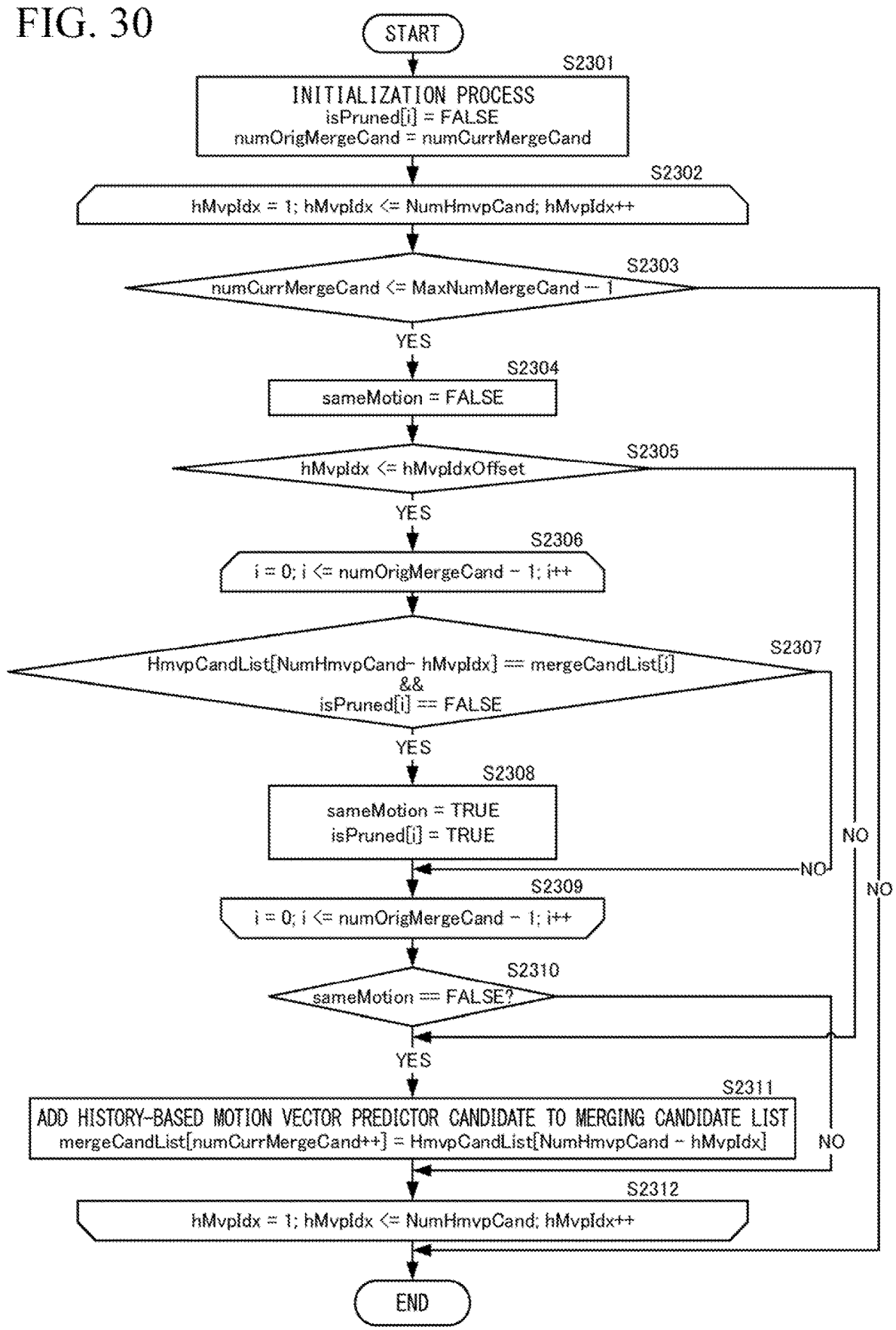
FIG. 30 is an explanatory flowchart showing a history-based merging candidate derivation processing procedure.

Next, a method for deriving a history-based merging candidate from the history-based merging candidate list HmvpCandList in a procedure of the processing of step S404 of FIG. 21 which is the common processing between the history-based merging candidate derivation unit 345 of the normal merge mode derivation unit 302 on the coding side and the history-based merging candidate derivation unit 445 of the normal merge mode derivation unit 402 on the decoding side will be described in detail. FIG. 30 is a flowchart showing a history-based merging candidate derivation processing procedure.

First, an initialization process is performed (step S2301 in FIG. 30). A value of FALSE is set in each of elements from a $0^{th}$ element to a (numCurrMergeCand−1)$^{th}$ element of the flag isPruned[i] and the number of elements numCurrMergeCand registered in the current merging candidate list is set in a variable numOrigMergeCand.

Subsequently, an element, which is not included in the merging candidate list, among elements of the history-based motion vector predictor list is added to the merging candidate list. At this time, the history-based motion vector predictor list is checked in descending order from the back end thereof and an element is added. An initial value of the index hMvpIdx is set to 1 and the addition process from step S2303 to step S2311 of FIG. 30 is iterated from the initial value to NumHmvpCand (steps S2302 to S2312 of FIG. 30). If the number of elements numCurrMergeCand registered in the current merging candidate list is not smaller than or equal to (maximum number of merging candidates MaxNumMergeCand−1), i.e., if the number of elements numCurrMergeCand registered in the current merging candidate list reaches the maximum number of merging candidates MaxNumMergeCand, the merging candidates have been added to all the elements of the merging candidate list and hence the present history-based merging candidate derivation process ends (step S2303 of FIG. 30: NO). When the number of elements numCurrMergeCand registered in the current merging candidate list is smaller than or equal to (maximum number of merging candidates MaxNumMergeCand−1) (step S2303 of FIG. 30: YES), the processing from step S2304 is performed.

A value of FALSE is set in a variable sameMotion indicating the same motion information (step S2304 of FIG. 30). Subsequently, the inter prediction information, which is an element of the history-based motion vector predictor candidate list, is added to the merging candidate list as a merging candidate. At this time, it is checked whether or not a number of elements specified by the offset value hMvpIdxOffset from the element of the back end of the history-based motion vector predictor candidate list (the most recently added element) are elements which are not included in the merging candidate list in descending order, an element which is not included in the merging candidate list is added to the merging candidate list. Subsequently, an element of the history-based motion vector predictor candidate list is added to the merging candidate list without checking whether or not the elements are elements which are not included in the merging candidate list in descending order. It is possible to reduce the number of comparisons between the elements to be described below by setting the offset value hMvpIdxOffset to a value smaller than the maximum number of elements in the history-based motion vector predictor candidate list HmvpCandList. The reason why comparisons are made by the number of elements specified by the offset value hMvpIdxOffset from the element of the back end of the history-based motion vector predictor candidate list (the most recently added element) when the history-based motion vector predictor candidate list is checked will be described with reference to FIGS. 38A to 38D. FIGS. 38A to 38D show relationships between three examples when the block is divided into four parts and the history-based motion vector predictor candidate list. A case in which each coding block has been coded in the normal motion vector predictor mode or the normal merge mode will be described. FIG. 38A is a diagram when the coding block of the coding/decoding target is an upper right block. In this case, the inter prediction information of the block on the left side of the coding block of the coding/decoding target is likely to be the last element HMVP5 of the history-based motion vector predictor candidate list. FIG. 38B is a diagram when the coding block of the coding/decoding target is a lower left block. In this case, the inter prediction information of the block on the upper right side of the coding block of the coding/decoding target is likely to be the last element HMVP5 of the history-based motion vector predictor candidate list and the inter prediction information of the block on the upper side of the coding block of the coding/decoding target is likely to be the penultimate element HMVP4 of the history-based motion vector predictor candidate list. FIG. 38C is a diagram when the coding block of the coding/decoding target is the lower right block. In this case, the inter prediction information of the block on the left side of the coding block of the coding/decoding target is likely to be the last element HMVP5 of the history-based motion vector predictor candidate list, the inter prediction information of the block on the upper side of the coding block of the coding/decoding target is likely to be the penultimate element HMVP4 of the history-based motion vector predictor candidate list, and the inter prediction information of the block on the upper left side of the coding block of the coding/decoding target is likely to be the antepenultimate element HMVP3 of the history-based motion vector predictor candidate list. That is, the last element of the history-based motion vector predictor candidate list is most likely to be derived as a spatial merging candidate. As shown in FIG. 38D, the offset value hMvpIdxOffset is set to 1 to make the comparison with only the last element HMVP5 of the history-based motion vector predictor candidate list, which is most likely to be derived as a spatial merging candidate. Further, the offset value hMvpIdxOffset can be set to 2 to make the comparison with the penultimate element of the history-based motion vector predictor candidate list, which is second most likely to be derived as a spatial merging candidate. Further, the offset value hMvpIdxOffset can be set to 3 to make the comparison with the antepenultimate element of the history-based motion vector predictor candidate list, which is third most likely to be derived as a spatial merging candidate. By setting the offset value hMvpIdxOffset to a value from 1 to 3 as described above as the predetermined value and setting a number of elements specified by the offset value hMvpIdxOffset from the element of the back end of the history-based motion vector predictor candidate list (the most recently added element) and spatial merging candidates or only elements stored in the merging candidate list as comparison targets, the maximum number of comparisons of elements of the history-based motion vector predictor candidate list is reduced and therefore the maximum amount of processing is reduced.

When the index hMvpIdx is smaller than or equal to the predetermined offset value hMvpIdxOffset, i.e., when it is checked whether or not the element is an element which is not included in the merging candidate list (step S2305 of FIG. 30: YES), the initial value of the index i is set to 0 and the processing of steps S2307 and S2308 of FIG. 30 is performed from the initial value to numOrigMergeCand−1 (S2306 to S2309 of FIG. 30). A comparison is made regarding whether or not a (NumHmvpCand−hMvpIdx)$^{th}$ element HmvpCandList[NumHmvpCand−hMvpIdx] when counted from a $0^{th}$ element of the history-based motion vector predictor candidate list has the same value as an $i^{th}$ element mergeCandList[i] when counted from a $0^{th}$ element of the merging candidate list (Step S2307 of FIG. 30). The same values between the merging candidates indicate that values of all inter prediction information components that the merging candidates have (an inter prediction mode, reference indices of L0 and L1, and motion vectors of L0 and L1) are the same. Therefore, in the comparison process of step S2307, when isPruned[i] is FALSE, a comparison is made regarding whether or not values of all components that mergeCandList[i] and HmvpCandList[NumHmvpCand−hMvpIdx] have (an inter prediction mode, reference indices of L0 and L1, and motion vectors of L0 and L1) are the same. When the values are the same (step S2307 of FIG. 30: YES), TRUE is set for both sameMotion and isPruned[i] (step S2308 of FIG. 30). Also, the flag isPruned[i] is a flag indicating that an $i^{th}$ element when counted from a $0^{th}$ element of the merging candidate list has the same value as any element of the history-based motion vector predictor candidate list. When the values are not the same (step S2307 of FIG. 30: NO), the processing of step S2308 is skipped. When the iterative process from step S2306 to step S2309 of FIG. 30 is completed, a comparison is made regarding whether or not sameMotion is FALSE (step S2310 of FIG. 30). When sameMotion is FALSE (step S2310 of FIG. 30: YES), i.e., because a (NumHmvpCand−hMvpIdx)$^{th}$ element when counted from the 0$^{th}$ element of the history-based motion vector predictor candidate list is not present in mergeCandList, a (NumHmvpCand−hMvpIdx)$^{th}$ element HmvpCandList[NumHmvpCand−hMvpIdx] when counted from the 0$^{th}$ element of the history-based motion vector predictor candidate list is added to a numCurrMergeCand$^{th}$ element mergeCandList[numCurrMergeCand] of the merging candidate list as the last element of the merging candidate list and numCurrMergeCand is incremented by 1 (step S2311 of FIG. 30). On the other hand, when the index hMvpIdx is not smaller than the offset value hMvpIdxOffset, i.e., when it is not checked whether or not the element is an element which is not included in the merging candidate list (step S2305 of FIG. 30: NO), a (NumHmvpCand−hMvpIdx)$^{th}$ element HmvpCandList[NumHmvpCand−hMvpIdx] when counted from the 0$^{th}$ element of the history-based motion vector predictor candidate list is added to a numCurrMergeCand$^{th}$ element mergeCandList[numCurrMergeCand] of the merging candidate list as the last element of the merging candidate list and numCurrMergeCand is incremented by 1 (step S2312 of FIG. 30).

Further, the index hMvpIdx is incremented by 1 (step S2302 of FIG. 30) and the iterative processing of steps S2302 to S2312 of FIG. 30 is performed.

When the checking of all elements of the history-based motion vector predictor candidate list is completed or when merging candidates are added to all elements of the merging candidate list, the present history-based merging candidate derivation process is completed.

<Motion-Compensated Prediction Process>

The motion-compensated prediction unit 306 acquires a position and a size of a block that is a current target of a prediction process in coding. Also, the motion-compensated prediction unit 306 acquires inter prediction information from the inter prediction mode determination unit 305. A reference index and a motion vector are derived from the acquired inter prediction information and a prediction signal is generated after a picture signal of a position to which a reference picture identified by the reference index within the decoded picture memory 104 is moved from a position identical to that of a picture signal of a prediction block by an amount of motion vector is acquired.

A motion-compensated prediction signal is supplied to a prediction method determination unit 105 using a prediction signal acquired from one reference picture as a motion-compensated prediction signal when the inter prediction mode in the inter prediction is prediction from a single reference picture such as L0-prediction or L1-prediction and using a prediction signal obtained by weighted-averaging prediction signals acquired from two reference pictures as a motion-compensated prediction signal when the prediction mode is prediction from two reference pictures such as an inter prediction mode of BI prediction. Although a weighted average ratio of bi-prediction is 1:1 here, a weighted average may be performed using another ratio. For example, a weighting ratio may increase as the picture interval between a picture, which is a prediction target, and a reference picture decreases. Also, the weighting ratio may be calculated using a corresponding table between combinations of picture intervals and weighting ratios.

The motion-compensated prediction unit 406 has a function similar to that of the motion-compensated prediction unit 306 of the coding side. The motion-compensated prediction unit 406 acquires inter prediction information from the normal motion vector predictor mode derivation unit 401, the normal merge mode derivation unit 402, the sub-block-based motion vector predictor mode derivation unit 403, and the subblock-based merge mode derivation unit 404 via the switch 408. The motion-compensated prediction unit 406 supplies an obtained motion-compensated prediction signal to the decoding picture signal superimposition unit 207.

<About Inter Prediction Mode>

A process of performing prediction from a single reference picture is defined as uni-prediction. In the case of uni-prediction, prediction using either one of two reference pictures registered in reference lists L0 and L1 such as L0-prediction or L1-prediction is performed.

Figure 32:
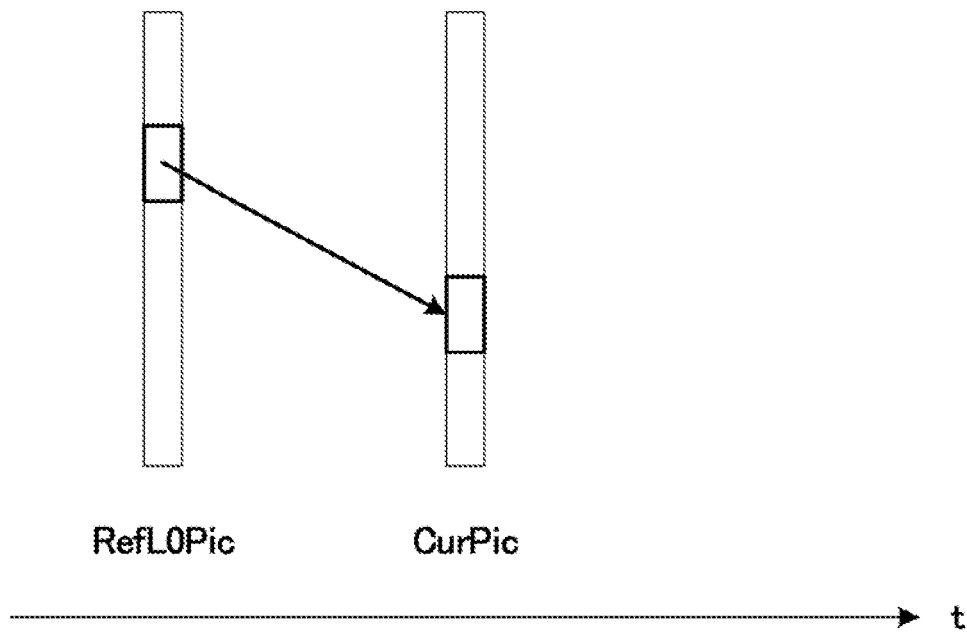
FIG. 32 is an explanatory diagram showing motion-compensated prediction when a clock time of a reference picture (RefL0Pic) of L0 is earlier than that of a target picture (CurPic) as L0-prediction.
Figure 33:
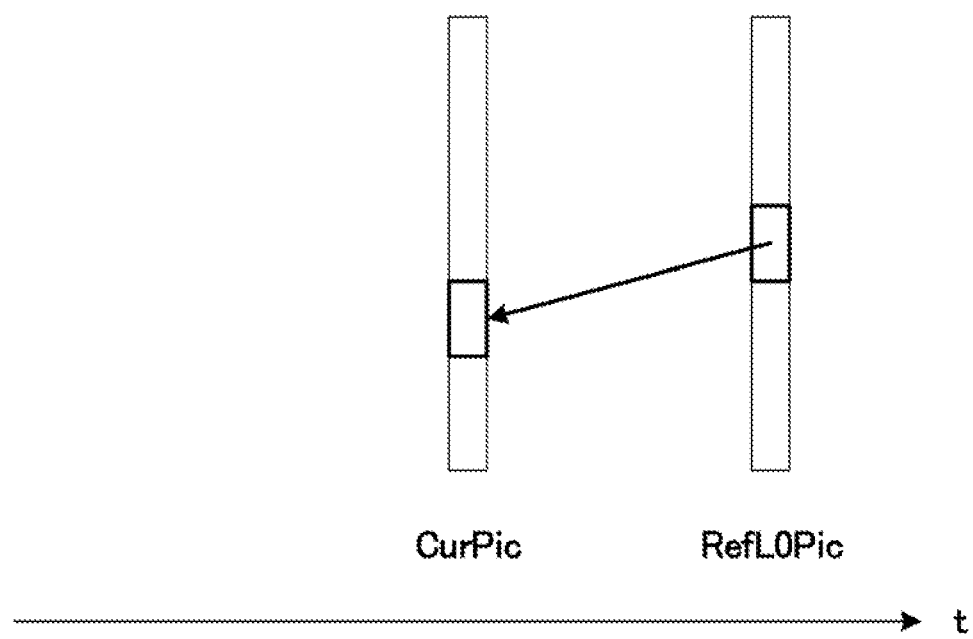
FIG. 33 is an explanatory diagram showing motion-compensated prediction when a clock time of a reference picture of L0-prediction is later than that of a target picture as L0-prediction.

FIG. 32 shows the case of uni-prediction in which a clock time of a reference picture (RefL0Pic) of L0 is earlier than that of a target picture (CurPic). FIG. 33 shows the case of uni-prediction in which a clock time of a reference picture of the L0-prediction is later than that of a target picture. Likewise, the reference picture of L0-prediction of FIGS. 32 and 33 can be replaced with a reference picture (RefL1Pic) of L1-prediction to perform uni-prediction.

Figure 34:
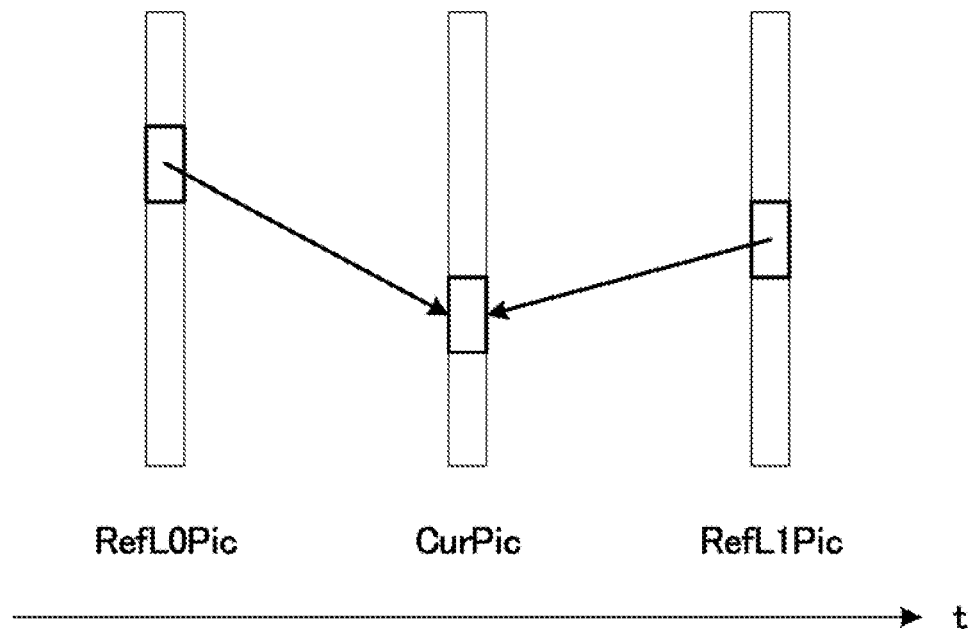
FIG. 34 is an explanatory diagram showing a prediction direction of motion-compensated prediction when a clock time of a reference picture of L0-prediction is earlier than that of a target picture and a clock time of a reference picture of L1-prediction is later than that of a target picture as bi-prediction.
Figure 35:
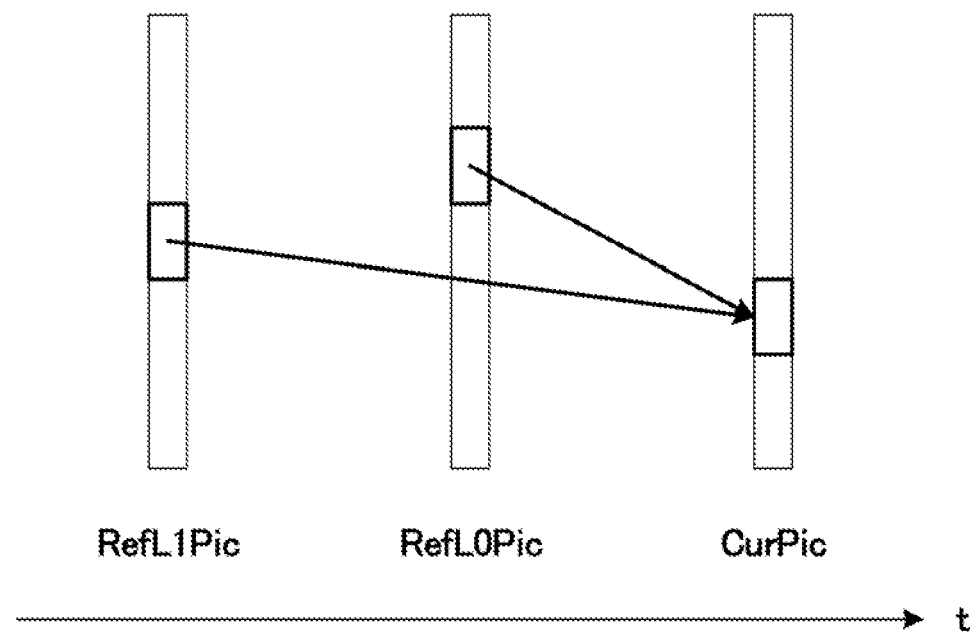
FIG. 35 is an explanatory diagram showing a prediction direction of motion-compensated prediction when a clock time of a reference picture of L0-prediction and a clock time of a reference picture of L1-prediction are earlier than that of a target picture as bi-prediction.
Figure 36:
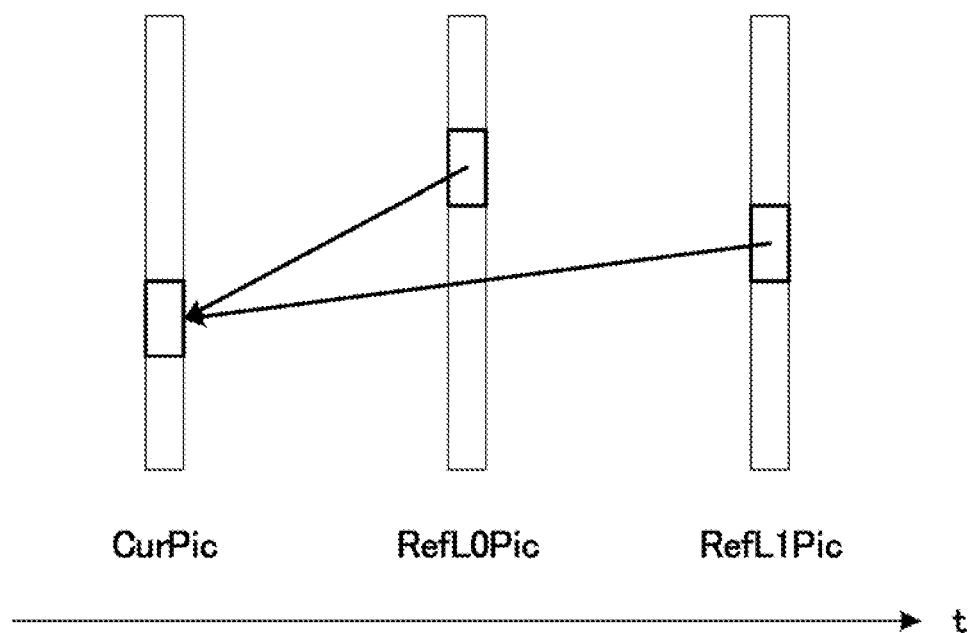
FIG. 36 is an explanatory diagram showing a prediction direction of motion-compensated prediction when a clock time of a reference picture of L0-prediction and a clock time of a reference picture of L1-prediction are later than that of a target picture as bi-prediction.

The process of performing prediction from two reference pictures is defined as bi-prediction and the bi-prediction is represented as BI prediction using both L0-prediction and L1-prediction. FIG. 34 shows the case of the bi-prediction in which a clock time of a reference picture of L0-prediction is earlier than that of a target picture and a clock time of a reference picture of L1-prediction is later than that of the target picture. FIG. 35 shows the case of bi-prediction in which clock times of the reference picture of L0-prediction and the reference picture of L1-prediction are earlier than that of a target picture. FIG. 36 shows the case of bi-prediction in which a clock time of a reference picture of L0-prediction and a clock time of a reference picture of L1-prediction are later than that of a target picture.

As described above, a relationship between a type of prediction of L0/L1 and time can be used without being limited to L0 which is in the past direction and L1 which is in the future direction. In the case of bi-prediction, each of L0-prediction and L1-prediction may be performed using the same reference picture. Also, it is determined whether to perform motion-compensated prediction according to uni-prediction or bi-prediction on the basis of, for example, information (for example, a flag) indicating whether to use L0-prediction and whether to use L1-prediction.

<About Reference Index>

In the embodiment of the present invention, it is possible to select an optimum reference picture from a plurality of reference pictures in motion-compensated prediction to improve the accuracy of motion-compensated prediction. Thus, the reference picture used in the motion-compensated prediction is used as a reference index and the reference index is coded in the bitstream together with the motion vector difference.

<Motion Compensation Process Based on Normal Motion Vector Predictor Mode>

As shown in the inter prediction unit 102 of the coding side of FIG. 16, when inter prediction information from the normal motion vector predictor mode derivation unit 301 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 of the decoding side of FIG. 22, when the switch 408 has been connected to the normal motion vector predictor mode derivation unit 401 in the decoding process, the motion-compensated prediction unit 406 acquires inter prediction information from the normal motion vector predictor mode derivation unit 401, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Normal Merge Mode>

Also, as shown in the inter prediction unit 102 in the coding side of FIG. 16, when inter prediction information has been selected from the normal merge mode derivation unit 302 in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the normal merge mode derivation unit 402 in the decoding process, the motion-compensated prediction unit 406 acquires inter prediction information from the normal merge mode derivation unit 402, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Subblock-Based Motion Vector Predictor Mode>

Also, as shown in the inter prediction unit 102 on the coding side of FIG. 16, when inter prediction information from the subblock-based motion vector predictor mode derivation unit 303 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the subblock-based motion vector predictor mode derivation unit 403 in the decoding process, the motion-compensated prediction unit 406 acquires inter prediction information from the subblock-based motion vector predictor mode derivation unit 403, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Subblock-Based Merge Mode>

Also, as shown in the inter prediction unit 102 on the coding side of FIG. 16, when inter prediction information from the subblock-based merge mode derivation unit 304 has been selected in the inter prediction mode determination unit 305, the motion-compensated prediction unit 306 acquires the inter prediction information from the inter prediction mode determination unit 305, derives an inter prediction mode, a reference index, and a motion vector of a current target block, and generates a motion-compensated prediction signal. The generated motion-compensated prediction signal is supplied to the prediction method determination unit 105.

Likewise, as shown in the inter prediction unit 203 in the decoding side of FIG. 22, when the switch 408 has been connected to the subblock-based merge mode derivation unit 404 in the decoding process, the motion-compensated prediction unit 406 acquires inter prediction information from the subblock-based merge mode derivation unit 404, derives an inter prediction mode, a reference index, and a motion vector of a current target block, and generates a motion-compensated prediction signal. The generated motion-compensated prediction signal is supplied to the decoding picture signal superimposition unit 207.

<Motion Compensation Process Based on Affine Transform Prediction>

In the normal motion vector predictor mode and the normal merge mode, motion compensation of an affine model can be used on the basis of the following flags. The following flags are reflected in the following flags on the basis of inter prediction conditions determined by the inter prediction mode determination unit 305 in the coding process and are coded in a bitstream. In the decoding process, it is identified whether to perform the motion compensation of the affine model on the basis of the following flags in the bitstream.

sps_affine_enabled_flag represents whether or not motion compensation of the affine model can be used in inter prediction. If sps_affine_enabled_flag is 0, suppression is performed so that it is not motion compensation of an affine model in units of sequences. Also, inter_affine_flag and cu_affine_type_flag are not transmitted in CU (coding block) syntax of a coding video sequence. If sps_affine_enabled_flag is 1, motion compensation of an affine model can be used in a coding video sequence.

sps_affine_type_flag represents whether or not motion compensation of a six-parameter affine model can be used in inter prediction. If sps_affine_type_flag is 0, suppression is performed so that it is not motion compensation of the six-parameter affine model. Also, cu_affine_type_flag is not transmitted in CU syntax of a coding video sequence. If sps_affine_type_flag is 1, motion compensation of the six-parameter affine model can be used in the coding video sequence. When sps_affine_type_flag does not exist, it is assumed to be 0.

When a P or B slice is decoded, if inter_affine_flag is 1 in the current target CU, motion compensation of the affine model is used to generate a motion-compensated prediction signal of the current target CU. If inter_affine_flag is 0, the affine model is not used in the current target CU. When inter_affine_flag does not exist, it is assumed to be 0.

When a P or B slice is decoded, if cu_affine_type_flag is 1 in the current target CU, motion compensation of a six-parameter affine model is used to generate a motion-compensated prediction signal of the current target CU. If cu_affine_type_flag is 0, motion compensation of a four-parameter affine model is used to generate a motion-compensated prediction signal of the current target CU.

In motion compensation of an affine model, because a reference index and a motion vector are derived in units of subblocks, a motion-compensated prediction signal is generated using a reference index or a motion vector which is a target in units of subblocks.

A four-parameter affine model is a mode in which the motion vector of the subblock is derived from four parameters of horizontal components and vertical components of motion vectors of the two control points and motion compensation is performed in units of subblocks.

Second Embodiment

Figure 39:
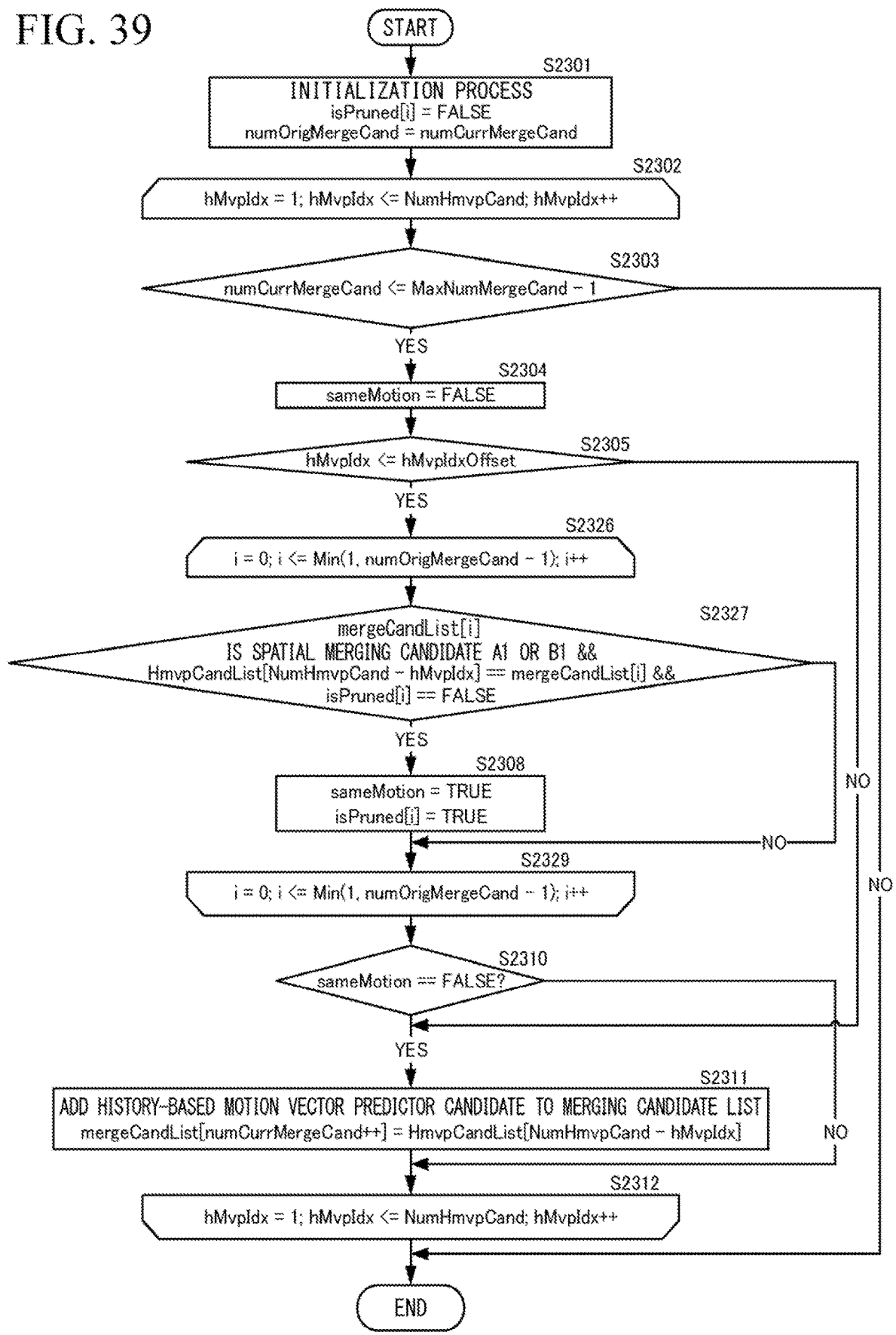
FIG. 39 is a flowchart illustrating a history-based merging candidate derivation processing procedure according to a second embodiment of the present invention.

Next, a picture coding device and a picture decoding device according to a second embodiment will be described. Although the picture coding device and the picture decoding device according to the second embodiment have the same configurations as the picture coding device and the picture decoding device according to the first embodiment, these are different in a processing procedure of history-based merging candidate derivation units 345 and 445. The processing procedure of the history-based merging candidate derivation units 345 and 445 is as shown in the flowchart of FIG. 39 instead of the flowchart of FIG. 30 and differences therebetween will be described.

<History-Based Merging Candidate Derivation Process of Second Embodiment>

The history-based merging candidate derivation process of the picture coding device and the picture decoding device according to the second embodiment will be described with reference to the flowchart of FIG. 39.

The second embodiment is different from the first embodiment in that a spatial merging candidate A1 derived from a block A1 adjacent to the left side of a target coding block and a spatial merging candidate B1 derived from a block B1 adjacent to the upper side thereof are compared with only a number of elements specified by an offset value hMvpIdxOffset from an element of a back end of a history-based motion vector predictor candidate list (the most recently added element). The flowchart according to the second embodiment is different from the flowchart of FIG. 30 showing the history-based merging candidate derivation process of the picture coding device and the picture decoding device according to the first embodiment in that steps S2306, S2307, and S2309 of FIG. 30 are changed to steps S2326, S2327, and S2329 of FIG. 39, respectively, and the flowcharts have the same process in others. In the second embodiment, the initialization process is first performed (step S2301 of FIG. 39). A value of FALSE is set in each of elements from a $0^{th}$ element to a (numCurrMergeCand$-1$)$^{th}$ element of isPruned[i] and the number of elements numCurrMergeCand registered in the current merging candidate list is set in a variable numOrigMergeCand.

Subsequently, an initial value of the index hMvpIdx is set to 1 and an addition process from step S2303 to step S2311 of FIG. 39 is iterated from the initial value to NumHmvpCand (steps S2302 to S2312 of FIG. 39). When the number of elements numCurrMergeCand registered in a current merging candidate list is not smaller than or equal to (maximum number of merging candidates MaxNumMergeCand$-1$), merging candidates have been added to all the elements in the merging candidate list and therefore the present history-based merging candidate derivation process ends (step S2303 of FIG. 39: NO). When the number of elements numCurrMergeCand registered in the current merging candidate list is smaller than or equal to (maximum number of merging candidates MaxNumMergeCand$-1$) (step S2303 of FIG. 39: YES), the processing from step S2304 is performed.

First, a value of FALSE is set in sameMotion (step S2304 of FIG. 39). Subsequently, when the index hMvpIdx is smaller than or equal to the predetermined offset value hMvpIdxOffset, i.e., when it is checked whether or not the element is an element which is not included in the merging candidate list (step S2305 of FIG. 39: YES), the initial value of the index i is set to 0 and the processing of steps S2327 and S2308 of FIG. 39 is performed from the initial value to a smaller value between 1, which is a predetermined upper limit value, and numOrigMergeCand$-1$ (steps S2326 to S2329 of FIG. 39). Here, in the second embodiment, a spatial merging candidate A1 derived from a block A1 adjacent to the left side of a target coding block and a spatial merging candidate B1 adjacent to the upper side thereof are compared with only a number of elements specified by an offset value hMvpIdxOffset from an element of a back end of a history-based motion vector predictor candidate list (the most recently added element). The predetermined upper limit value is 1 because the spatial merging candidate A1 derived from the block A1 adjacent to the left side of the target coding block or the spatial merging candidate B1 adjacent to the upper side thereof is likely to be stored in only $0^{th}$ and $1^{st}$ elements when counted from a $0^{th}$ element of the merging candidate list. A (NumHmvpCand$-$hMvpIdx)$^{th}$ element HmvpCandList[NumHmvpCand$-$hMvpIdx] when counted from a $0^{th}$ element of the history-based motion vector predictor candidate list is compared with the spatial merging candidates A1 and B1 (step S2327 of FIG. 39). A comparison is made regarding whether or not the values of all the components that the merging candidates have (an inter-prediction mode, reference indices of L0 and L1, and motion vectors of L0 and L1) are the same. Here, the same values between the merging candidates indicate that values of all the components that the merging candidates have (an inter prediction mode, reference indices of L0 and L1, and motion vectors of L0 and L1) are the same. Therefore, when an $i^{th}$ element mergeCandList[i] when counted from a $0^{th}$ element of the merging candidate list is the spatial merging candidate A1 derived from the block A1 adjacent to the left side or the spatial merging candidate B1 adjacent to the upper side and isPruned[i] is FALSE in the comparison process of step S2327, a comparison is made regarding whether or not the values of all the components that mergeCandList[i] and HmvpCandList[NumHmvpCand$-$hMvpIdx] have (an inter-prediction mode, reference indices of L0 and L1, and motion vectors of L0 and L1) are the same. When the values are the same (step S2327 of FIG. 39: YES), TRUE is set for both sameMotion and isPruned[i] (step S2308 of FIG. 39). Also, the flag isPruned[i] is a flag indicating that an $i^{th}$ element when counted from a $0^{th}$ element of the merging candidate list has the same value as any element in the history-based motion vector predictor candidate list. When the values are not the same (step S2327 of FIG. 39: NO), the processing of step S2308 is skipped. When the iterative process from step S2326 to step S2329 of FIG. 39 is completed, a comparison is made regarding whether or not sameMotion is FALSE (step S2310 of FIG. 39). When sameMotion is FALSE (step S2310 of FIG. 39: YES), a (NumHmvpCand$-$hMvpIdx)$^{th}$ element HmvpCandList[NumHmvpCand$-$hMvpIdx] when counted from a $0^{th}$ element of the history-based motion vector predictor candidate list is added to a numCurrMergeCand$^{th}$ element mergeCandList[numCurrMergeCand] of the merging candidate list and numCurrMergeCand is incremented by 1 (step S2311 of FIG. 39). The index hMvpIdx is incremented by 1 (step S2302 of FIG. 39) and the iterative processing of steps S2302 to S2312 of FIG. 39 is performed.

When the checking of all the elements of the history-based motion vector predictor candidate list is completed or the merging candidates are added to all the elements of the merging candidate list, the derivation process of the present history-based merging candidate is completed.

Although a case in which the spatial merging candidates A1 and B1 stored in the merging candidate list are compared with the elements of the history-based motion vector predictor candidate list has been described in the second embodiment, the spatial merging candidates A1 and B1 may be stored in a memory other than the merging candidate list and the spatial merging candidates A1 and B1 stored in the memory other than the merging candidate list may be compared with the elements of the history-based motion vector predictor candidate list.

Third Embodiment

Next, a picture coding device and a picture decoding device according to a third embodiment will be described. Although the picture coding device and the picture decoding device according to the third embodiment have the same configurations as the picture coding device and the picture decoding device according to the first embodiment, these are different in an identical element checking processing procedure in a processing procedure for initialization and updating a history-based motion vector predictor candidate list provided in a coding information storage memory 111 of a coding side and a coding information storage memory 205 of a decoding side. Instead of the flowchart of FIG. 27, which is the identical element checking processing procedure in the processing procedure for initialization and updating a history-based motion vector predictor candidate list according to the first embodiment, an identical element checking processing procedure in the processing procedure for initialization and updating the history-based motion vector predictor candidate list according to the third embodiment is as shown in a flowchart of FIG. 40. The above differences will be described.

<Identical Element Checking Processing Procedure in Processing Procedure for Initialization and Updating History-Based Motion Vector Predictor Candidate List According to Third Embodiment>

The identical element checking processing procedure in the processing procedure for initialization and updating the history-based motion vector predictor candidate list in the picture coding device and the picture decoding device according to the third embodiment will be described with reference to the flowchart of FIG. 40.

In a process of updating the history-based motion vector predictor candidate list, the third embodiment is different from the first embodiment in that, when the maximum number of elements are added to the history-based motion vector predictor candidate list HmvpCandList, i.e., when the current number of history-based motion vector predictor candidates NumHmvpCand reaches the maximum number of history-based motion vector predictor candidates MaxNumHmvpCand, a comparison is made with only elements from a $1^{st}$ element without making a comparison with an element at the beginning included in the history-based motion vector predictor candidate list, i.e., a $0^{th}$ element (history-based motion vector predictor candidate) when counted from the $0^{th}$ element. The elements included in the history-based motion vector predictor candidate list include an inter-prediction mode, a reference index, and a motion vector. Because the comparison is not made with the element at the beginning included in the history-based motion vector predictor candidate list, the number of element comparisons is limited to the maximum (MaxNumHmvpCand−1) and the maximum amount of processing associated with the element comparison is reduced. The flowchart according to the third embodiment is different from the flowchart of FIG. 27 showing the identical element checking processing procedure in the processing procedure for initialization and updating the history-based motion vector predictor candidate list according to the first embodiment in that steps S2122 and S2125 of FIG. 27 are changed to steps S2132 and S2135 of FIG. 40, respectively, and the flowcharts have the same process in others.

Figure 40:
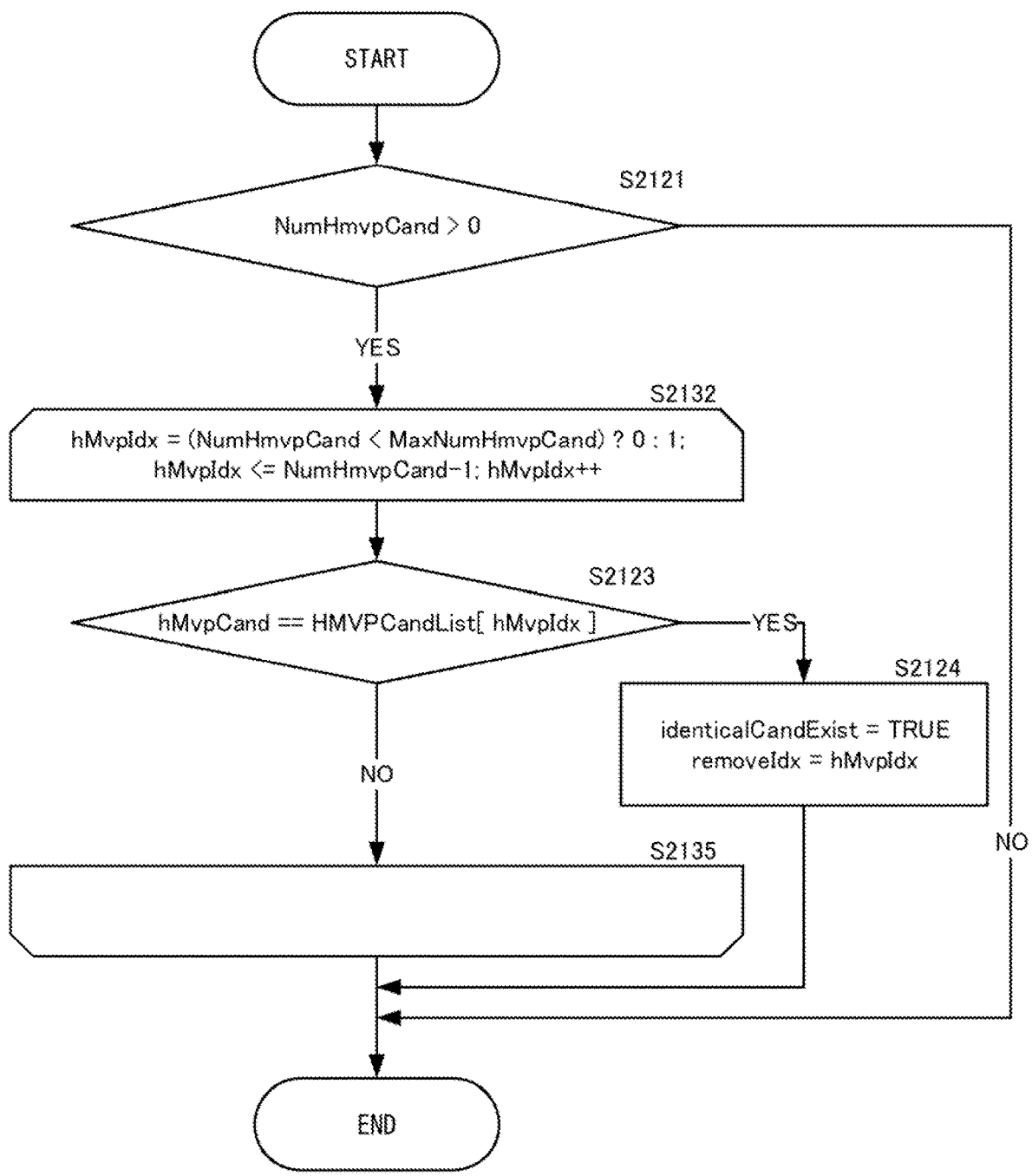
FIG. 40 is a flowchart of an identical element checking processing procedure in a processing procedure for initializing and updating a history-based motion vector predictor candidate list according to a third embodiment of the present invention.

Also, in the third embodiment, when the value of the number of history-based motion vector predictor candidates NumHmvpCand is 0 (step S2121 of FIG. 40: NO), the history-based motion vector predictor candidate list HmvpCandList is empty and no identical candidate is present, so that steps S2132 to S2135 of FIG. 40 are skipped and the present identical element checking processing procedure ends. When the value of the number of history-based motion vector predictor candidates NumHmvpCand is larger than 0 (step S2121 of FIG. 40: YES), the processing of step S2123 is iterated with respect to history-based motion vector predictor indices hMvpIdx from 0 or 1 to NumHmvpCand−1 (steps S2132 to S2135 of FIG. 40). First, when the current number of history-based motion vector predictor candidates NumHmvpCand is smaller than the maximum number of history-based motion vector predictor candidates MaxNumHmvpCand, hMvpIdx is set to 0 because a comparison is made with an element at the beginning included in the history-based motion vector predictor candidate list, i.e., a $0^{th}$ element (history-based motion vector predictor candidate) when counted from the $0^{th}$ element. On the other hand, when the current number of history-based motion vector predictor candidates NumHmvpCand reaches the maximum number of history-based motion vector predictor candidates MaxNumHmvpCand, hMvpIdx is set to 1 because a comparison is not made with an element at the beginning included in the history-based motion vector predictor candidate list, i.e., a $0^{th}$ element (history-based motion vector predictor candidate) when counted from the $0^{th}$ element (step S2132 of FIG. 40). Subsequently, a comparison is made regarding whether or not an hMvpIdx$^{th}$ element HmvpCandList[hMvpIdx] when counted from a $0^{th}$ element of the history-based motion vector predictor candidate list is identical to the inter prediction information candidate hMvpCand of a registration target (step S2123 of FIG. 40). When they are the same (step S2123 of FIG. 40: YES), a value of TRUE is set in the flag identicalCandExist indicating whether or not there is an identical candidate and a value of hMvpIdx is set in a removal target index removeIdx and the present identical element checking process ends. When they are not the same (step S2123 of FIG. 40: NO), hMvpIdx is incremented by 1. If the history-based motion vector predictor index hMvpIdx is smaller than or equal to NumHmvpCand−1, the processing from step S2123 is performed (steps S2132 to S2135 of FIG. 40).

Fourth Embodiment

Next, a picture coding device and a picture decoding device according to a fourth embodiment will be described. Although the picture coding device and the picture decoding device according to the fourth embodiment have the same configurations as the picture coding device and the picture decoding device according to the fourth embodiment, these are different in an identical element checking processing procedure in a processing procedure for initialization and updating a history-based motion vector predictor candidate list provided in a coding information storage memory 111 of a coding side and a coding information storage memory 205 of a decoding side. Instead of the flowchart of FIG. 27, which is the identical element checking processing procedure in the processing procedure for initialization and updating a history-based motion vector predictor candidate list according to the first embodiment, an identical element checking processing procedure in the processing procedure for initialization and updating the history-based motion vector predictor candidate list according to the fourth embodiment is as shown in a flowchart of FIG. 41. The above differences will be described.

<Identical Element Checking Processing Procedure in Processing Procedure for Initialization and Updating History-Based Motion Vector Predictor Candidate List According to Fourth Embodiment>

The identical element checking processing procedure in the processing procedure for initialization and updating the history-based motion vector predictor candidate list in the picture coding device and the picture decoding device according to the fourth embodiment will be described with reference to the flowchart of FIG. 41.

The fourth embodiment is different from the first embodiment and the third embodiment in that a comparison is made with elements from the last element of the history-based motion vector predictor candidate list in descending order in the process of updating the history-based motion vector predictor candidate list. Further, in a process of updating the history-based motion vector predictor candidate list, the fourth embodiment is different from the first embodiment in that, when the maximum number of elements is added to the history-based motion vector predictor candidate list HmvpCandList, a comparison is made with only elements from a $1^{st}$ element without making a comparison with an element at the beginning included in the history-based motion vector predictor candidate list, i.e., a $0^{th}$ element when counted from the $0^{th}$ element. The elements included in the history-based motion vector predictor candidate list include an inter-prediction mode, a reference index, and a motion vector. Because the comparison is not made with the element at the beginning included in the history-based motion vector predictor candidate list, the number of element comparisons is limited to the maximum (MaxNumHmvpCand−1) and the maximum amount of processing associated with the element comparison is reduced.

Figure 41:
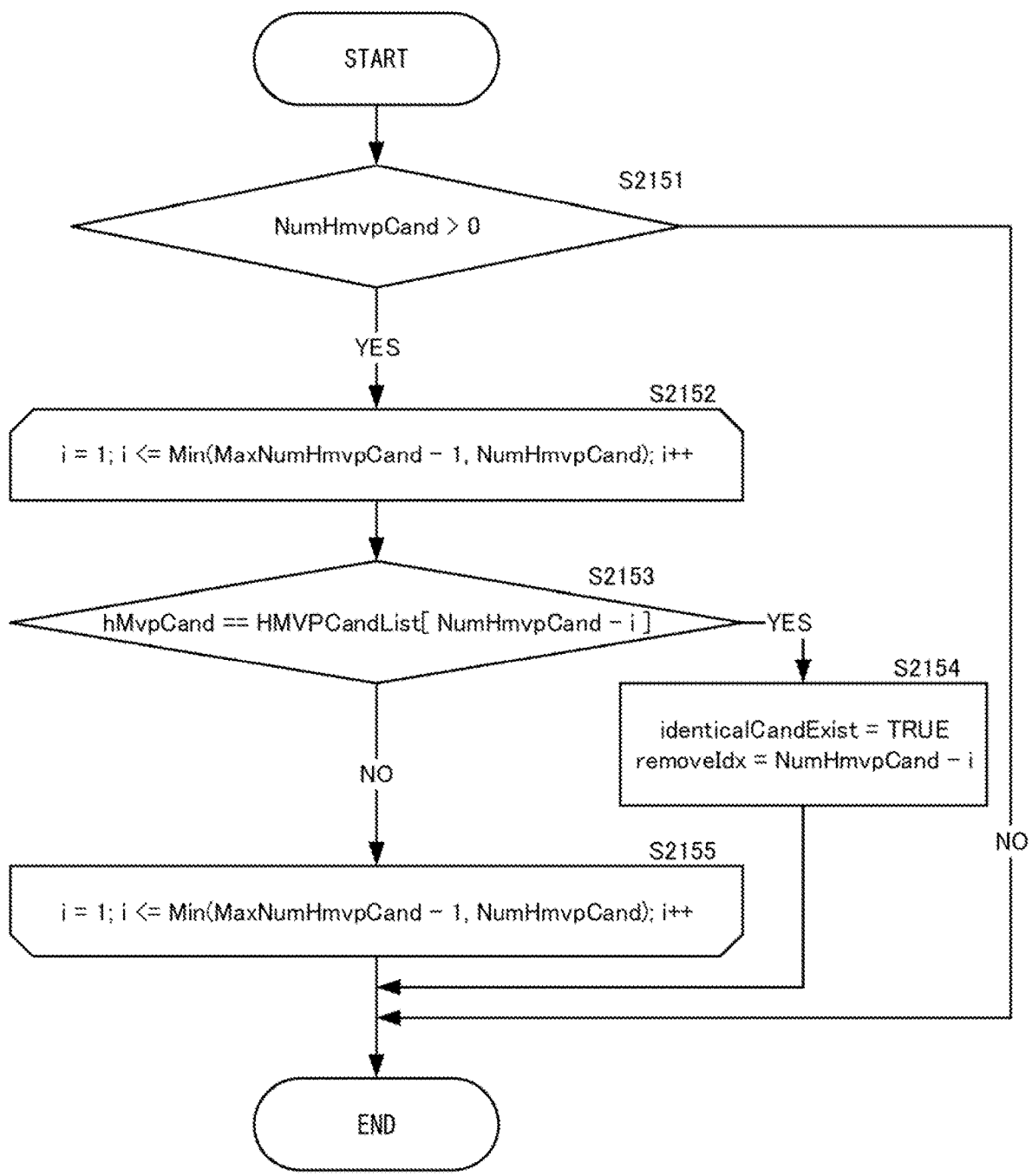
FIG. 41 is a flowchart of an identical element checking processing procedure in a processing procedure for initializing and updating a history-based motion vector predictor candidate list according to a fourth embodiment of the present invention.

Also, in the fourth embodiment, when the value of the number of history-based motion vector predictor candidates NumHmvpCand is 0 (step S2151 of FIG. 41: NO), the history-based motion vector predictor candidate list HmvpCandList is empty and no identical candidate is present, so that steps S2152 to S2155 of FIG. 41 are skipped and the present identical element checking processing procedure ends. When the value of the number of history-based motion vector predictor candidates NumHmvpCand is larger than 0 (step S2152 of FIG. 41: YES), the processing of step S2153 is iterated with respect to indices i from 1 to a smaller value between the maximum number of history-based motion vector predictor candidates MaxNumHmvpCand−1 and the number of history-based motion vector predictor candidates NumHmvpCand (steps S2152 to S2155 of FIG. 41). First, a comparison is made regarding whether or not a NumHmvpCand−$i^{th}$ element HmvpCandList[NumHmvpCand−i] when counted from a $0^{th}$ element of the history-based motion vector predictor candidate list is identical to the inter prediction information candidate hMvpCand of a registration target (step S2153 of FIG. 41). When the NumHmvpCand−$i^{th}$ element HmvpCandList[NumHmvpCand−i] is identical to the inter prediction information candidate hMvpCand (step S2153 of FIG. 41: YES), a value of TRUE is set in the flag identicalCandExist indicating whether or not there is an identical candidate and a value of NumHmvpCand−i is set in a removal target index removeIdx and the present identical element checking process ends (step S2154 of FIG. 41). When the NumHmvpCand−$i^{th}$ element HmvpCandList [NumHmvpCand−i] is not identical to the inter prediction information candidate hMvpCand (step S2153 of FIG. 41: NO), i is incremented by 1. When i is smaller than or equal to a smaller value between the maximum number of history-based motion vector predictor candidates MaxNumHmvpCand−1 and the number of history-based motion vector predictor candidates NumHmvpCand, the processing from step S2153 is performed (steps S2152 to S2155 of FIG. 41). When the index i is 1, which is the initial value, the NumHmvpCand−$i^{th}$ element HmvpCandList[NumHmvpCand−i] counted from the 0th element of the history-based motion vector predictor candidate list indicates the last element registered in the history-based motion vector predictor candidate list. The elements of the history-based motion vector predictor candidate list are shown in descending order as the index i is incremented by 1. By setting the index i to the maximum (MaxNumHmvpCand−1), a comparison is not made with an element HMVPCandList[0] at the beginning of the history-based motion vector predictor candidate.

A plurality of the above-described embodiments may be combined.

In all the embodiments described above, a bitstream output by the picture coding device has a specific data format so that the bitstream can be decoded in accordance with the coding method used in the embodiment. Also, a picture decoding device corresponding to the picture coding device can decode the bitstream of the specific data format.

When a wired or wireless network is used to exchange a bitstream between the picture coding device and the picture decoding device, the bitstream may be converted into a data format suitable for a transmission form of a communication path and transmitted. In this case, a transmission device for converting the bitstream output from the picture coding device into coded data of a data format suitable for the transmission form of the communication path and transmitting the coded data to the network and a reception device for receiving the coded data from the network, restoring the coded data to the bitstream, and supplying the bitstream to the picture decoding device are provided. The transmission device includes a memory that buffers the bitstream output by the picture coding device, a packet processing unit that packetizes the bitstream, and a transmission unit that transmits packetized coded data via the network. The reception device includes a reception unit that receives the packetized coded data via the network, a memory that buffers the received coded data, and a packet processing unit that generates a bitstream by performing packet processing on the coded data and supplies the bitstream to the picture decoding device.

Also, a display device may be provided by adding a display unit that displays a picture decoded by the picture decoding device to the configuration. In this case, the display unit reads a decoded picture signal generated by the decoding picture signal superimposition unit 207 and stored in the decoded picture memory 208 and displays the decoded picture signal on a screen.

Also, an imaging device may be provided by adding an imaging unit that inputs a captured picture to the picture coding device to the configuration. In this case, the imaging unit inputs a captured picture signal to the block split unit 101.

Figure 37:
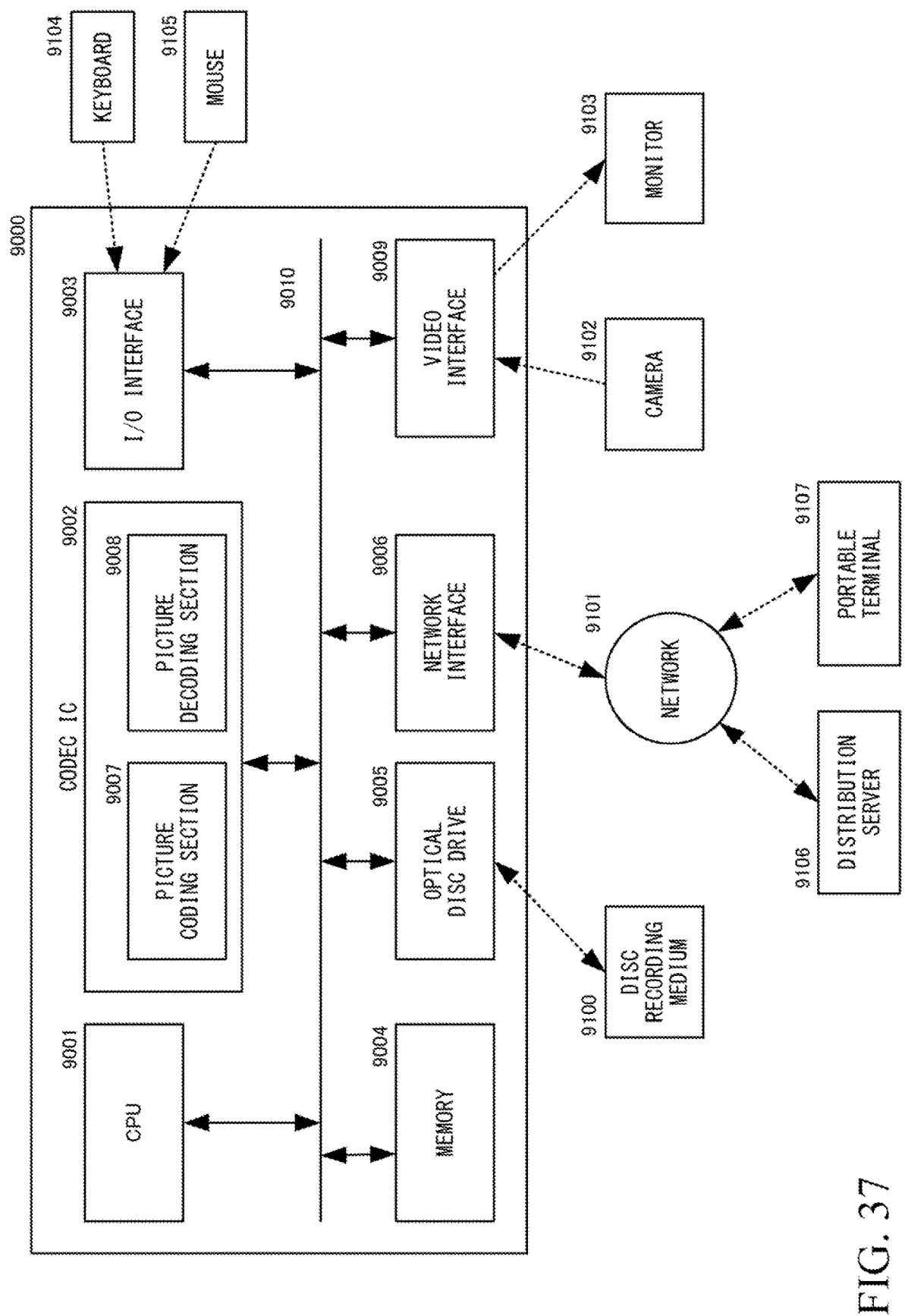
FIG. 37 is an explanatory diagram showing an example of a hardware configuration of a coding/decoding device according to an embodiment of the present invention.

FIG. 37 shows an example of a hardware configuration of the coding/decoding device according to the present embodiment. The coding/decoding device includes the configuration of the picture coding device and the picture decoding device according to the embodiment of the present invention. A related coding/decoding device 9000 includes a CPU 9001, a codec IC 9002, an I/O interface 9003, a memory 9004, an optical disc drive 9005, a network interface 9006, and a video interface 9009 and the respective parts are connected by a bus 9010.

A picture coding unit 9007 and a picture decoding unit 9008 are typically implemented as the codec IC 9002. A picture coding process of the picture coding device according to the embodiment of the present invention is executed by the picture coding unit 9007 and a picture decoding process in the picture decoding device according to the embodiment of the present invention is performed by the picture decoding unit 9008. The I/O interface 9003 is implemented by, for example, a USB interface, and is connected to an external keyboard 9104, a mouse 9105, and the like. The CPU 9001 controls the coding/decoding device 9000 so that a user-desired operation is executed on the basis of a user operation input via the I/O interface 9003. User operations using the keyboard 9104, the mouse 9105, and the like include the selection of a coding or decoding function to be executed, setting of coding quality, designation of an input/output destination of a bitstream, designation of an input/output destination of a picture, and the like.

When the user desires an operation of reproducing a picture recorded on a disc recording medium 9100, the optical disc drive 9005 reads a bitstream from the disc recording medium 9100 that has been inserted and transmits the read bitstream to the picture decoding unit 9008 of the codec IC 9002 via the bus 9010. The picture decoding unit 9008 executes a picture decoding process on the input bitstream in the picture decoding device according to the embodiment of the present invention and transmits a decoded picture to an external monitor 9103 via the video interface 9009. The coding/decoding device 9000 includes a network interface 9006 and can be connected to an external distribution server 9106 and a portable terminal 9107 via a network 9101. When the user desires to reproduce the picture recorded on the distribution server 9106 or the portable terminal 9107 instead of the picture recorded on the disc recording medium 9100, the network interface 9006 acquires a bitstream from the network 9101 instead of reading the bitstream from the input disc recording medium 9100. When the user desires to reproduce the picture recorded in the memory 9004, the picture decoding process in the picture decoding device according to the embodiment of the present invention is executed on the bitstream recorded in the memory 9004.

When the user desires to perform an operation of coding a picture captured by the external camera 9102 and recording the coded picture in the memory 9004, the video interface 9009 inputs the picture from the camera 9102 and transmits the picture to the picture coding unit 9007 of the codec IC 9002 via the bus 9010. The picture coding unit 9007 executes a picture coding process on a picture input via the video interface 9009 in the picture coding device according to the embodiment of the present invention to create a bitstream. Then, the bitstream is transmitted to the memory 9004 via the bus 9010. When the user desires to record a bitstream on the disc recording medium 9100 instead of the memory 9004, the optical disc drive 9005 writes the bitstream to the disc recording medium 9100 which has been inserted.

It is also possible to implement a hardware configuration that includes a picture coding device without including a picture decoding device or a hardware configuration that includes a picture decoding device without including a picture coding device. Such a hardware configuration is implemented, for example, by replacing the codec IC 9002 with the picture coding unit 9007 or the picture decoding unit 9008.

The above processes related to coding and decoding may be implemented as a transmission, storage, and reception device using hardware and implemented by firmware stored in a read only memory (ROM), a flash memory, or the like or software of a computer or the like. A firmware program and a software program thereof may be provided by recording the programs on a recording medium capable of being read by a computer or the like or may be provided from a server through a wired or wireless network or may be provided as data broadcasts of terrestrial or satellite digital broadcasting.

The present invention has been described above on the basis of the embodiments. The embodiments are examples and it will be understood by those skilled in the art that various modifications are possible in combinations of the respective components and processing processes and such modifications are within the scope of the present invention.

EXPLANATION OF REFERENCES

100 Picture coding device
101 Block split unit
102 Inter prediction unit
103 Intra prediction unit
104 Decoded picture memory
105 Prediction method determination unit
106 Residual generation unit
107 Orthogonal transform/quantization unit
108 Bit strings coding unit
109 Inverse quantization/inverse orthogonal transform unit
110 Decoding picture signal superimposition unit
111 Coding information storage memory
200 Picture decoding device
201 Bit strings decoding unit
202 Block split unit
203 Inter prediction unit
204 Intra prediction unit
205 Coding information storage memory
206 Inverse quantization/inverse orthogonal transform unit
207 Decoding picture signal superimposition unit
208 Decoded picture memory

What is claimed is:
1. A picture coding device for coding a moving picture using inter prediction based on inter prediction information in units of blocks, the picture coding device comprising:
a coding information storage unit configured to store inter prediction information used in the inter prediction of a coded block in a history-based motion vector predictor candidate list;

a spatial merging candidate derivation unit configured to derive a spatial merging candidate from inter prediction information of a block spatially neighboring a coding target block; and a history-based merging candidate derivation unit configured to derive a history-based merging candidate from the inter prediction information stored in the history-based motion vector predictor candidate list, wherein the history-based merging candidate derivation unit compares a predetermined number of inter prediction information elements from the back end within the inter prediction information stored in the history-based motion vector predictor candidate list with inter prediction information of a spatial merging candidate derived from a neighboring block on the left side and a spatial merging candidate derived from a neighboring block on the upper side and sets the inter prediction information as the history-based merging candidate when a value of the inter prediction information is different, and sets the inter prediction information prior to the predetermined number of the inter prediction information elements from the back end as the history-based merging candidate without making a comparison with the inter prediction information of the spatial merging candidate.

2. A picture coding method for coding a moving picture using inter prediction based on inter prediction information in units of blocks, the picture coding method comprising:

a coding information storage step of storing inter prediction information used in the inter prediction of a coded block in a history-based motion vector predictor candidate list;

a spatial merging candidate derivation step of deriving a spatial merging candidate from inter prediction information of a block spatially neighboring a coding target block; and a history-based merging candidate derivation step of deriving a history-based merging candidate from the inter prediction information stored in the history-based motion vector predictor candidate list, wherein the history-based merging candidate derivation step includes comparing a predetermined number of inter prediction information elements from the back end within the inter prediction information stored in the history-based motion vector predictor candidate list with inter prediction information of a spatial merging candidate derived from a neighboring block on the left side and a spatial merging candidate derived from a neighboring block on the upper side and setting the inter prediction information as the history-based merging candidate when a value of the inter prediction information is different, and setting the inter prediction information prior to the predetermined number of the inter prediction information elements from the back end as the history-based merging candidate without making a comparison with the inter prediction information of the spatial merging candidate.

3. A non-transitory computer readable medium storing a bitstream formed by the picture encoding method according to claim 2.

4. A non-transitory computer-readable recording medium having embodied thereon a picture coding program for coding a moving picture using inter prediction based on inter prediction information in units of blocks, the picture coding program causing a computer to execute:

a coding information storage step of storing inter prediction information used in the inter prediction of a coded block in a history-based motion vector predictor candidate list;

a spatial merging candidate derivation step of deriving a spatial merging candidate from inter prediction information of a block spatially neighboring a coding target block; and a history-based merging candidate derivation step of deriving a history-based merging candidate from the inter prediction information stored in the history-based motion vector predictor candidate list, wherein the history-based merging candidate derivation step includes comparing a predetermined number of inter prediction information elements from the back end within the inter prediction information stored in the history-based motion vector predictor candidate list with inter prediction information of a spatial merging candidate derived from a neighboring block on the left side and a spatial merging candidate derived from a neighboring block on the upper side and setting the inter prediction information as the history-based merging candidate when a value of the inter prediction information is different, and setting the inter prediction information prior to the predetermined number of the inter prediction information elements from the back end as the history-based merging candidate without making a comparison with the inter prediction information of the spatial merging candidate.

5. A picture decoding device for decoding coded bit strings in which a moving picture is coded using inter prediction in units of blocks, the picture decoding device comprising:

a coding information storage unit configured to store inter prediction information used in the inter prediction of a decoded block in a history-based motion vector predictor candidate list;

a spatial merging candidate derivation unit configured to derive a spatial merging candidate from inter prediction information of a block spatially neighboring a decoding target block; and a history-based merging candidate derivation unit configured to derive a history-based merging candidate from the inter prediction information stored in the history-based motion vector predictor candidate list, wherein the history-based merging candidate derivation unit compares a predetermined number of inter prediction information elements from the back end within the inter prediction information stored in the history-based motion vector predictor candidate list with inter prediction information of a spatial merging candidate derived from a neighboring block on the left side and a spatial merging candidate derived from a neighboring block on the upper side and sets the inter prediction information as the history-based merging candidate when a value of the inter prediction information is different, and sets the inter prediction information prior to the predetermined number of the inter prediction information elements from the back end as the history-based merging candidate without making a comparison with the inter prediction information of the spatial merging candidate.

6. A picture decoding method for decoding coded bit strings in which a moving picture is coded using inter prediction in units of blocks, the picture decoding method comprising:

a coding information storage step of storing inter prediction information used in the inter prediction of a decoded block in a history-based motion vector predictor candidate list;

a spatial merging candidate derivation step of deriving a spatial merging candidate from inter prediction information of a block spatially neighboring a decoding target block; and a history-based merging candidate derivation step of deriving a history-based merging candidate from the inter prediction information stored in the history-based motion vector predictor candidate list, wherein the history-based merging candidate derivation step includes comparing a predetermined number of inter prediction information elements from the back end within the inter prediction information stored in the history-based motion vector predictor candidate list with inter prediction information of a spatial merging candidate derived from a neighboring block on the left side and a spatial merging candidate derived from a neighboring block on the upper side and setting the inter prediction information as the history-based merging candidate when a value of the inter prediction information is different, and setting the inter prediction information prior to the predetermined number of the inter prediction information elements from the back end as the history-based merging candidate without making a comparison with the inter prediction information of the spatial merging candidate.

7. A non-transitory computer-readable recording medium having embodied thereon a picture decoding program for decoding coded bit strings in which a moving picture is coded using inter prediction in units of blocks, the picture decoding program causing a computer to execute:

a coding information storage step of storing inter prediction information used in the inter prediction of a decoded block in a history-based motion vector predictor candidate list;

a spatial merging candidate derivation step of deriving a spatial merging candidate from inter prediction information of a block spatially neighboring a decoding target block; and a history-based merging candidate derivation step of deriving a history-based merging candidate from the inter prediction information stored in the history-based motion vector predictor candidate list, wherein the history-based merging candidate derivation step includes comparing a predetermined number of inter prediction information elements from the back end within the inter prediction information stored in the history-based motion vector predictor candidate list with inter prediction information of a spatial merging candidate derived from a neighboring block on the left side and a spatial merging candidate derived from a neighboring block on the upper side and setting the inter prediction information as a the history-based merging candidate when a value of the inter prediction information is different, and setting the inter prediction information prior to the predetermined number of the inter prediction information elements from the back end as the history-based merging candidate without making a comparison with the inter prediction information of the spatial merging candidate.

* * * * *